United States Patent
Hartmann et al.

(10) Patent No.: US 12,109,775 B2
(45) Date of Patent: Oct. 8, 2024

(54) METHOD FOR PRODUCING A SOLE OF A SHOE

(71) Applicant: PUMA SE, Herzogenaurach (DE)

(72) Inventors: Matthias Hartmann, Forchheim (DE); Reinhold Sussmann, Scheinfeld (DE); Mauro Bonin, Nuremberg (DE)

(73) Assignee: PUMA SE, Herzogenaurach (DE)

( * ) Notice: Subject to any disclaimer, the term of this patent is extended or adjusted under 35 U.S.C. 154(b) by 126 days.

(21) Appl. No.: 17/559,220

(22) Filed: Dec. 22, 2021

(65) Prior Publication Data
US 2023/0191736 A1 Jun. 22, 2023

(51) Int. Cl.
| | | |
|---|---|---|
| *B29D 35/14* | (2010.01) | |
| *A43B 13/12* | (2006.01) | |
| *A43B 13/18* | (2006.01) | |
| *B29C 65/54* | (2006.01) | |
| *B29D 35/12* | (2010.01) | |
| *B29L 31/50* | (2006.01) | |

(52) U.S. Cl.
CPC .......... *B29D 35/148* (2013.01); *A43B 13/122* (2013.01); *A43B 13/125* (2013.01); *A43B 13/187* (2013.01); *B29C 65/542* (2013.01); *B29D 35/122* (2013.01); *B29D 35/128* (2013.01); *B29D 35/142* (2013.01); *B29L 2031/504* (2013.01)

(58) Field of Classification Search
CPC .. B29D 35/148; B29D 35/122; B29D 35/128; A43B 13/122; A43B 13/125
USPC ........................................................ 156/245
See application file for complete search history.

(56) References Cited

U.S. PATENT DOCUMENTS

| | | | |
|---|---|---|---|
| 2,983,056 | A | 5/1961 | Murawski |
| 3,469,576 | A | 9/1969 | Smith |
| 3,573,155 | A | 3/1971 | Mitchell |
| 3,629,051 | A | 12/1971 | Mitchell |
| 4,100,686 | A | 7/1978 | Sgarlato et al. |
| 4,112,599 | A | 9/1978 | Krippelz |

(Continued)

FOREIGN PATENT DOCUMENTS

| | | |
|---|---|---|
| CN | 1285779 A | 2/2001 |
| CN | 1334054 A | 2/2002 |

(Continued)

OTHER PUBLICATIONS

International Search Report of International Application No. PCT/EP2018/061935, mailed Jan. 18, 2019, 7 pages (with English translation).

(Continued)

*Primary Examiner* — S. Behrooz Ghorishi
*Assistant Examiner* — Gregory C. Grosso
(74) *Attorney, Agent, or Firm* — Quarles & Brady LLP

(57) ABSTRACT

A method of using a marriage mold includes providing an upper plate having a first wall and at least one second wall, and a lower plate having a marriage cavity and a top wall. At least two midsole components are provided, which are made of a first material, and each have a first region and a void structure. The at least two midsole components are positioned into the marriage cavity. The upper plate is secured to the lower plate such that the first wall and the top wall form a seal. The at least two midsole components are joined together to form a midsole having a second void structure.

20 Claims, 22 Drawing Sheets

(56) References Cited

U.S. PATENT DOCUMENTS

| | | |
|---|---|---|
| D256,067 S | 7/1980 | Hagg et al. |
| 4,235,026 A | 11/1980 | Plagenhoef |
| D265,017 S | 6/1982 | Vermonet |
| D272,963 S | 3/1984 | Muller et al. |
| 4,779,359 A | 10/1988 | Famolare, Jr. |
| D298,582 S | 11/1988 | Caire |
| D304,520 S | 11/1989 | Clark |
| D307,971 S | 5/1990 | Maccano et al. |
| 4,942,679 A | 7/1990 | Brandon et al. |
| 4,944,099 A | 7/1990 | Davis |
| D311,989 S | 11/1990 | Parker et al. |
| 5,042,176 A | 8/1991 | Rudy |
| 5,084,987 A | 2/1992 | Flemming |
| D324,762 S | 3/1992 | Hatfield |
| 5,134,790 A | 8/1992 | Woitschaetzke et al. |
| D329,528 S | 9/1992 | Hatfield |
| 5,152,081 A | 10/1992 | Hallenbeck et al. |
| D330,629 S | 11/1992 | Bramani |
| 5,197,206 A | 3/1993 | Shorten |
| 5,197,207 A | 3/1993 | Shorten |
| D337,650 S | 7/1993 | Ill et al. |
| D340,797 S | 11/1993 | Pallera et al. |
| 5,313,717 A | 5/1994 | Allen et al. |
| 5,329,705 A | 7/1994 | Grim et al. |
| D350,222 S | 9/1994 | Hase |
| 5,378,223 A | 1/1995 | Grim et al. |
| 5,383,290 A | 1/1995 | Grim |
| D356,438 S | 3/1995 | Opie et al. |
| D365,920 S | 1/1996 | Schneider |
| 5,607,749 A | 3/1997 | Strumor |
| D386,589 S | 11/1997 | Cass |
| D389,991 S | 2/1998 | Elliott |
| D390,349 S | 2/1998 | Murai et al. |
| 5,952,065 A | 9/1999 | Mitchell et al. |
| D414,920 S | 10/1999 | Cahill |
| D415,610 S | 10/1999 | Cahill |
| D415,876 S | 11/1999 | Cahill |
| 5,979,078 A | 11/1999 | McLaughlin |
| D423,199 S | 4/2000 | Cahill |
| D429,874 S | 8/2000 | Gumbert |
| D431,346 S | 10/2000 | Birkenstock |
| D444,620 S | 7/2001 | Della Valle |
| D446,002 S | 8/2001 | Leong et al. |
| D460,852 S | 7/2002 | Daudier |
| 6,467,197 B1 | 10/2002 | Mitsui et al. |
| 6,558,784 B1 | 5/2003 | Norton et al. |
| 6,618,959 B1 | 9/2003 | Sussmann |
| 6,647,646 B2 | 11/2003 | Mitsui et al. |
| D483,932 S | 12/2003 | Cooper |
| 6,670,029 B2 | 12/2003 | Norton et al. |
| 6,763,611 B1 | 7/2004 | Fusco |
| 6,763,615 B2 | 7/2004 | Mitsui et al. |
| D494,343 S | 8/2004 | Morris |
| 6,782,640 B2 | 8/2004 | Westin |
| D496,149 S | 9/2004 | Belley et al. |
| 6,817,113 B2 | 11/2004 | Pan |
| 6,843,000 B1 * | 1/2005 | Park ............... B29D 35/14 36/27 |
| 6,848,200 B1 | 2/2005 | Westin |
| 6,883,252 B2 | 4/2005 | Cagner |
| 6,920,707 B1 | 7/2005 | Greene et al. |
| 6,951,066 B2 | 10/2005 | Snow |
| 6,957,504 B2 | 10/2005 | Morris |
| D512,208 S | 12/2005 | Kubo et al. |
| D515,297 S | 2/2006 | Acheson |
| 7,086,179 B2 | 8/2006 | Dojan et al. |
| 7,086,180 B2 | 8/2006 | Dojan et al. |
| 7,096,605 B1 | 8/2006 | Kozo et al. |
| 7,100,310 B2 | 9/2006 | Foxen et al. |
| 7,141,131 B2 | 11/2006 | Foxen et al. |
| 7,153,560 B2 | 12/2006 | Hofmann |
| 7,254,906 B2 | 8/2007 | Morris et al. |
| D549,934 S | 9/2007 | Horne et al. |
| D551,831 S | 10/2007 | Romero-Sanchez |
| D556,982 S | 12/2007 | Harper et al. |
| D560,883 S | 2/2008 | McClaskie |
| D561,433 S | 2/2008 | McClaskie |
| D571,085 S | 6/2008 | McClaskie |
| 7,401,420 B2 | 7/2008 | Dojan et al. |
| D576,780 S | 9/2008 | Jolicoeur |
| D586,090 S | 2/2009 | Turner et al. |
| 7,484,318 B2 | 2/2009 | Finkelstein |
| D596,384 S | 7/2009 | Andersen et al. |
| 7,555,848 B2 | 7/2009 | Aveni et al. |
| 7,556,846 B2 | 7/2009 | Dojan et al. |
| 7,559,107 B2 | 7/2009 | Dojan et al. |
| 7,562,469 B2 | 7/2009 | Dojan |
| D597,293 S | 8/2009 | Banik et al. |
| D601,333 S | 10/2009 | McClaskie |
| 7,665,230 B2 | 2/2010 | Dojan et al. |
| 7,676,955 B2 | 3/2010 | Dojan et al. |
| 7,676,956 B2 | 3/2010 | Dojan et al. |
| 7,685,741 B2 | 3/2010 | Friedman |
| D616,183 S | 5/2010 | Skaja |
| D617,540 S | 6/2010 | McClaskie |
| D624,291 S | 9/2010 | Henderson |
| 7,805,859 B2 | 10/2010 | Finkelstein |
| D631,237 S | 1/2011 | Genuin et al. |
| D631,646 S | 2/2011 | Muller |
| D633,286 S | 3/2011 | Skaja |
| D633,287 S | 3/2011 | Skaja |
| D636,571 S | 4/2011 | Avar |
| 8,074,377 B2 | 12/2011 | Nishiwaki et al. |
| 8,112,909 B2 | 2/2012 | Kubo et al. |
| 8,122,614 B2 | 2/2012 | Sussmann |
| 8,176,657 B2 | 5/2012 | Schinlder et al. |
| 8,296,969 B2 | 10/2012 | Granger et al. |
| D671,305 S | 11/2012 | Escobar |
| D671,306 S | 11/2012 | Tzenos |
| 8,312,644 B2 | 11/2012 | Peikert et al. |
| 8,321,984 B2 | 12/2012 | Dojan et al. |
| 8,356,429 B2 | 1/2013 | Eder et al. |
| 8,418,379 B2 | 4/2013 | Nishiwaki et al. |
| 8,429,835 B2 | 4/2013 | Dojan et al. |
| D693,553 S | 11/2013 | McClaskie |
| 8,572,866 B2 | 11/2013 | Dojan et al. |
| 8,578,535 B2 | 11/2013 | Dojan et al. |
| D696,501 S | 12/2013 | Miner |
| D696,502 S | 12/2013 | Miner |
| D696,503 S | 12/2013 | Miner |
| 8,657,979 B2 | 2/2014 | Dojan et al. |
| 8,671,591 B2 | 3/2014 | Brown |
| 8,745,892 B2 | 6/2014 | Polegato Moretti |
| D709,680 S | 7/2014 | Herath |
| 8,789,298 B2 | 7/2014 | Eder et al. |
| D711,081 S | 8/2014 | Miner |
| D713,623 S | 9/2014 | Lo |
| 8,961,844 B2 | 2/2015 | Baghdadi et al. |
| D731,763 S | 6/2015 | Solstad |
| D734,600 S | 7/2015 | Gargiulo |
| 9,078,493 B2 | 7/2015 | Bradford |
| D739,131 S | 9/2015 | Del Biondi |
| 9,125,454 B2 | 9/2015 | De Roode et al. |
| D740,003 S | 10/2015 | Herath |
| D740,004 S | 10/2015 | Hoellmueller et al. |
| D746,559 S | 1/2016 | Besanceney et al. |
| 9,241,536 B2 | 1/2016 | Smaldone et al. |
| D753,381 S | 4/2016 | Ostapenko |
| D756,085 S | 5/2016 | Spring |
| D756,620 S | 5/2016 | Boys |
| 9,351,534 B2 | 5/2016 | Peikert et al. |
| D758,056 S | 6/2016 | Galway et al. |
| D759,358 S | 6/2016 | Cullen |
| 9,402,439 B2 | 8/2016 | Cross et al. |
| D765,361 S | 9/2016 | Johnsongriffin |
| D765,362 S | 9/2016 | Kuerbis |
| D767,263 S | 9/2016 | Reiser |
| 9,456,656 B2 | 10/2016 | Cross |
| 9,486,036 B1 | 11/2016 | Douglas |
| D773,161 S | 12/2016 | Teteriatnikov |
| D773,790 S | 12/2016 | Raysse |
| D773,791 S | 12/2016 | Raysse |
| 9,510,640 B2 | 12/2016 | Bier et al. |
| D776,410 S | 1/2017 | Galway et al. |

(56) References Cited

U.S. PATENT DOCUMENTS

| | | |
|---|---|---|
| 9,538,811 B2 | 1/2017 | Cross |
| 9,549,590 B2 | 1/2017 | Cross et al. |
| 9,554,620 B2 | 1/2017 | Cross et al. |
| 9,554,622 B2 | 1/2017 | Cross |
| 9,554,624 B2 | 1/2017 | Cross |
| 9,572,404 B2 | 2/2017 | Dojan et al. |
| D781,543 S | 3/2017 | Raysse |
| 9,585,435 B2 | 3/2017 | Bier et al. |
| D783,247 S | 4/2017 | McMillan |
| 9,610,746 B2 | 4/2017 | Wardlaw et al. |
| 9,682,522 B2 | 6/2017 | Baghdadi et al. |
| 9,687,041 B2 | 6/2017 | Peikert et al. |
| D790,817 S | 7/2017 | Perkins et al. |
| D791,452 S | 7/2017 | Dombrow |
| D792,067 S | 7/2017 | Raysse |
| D793,680 S | 8/2017 | Lee |
| D793,688 S | 8/2017 | Avar et al. |
| D794,289 S | 8/2017 | Kanata |
| 9,717,301 B2 | 8/2017 | Peikert et al. |
| 9,723,895 B2 | 8/2017 | Schaefer et al. |
| D797,418 S | 9/2017 | Lee et al. |
| D798,553 S | 10/2017 | Lee |
| D799,183 S | 10/2017 | Weeks |
| 9,775,769 B2 | 10/2017 | Brown et al. |
| 9,781,970 B2 | 10/2017 | Wardlaw et al. |
| 9,781,974 B2 | 10/2017 | Reinhardt et al. |
| 9,788,598 B2 | 10/2017 | Reinhardt et al. |
| 9,788,606 B2 | 10/2017 | Reinhardt et al. |
| 9,795,186 B2 | 10/2017 | Reinhardt et al. |
| 9,820,528 B2 | 11/2017 | Reinhardt et al. |
| 9,820,532 B2 | 11/2017 | Cross et al. |
| 9,849,645 B2 | 12/2017 | Wardlaw et al. |
| D808,143 S | 1/2018 | Negri |
| 9,854,869 B2 | 1/2018 | Nordstrom |
| 9,861,159 B2 | 1/2018 | Kohatsu et al. |
| D809,755 S | 2/2018 | Stavseng et al. |
| D809,756 S | 2/2018 | Stavseng et al. |
| D809,761 S | 2/2018 | Parrett |
| D810,407 S | 2/2018 | DeAlmeida |
| D811,062 S | 2/2018 | Teague |
| 9,884,947 B2 | 2/2018 | Prissok et al. |
| D813,508 S | 3/2018 | Weeks |
| 9,926,423 B2 | 3/2018 | Baghdadi |
| D814,752 S | 4/2018 | Ormsby |
| 9,930,928 B2 | 4/2018 | Whiteman et al. |
| 9,961,961 B2 | 5/2018 | Smith |
| 9,968,157 B2 | 5/2018 | Wardlaw et al. |
| 9,968,160 B2 | 5/2018 | Peyton |
| 10,039,342 B2 | 8/2018 | Reinhardt et al. |
| 10,051,914 B2 | 8/2018 | Cross et al. |
| 10,051,917 B2 | 8/2018 | Dojan et al. |
| D828,686 S | 9/2018 | Hoellmueller et al. |
| D831,315 S | 10/2018 | Mahoney |
| D831,317 S | 10/2018 | Jenkins et al. |
| 10,098,411 B2 | 10/2018 | Hoffer et al. |
| 10,098,412 B2 | 10/2018 | Hoffer et al. |
| 10,111,494 B2 | 10/2018 | Cross |
| D836,893 S | 1/2019 | Bischoff et al. |
| 10,182,612 B2 | 1/2019 | Bunnell et al. |
| D840,135 S | 2/2019 | Dombrow |
| D840,136 S | 2/2019 | Herath et al. |
| D840,137 S | 2/2019 | Herath et al. |
| 10,226,099 B2 | 3/2019 | Bischoff |
| 10,227,467 B2 | 3/2019 | Baghdadi |
| D846,255 S | 4/2019 | Khalife |
| D846,256 S | 4/2019 | Khalife |
| 10,259,183 B2 | 4/2019 | Wardlaw et al. |
| 10,271,615 B2 | 4/2019 | Cross |
| D847,475 S | 5/2019 | Khalife |
| D847,480 S | 5/2019 | Khalife |
| 10,278,448 B2 | 5/2019 | Cross |
| 10,285,471 B2 | 5/2019 | Cross |
| D850,766 S | 6/2019 | Girard et al. |
| D851,889 S | 6/2019 | Dobson et al. |
| D852,475 S | 7/2019 | Hoellmueller |
| D852,476 S | 7/2019 | Hartmann |
| D853,691 S | 7/2019 | Coonrod et al. |
| D853,699 S | 7/2019 | Coonrod et al. |
| 10,433,616 B2 | 10/2019 | Takeshita et al. |
| 10,470,521 B2 | 11/2019 | Iuchi et al. |
| 10,645,998 B2 | 5/2020 | Shaffer et al. |
| 10,786,039 B2 | 9/2020 | Kohatsu et al. |
| 11,076,656 B2 | 8/2021 | Kormann et al. |
| 2002/0071946 A1 | 6/2002 | Norton et al. |
| 2003/0097767 A1 | 5/2003 | Perkinson |
| 2003/0208925 A1 | 11/2003 | Pan |
| 2004/0148805 A1 | 8/2004 | Morris |
| 2004/0154189 A1 | 8/2004 | Wang |
| 2006/0026863 A1 | 2/2006 | Liu |
| 2006/0214324 A1* | 9/2006 | Wang .................. B29C 45/1676 264/161 |
| 2006/0234012 A1 | 10/2006 | Wang |
| 2008/0127513 A1 | 6/2008 | Schinlder et al. |
| 2008/0148599 A1 | 6/2008 | Collins |
| 2009/0064542 A1 | 3/2009 | Figueroa |
| 2009/0172971 A1 | 7/2009 | Peikert et al. |
| 2010/0242309 A1 | 9/2010 | McCann |
| 2011/0047720 A1 | 3/2011 | Maranan et al. |
| 2011/0197468 A1 | 8/2011 | Kubo et al. |
| 2011/0252670 A1 | 10/2011 | Smith |
| 2013/0055599 A1 | 3/2013 | Peikert et al. |
| 2013/0059116 A1 | 3/2013 | Peikert et al. |
| 2013/0145653 A1 | 6/2013 | Bradford |
| 2013/0160223 A1 | 6/2013 | Bier et al. |
| 2013/0233477 A1 | 9/2013 | Bier et al. |
| 2013/0291409 A1 | 11/2013 | Reinhardt et al. |
| 2013/0312284 A1 | 11/2013 | Berend et al. |
| 2014/0033574 A1 | 2/2014 | Wan |
| 2014/0086504 A1 | 3/2014 | Arai |
| 2014/0151918 A1 | 6/2014 | Hartmann |
| 2014/0196308 A1 | 7/2014 | Baratta et al. |
| 2014/0208610 A1 | 7/2014 | Dirsa et al. |
| 2014/0223776 A1 | 8/2014 | Wardlaw et al. |
| 2014/0223777 A1 | 8/2014 | Whiteman et al. |
| 2014/0259745 A1 | 9/2014 | Vaglio |
| 2015/0096203 A1 | 4/2015 | Brown et al. |
| 2015/0272272 A1 | 10/2015 | Scofield |
| 2016/0007676 A1 | 1/2016 | Leimer et al. |
| 2016/0025343 A1 | 1/2016 | Bertoldi |
| 2016/0037859 A1 | 2/2016 | Smith et al. |
| 2016/0044992 A1 | 2/2016 | Reinhardt et al. |
| 2016/0120260 A1 | 5/2016 | Hansen et al. |
| 2016/0227876 A1 | 8/2016 | Le et al. |
| 2016/0242502 A1 | 8/2016 | Spanks |
| 2016/0278481 A1 | 9/2016 | Le et al. |
| 2016/0295955 A1 | 10/2016 | Wardlaw et al. |
| 2016/0324260 A1 | 11/2016 | Guyan |
| 2016/0345665 A1 | 12/2016 | Kohatsu et al. |
| 2016/0374428 A1 | 12/2016 | Kormann et al. |
| 2017/0006958 A1 | 1/2017 | Jeong |
| 2017/0105478 A1 | 4/2017 | Cross et al. |
| 2017/0172251 A1 | 6/2017 | Douglas |
| 2017/0245581 A1 | 8/2017 | McFarland et al. |
| 2017/0245582 A1 | 8/2017 | Green et al. |
| 2017/0253710 A1 | 9/2017 | Smith et al. |
| 2017/0258178 A1 | 9/2017 | Cross et al. |
| 2017/0258180 A1 | 9/2017 | Cross et al. |
| 2017/0259474 A1 | 9/2017 | Holmes et al. |
| 2017/0341325 A1 | 11/2017 | Le et al. |
| 2017/0354568 A1 | 12/2017 | Brown et al. |
| 2018/0000197 A1 | 1/2018 | Wardlaw et al. |
| 2018/0027922 A1 | 2/2018 | Orand |
| 2018/0035755 A1 | 2/2018 | Reinhardt et al. |
| 2018/0049509 A1 | 2/2018 | Zwick et al. |
| 2018/0064210 A1 | 3/2018 | Turner et al. |
| 2018/0077997 A1 | 3/2018 | Hoffer et al. |
| 2018/0077998 A1 | 3/2018 | Nordstrom |
| 2018/0092432 A1 | 4/2018 | Hoffer et al. |
| 2018/0098602 A1 | 4/2018 | Kohatsu et al. |
| 2018/0100049 A1 | 4/2018 | Prissok et al. |
| 2018/0103719 A1 | 4/2018 | Chen |
| 2018/0103725 A1 | 4/2018 | Chen |
| 2018/0110292 A1 | 4/2018 | Beers et al. |
| 2018/0116327 A9 | 5/2018 | McFarland et al. |

(56) References Cited

U.S. PATENT DOCUMENTS

| | | | |
|---|---|---|---|
| 2018/0116337 A1* | 5/2018 | Montross | B29D 35/0054 |
| 2018/0125156 A1 | 5/2018 | Bray, Jr. | |
| 2018/0125157 A1 | 5/2018 | Bray, Jr. | |
| 2018/0132487 A1 | 5/2018 | Kormann et al. | |
| 2018/0153264 A1 | 6/2018 | Amos et al. | |
| 2018/0154598 A1 | 6/2018 | Kurtz et al. | |
| 2018/0199667 A1 | 7/2018 | Wang | |
| 2018/0206591 A1 | 7/2018 | Whiteman et al. | |
| 2018/0206599 A1 | 7/2018 | Amos et al. | |
| 2018/0235310 A1 | 8/2018 | Wardlaw et al. | |
| 2018/0289108 A1 | 10/2018 | Hoffer et al. | |
| 2018/0289109 A1 | 10/2018 | Beers et al. | |
| 2018/0303198 A1 | 10/2018 | Reinhardt et al. | |
| 2018/0325217 A1 | 11/2018 | Dojan et al. | |
| 2018/0338569 A1 | 11/2018 | Cross et al. | |
| 2018/0352900 A1 | 12/2018 | Hartmann et al. | |
| 2019/0082782 A1 | 3/2019 | Bunnell et al. | |
| 2019/0126580 A1 | 5/2019 | Paulson et al. | |
| 2019/0133251 A1 | 5/2019 | Hartmann et al. | |
| 2019/0150564 A1 | 5/2019 | Bischoff | |
| 2019/0216167 A1 | 7/2019 | Hoffer et al. | |
| 2019/0216168 A1 | 7/2019 | Hoffer et al. | |
| 2019/0223539 A1 | 7/2019 | Hoffer et al. | |
| 2019/0223550 A1 | 7/2019 | Levy | |
| 2019/0223551 A1 | 7/2019 | Hoffer et al. | |
| 2019/0281921 A1 | 9/2019 | Bray, Jr. | |
| 2019/0291371 A1 | 9/2019 | Wardlaw et al. | |

FOREIGN PATENT DOCUMENTS

| | | | |
|---|---|---|---|
| CN | 1653982 A | 8/2005 | |
| CN | 2790218 Y | 6/2006 | |
| CN | 101299941 A | 11/2008 | |
| CN | 201226862 Y | 4/2009 | |
| CN | 101537675 A | 9/2009 | |
| CN | 201813947 U | 5/2011 | |
| CN | 102273769 A | 12/2011 | |
| CN | 102481746 A | 5/2012 | |
| CN | 104256997 A | 1/2015 | |
| CN | 105025745 A | 11/2015 | |
| CN | 105476176 A | 4/2016 | |
| CN | 105595519 A | 5/2016 | |
| CN | 106939097 A | 7/2017 | |
| CN | 107048591 A | 8/2017 | |
| CN | 206808782 U | 12/2017 | |
| DE | 3440206 A1 | 5/1985 | |
| DE | 202005017043 U1 | 3/2007 | |
| DE | 102015118251 A1 | 4/2017 | |
| DM | 102274 | 8/2018 | |
| DM | 103418 | 9/2018 | |
| EM | 001286116-0005 | 7/2011 | |
| EM | 002219956-0024 | 5/2013 | |
| EM | 002772764-0015 | 2/2016 | |
| EM | 003165984-0005 | 6/2016 | |
| EM | 003039619-0034 | 7/2016 | |
| EM | 003315555-0001 | 8/2016 | |
| EM | 003316389-0001 | 8/2016 | |
| EM | 003330174-0003 | 8/2016 | |
| EM | 003344076-0002 | 9/2016 | |
| EM | 003362672-0001 | 9/2016 | |
| EM | 003718311-0019 | 2/2017 | |
| EM | 003761089-0028 | 5/2017 | |
| EM | 004363935-0008 | 10/2017 | |
| EM | 004386571-0002 | 10/2017 | |
| EM | 004366326-0001 | 11/2017 | |
| EM | 003761113-0025 | 12/2017 | |
| EM | 004675411-0006 | 1/2018 | |
| EM | 004543882-0008 | 5/2018 | |
| EM | 005243227-0002 | 5/2018 | |
| EM | 005260023-0003 | 5/2018 | |
| EM | 005278413-0002 | 5/2018 | |
| EM | 005320371-0002 | 7/2018 | |
| EM | 005841939-0004 | 12/2018 | |
| EM | 003649060-0005 | 1/2019 | |
| EM | 004352755-0004 | 1/2019 | |
| EM | 005612025-0001 | 1/2019 | |
| EM | 004812501-0004 | 2/2019 | |
| EM | 005191004-0010 | 2/2019 | |
| EM | 006335345-0003 | 4/2019 | |
| EM | 003522580-0029 | 6/2019 | |
| EM | 003649540-0001 | 7/2019 | |
| EP | 1021965 A2 | 7/2000 | |
| EP | 1164884 A1 | 1/2002 | |
| EP | 1033924 B1 | 9/2003 | |
| EP | 1563750 A1 | 8/2005 | |
| EP | 1991078 A1 | 11/2008 | |
| EP | 2103420 A2 | 9/2009 | |
| EP | 1979401 B1 | 9/2010 | |
| EP | 2490561 A1 | 8/2012 | |
| EP | 1991728 B1 | 1/2013 | |
| EP | 2611323 A1 | 7/2013 | |
| EP | 2490564 B1 | 1/2014 | |
| EP | 2786670 A1 | 10/2014 | |
| EP | 2724635 B1 | 3/2015 | |
| EP | 1796493 B1 | 4/2015 | |
| EP | 2676562 B1 | 4/2015 | |
| EP | 2611321 B1 | 8/2015 | |
| EP | 2984956 A1 | 2/2016 | |
| EP | 3001922 A1 | 4/2016 | |
| EP | 3001923 A1 | 4/2016 | |
| EP | 3027377 A1 | 6/2016 | |
| EP | 3041892 A1 | 7/2016 | |
| EP | 2197311 B1 | 8/2016 | |
| EP | 2649896 B1 | 10/2016 | |
| EP | 3078287 A1 | 10/2016 | |
| EP | 3114954 A1 | 1/2017 | |
| EP | 3114955 A1 | 1/2017 | |
| EP | 3114956 A1 | 1/2017 | |
| EP | 3114959 A1 | 1/2017 | |
| EP | 2713794 B1 | 4/2017 | |
| EP | 3186306 A1 | 7/2017 | |
| EP | 3200640 A1 | 8/2017 | |
| EP | 2467037 B1 | 10/2017 | |
| EP | 2872309 B1 | 11/2017 | |
| EP | 3267818 A1 | 1/2018 | |
| EP | 3267820 A1 | 1/2018 | |
| EP | 3267822 A1 | 1/2018 | |
| EP | 3267823 A1 | 1/2018 | |
| EP | 3267824 A2 | 1/2018 | |
| EP | 3267826 A1 | 1/2018 | |
| EP | 2910141 B1 | 2/2018 | |
| EP | 3289907 A1 | 3/2018 | |
| EP | 3302143 A1 | 4/2018 | |
| EP | 3308663 A1 | 4/2018 | |
| EP | 3318150 A1 | 5/2018 | |
| EP | 3338581 A1 | 6/2018 | |
| EP | 3346862 A1 | 7/2018 | |
| EP | 2845504 B1 | 8/2018 | |
| EP | 3352607 A1 | 8/2018 | |
| EP | 3352608 A1 | 8/2018 | |
| EP | 3352610 A1 | 8/2018 | |
| EP | 3352611 A1 | 8/2018 | |
| EP | 3352612 A1 | 8/2018 | |
| EP | 3352615 A1 | 8/2018 | |
| EP | 3338984 A3 | 9/2018 | |
| EP | 2948012 B1 | 10/2018 | |
| EP | 3391767 A1 | 10/2018 | |
| EP | B381311 A1 | 10/2018 | |
| EP | 3412164 A1 | 12/2018 | |
| EP | 3416516 A1 | 12/2018 | |
| EP | 2611322 B1 | 1/2019 | |
| EP | 3423621 A1 | 1/2019 | |
| EP | 3434128 A1 | 1/2019 | |
| EP | 3010362 B1 | 4/2019 | |
| EP | 3466291 A1 | 4/2019 | |
| EP | 3248770 B1 | 5/2019 | |
| EP | 3348160 B1 | 5/2019 | |
| EP | 3476237 A1 | 5/2019 | |
| EP | 3484320 A1 | 5/2019 | |
| EP | 3284362 B1 | 7/2019 | |
| EP | 3386334 B1 | 7/2019 | |
| EP | 3534743 A1 | 9/2019 | |
| GB | 350493 A | 6/1931 | |
| JP | 2002526126 A | 8/2002 | |

(56) References Cited

FOREIGN PATENT DOCUMENTS

| | | | |
|---|---|---|---|
| JP | 2010158511 | A | 7/2010 |
| JP | 5465814 | B1 | 4/2014 |
| JP | 2016202903 | A | 12/2016 |
| KR | 101567716 | B1 | 11/2015 |
| WO | 2006112622 | A1 | 10/2006 |
| WO | 2010021517 | A2 | 2/2010 |
| WO | 2010084367 | A1 | 7/2010 |
| WO | 2015017088 | A1 | 2/2015 |
| WO | 2000051458 | A1 | 11/2015 |
| WO | 2016030026 | A1 | 3/2016 |
| WO | 2016030333 | A1 | 3/2016 |
| WO | 2016053443 | A1 | 4/2016 |
| WO | 2016144406 | A1 | 9/2016 |
| WO | 2016144407 | A1 | 9/2016 |
| WO | 2016144408 | A1 | 9/2016 |
| WO | 2016144409 | A1 | 9/2016 |
| WO | 2016144410 | A1 | 9/2016 |
| WO | 2016144413 | A1 | 9/2016 |
| WO | 2016191109 | A1 | 12/2016 |
| WO | 2017042127 | A1 | 3/2017 |
| WO | 2017053650 | A1 | 3/2017 |
| WO | 2017053654 | A1 | 3/2017 |
| WO | 2017053658 | A1 | 3/2017 |
| WO | 2017053665 | A1 | 3/2017 |
| WO | 2017053669 | A1 | 3/2017 |
| WO | 2017053674 | A1 | 3/2017 |
| WO | 2017097315 | A1 | 6/2017 |
| WO | 2017142857 | A1 | 8/2017 |
| WO | 2017151496 | A1 | 9/2017 |
| WO | 2018011030 | A1 | 1/2018 |
| WO | 2018083676 | A1 | 5/2018 |
| WO | 2018099833 | A1 | 6/2018 |
| WO | 2018103811 | A1 | 6/2018 |
| WO | 2018169535 | A1 | 9/2018 |
| WO | 2018169537 | A1 | 9/2018 |
| WO | 2018192262 | A1 | 10/2018 |
| WO | 2019029781 | A1 | 2/2019 |
| WO | 2019073607 | A1 | 4/2019 |
| WO | 2019101339 | A1 | 5/2019 |
| WO | 2019150492 | A1 | 8/2019 |

OTHER PUBLICATIONS

Written Opinion of International Application No. PCT/EP2018/061935, mailed Jan. 18, 2019, 6 pages (English translation unavailable).

International Preliminary Report on Patentability (Form IPEA/409) of International Application No. PCT/EP2018/061935, mailed Jul. 6, 2020, 20 pages (English translation unavailable).

First Office Action from related Chinese Patent Application No. 201880093277_X dated Nov. 26, 2021 (14 pages) including English translation.

Office Action from related Japanese Patent Application No. 2020-562609 dated Dec. 21, 2021 (11 pages) Including English translation.

International Search Report of International Application No. PCT/EP2018/061934 mailed Jan. 17, 2019, 6 pages.

Written Opinion of International Application No. PCT/EP2018/061934 mailed Jan. 17, 2019, 7 pages (English translation unavailable).

International Preliminary Report on Patentability (Form IPEA/409) of International Application No. PCT/EP2018/061934, mailed Jan. 3, 2020, 24 pages (English translation unavailable).

Bicycling Catalog 39—Giant Phase 2 Road Shoe [online] <https://www.camdenbikes.com/product/giant-phase-2-road-shoe-243911-1.htm> Accessed Date: Jul. 16, 2019 (3 pages).

Bicycling Catalog 39—Line MES composite sole off-road shoe [online]: <https://www.berkshirebikeandboard.com/product/giant-line-mes-composite-sole-off-road-shoe-341091-1.htm> Accessed Date: Jul. 16, 2019 (4 pages).

Hot pressing film TPU film for bonding synthetic leather and mesh fabric together on shoes upper [online] <https://www.alibaba.com/product-detail/hot-pressing-film-TPU-film-for_60164856956.html> Accessed Date: Jul. 16, 2019 (5 pages).

* cited by examiner

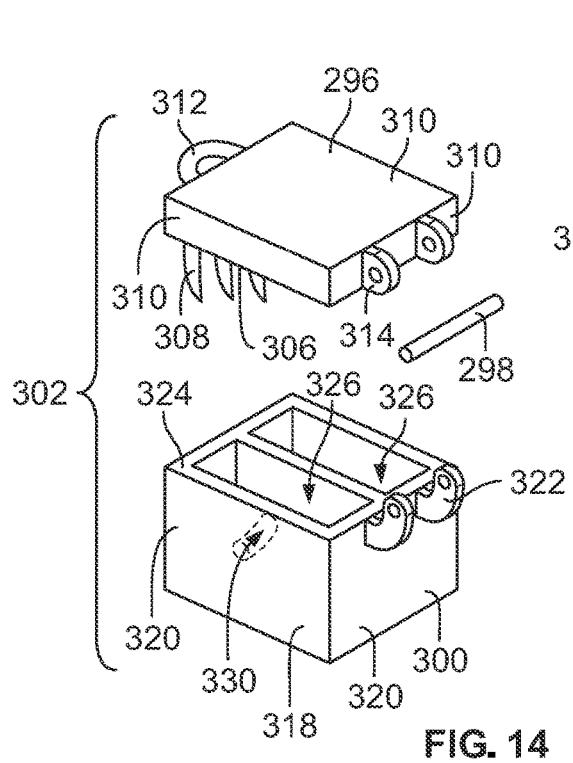
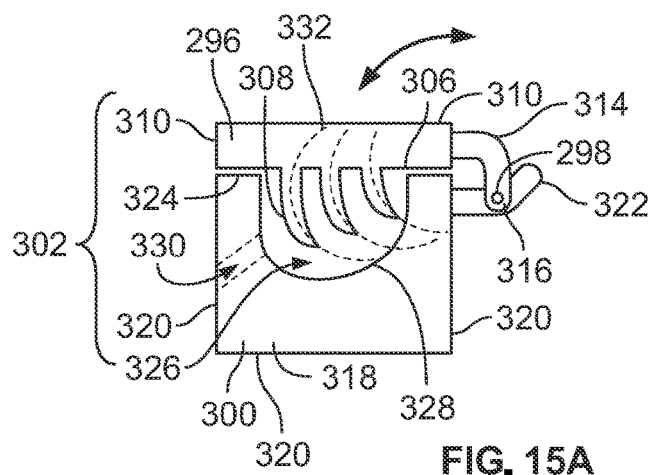
FIG. 15A
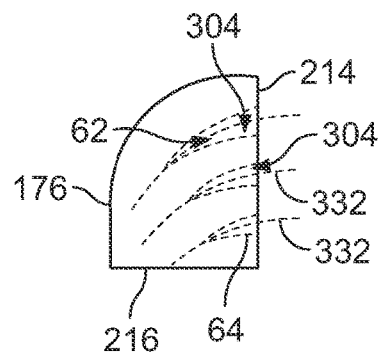
FIG. 14
FIG. 15B
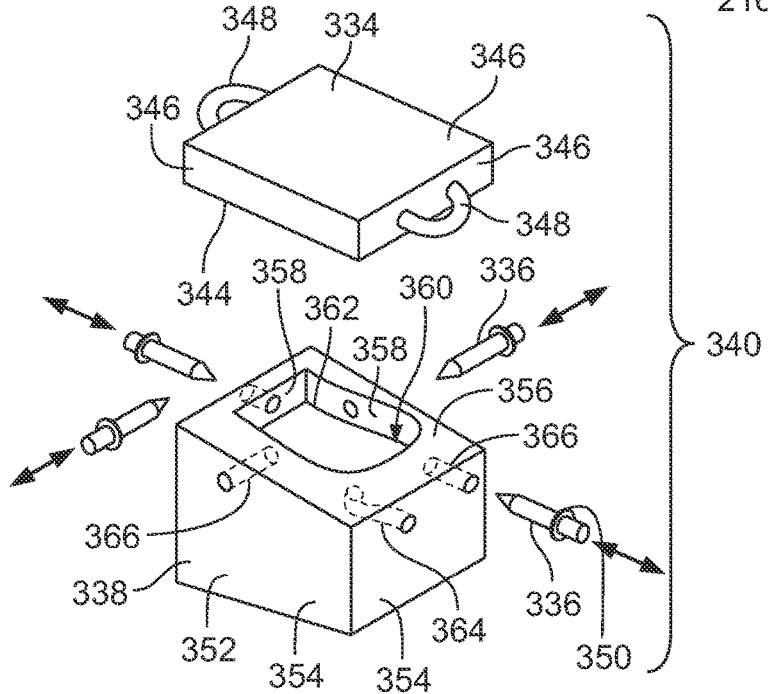
FIG. 16

METHOD FOR PRODUCING A SOLE OF A SHOE

CROSS REFERENCE TO RELATED APPLICATIONS

Not applicable

REFERENCE REGARDING FEDERALLY SPONSORED RESEARCH OR DEVELOPMENT

Not applicable

SEQUENCE LISTING

Not applicable

BACKGROUND

1. Field of the Disclosure

The present disclosure relates generally to a method of producing a sole for an article of footwear with a sole structure having voids with auxetic properties, which allows for programmable deforming or collapsing of various portions or regions of the sole structure to create a controlled spring-like or dampening effect for a wearer.

2. Description of the Background

Many conventional shoes or other articles of footwear generally comprise an upper and a sole attached to a lower end of the upper. Conventional shoes further include an internal space, i.e., a void or cavity, which is created by interior surfaces of the upper and sole, that receives a foot of a user before securing the shoe to the foot. The sole is attached to a lower surface or boundary of the upper and is positioned between the upper and the ground. As a result, the sole typically provides stability and cushioning to the user when the shoe is being worn. In some instances, the sole may include multiple components, such as an outsole, a midsole, and an insole. The outsole may provide traction to a bottom surface of the sole, and the midsole may be attached to an inner surface of the outsole, and may provide cushioning or added stability to the sole. For example, a sole may include a particular foam material that may increase stability at one or more desired locations along the sole, or a foam material that may reduce stress or impact energy on the foot or leg when a user is running, walking, or engaged in another activity.

The upper generally extends upward from the sole and defines an interior cavity that completely or partially encases a foot. In most cases, the upper extends over instep and toe regions of the foot, and across medial and lateral sides thereof. Many articles of footwear may also include a tongue that extends across the instep region to bridge a gap between edges of medial and lateral sides of the upper, which define an opening into the cavity. The tongue may also be disposed below a lacing system and between medial and lateral sides of the upper, to allow for adjustment of shoe tightness. The tongue may further be manipulable by a user to permit entry or exit of a foot from the internal space or cavity. In addition, the lacing system may allow a user to adjust certain dimensions of the upper or the sole, thereby allowing the upper to accommodate a wide variety of foot types having varying sizes and shapes.

The upper may comprise a wide variety of materials, which may be chosen based on one or more intended uses of the shoe. The upper may also include portions comprising varying materials specific to a particular area of the upper. For example, added stability may be desirable at a front of the upper or adjacent a heel region to provide a higher degree of resistance or rigidity. In contrast, other portions of a shoe may include a soft woven textile to provide an area with stretch-resistance, flexibility, air-permeability, or moisture-wicking properties.

Conventional shoes, which includes athletic shoes, are used in a wide variety of situations. For instance, nurses prefer shoes with extra cushion. Tennis players prefer shoes that move well in a lateral motion. Wearers suffering from pes planus (a.k.a. flat feet) often add inserts to their shoes to provide more targeted support. Runners prefer shoes that are light yet still have good cushion, and function well in bad conditions, such as mud. This wide variety of uses for a wide variety of users leads to a desire for a shoe that has as wide of a variety of cushioning, spring-back and rigidity along different areas, orientations, and zones of the shoe as possible.

Therefore, articles of footwear having sole structures that include alternative cushioning features are desired. To facilitate the production of sole structures that include alternative cushioning features, a method for producing a sole of an article of footwear is disclosed that provides a way to produce a wide variety of alternative cushioning features in the sole of an article of footwear. By forming the sole from of an outsole and one or more midsole components, a wide variety of cushioning structures with varying cushioning, spring-back and rigidity along different areas, orientations and zones of the sole can be achieved. A method to produce various midsole components from a mold that has cushioning features in the form of channels is disclosed. The channels take advantage of the auxetic properties of the material used to form the midsole components. The various channels provide various ways to select cushioning characteristics for the sole that can vary along the width of the sole, and can vary along different angles of orientation with respect to the sole. This variety of channels in a wide array of assemblies of midsole components provides a way to cater the cushioning, spring-back and rigidity of the sole of the article of footwear to a great degree. These and other deficiencies with the prior art are outlined in the following disclosure.

SUMMARY

A number of advantages of the articles of footwear described herein will be apparent to those having ordinary skill in the art. For example, various void structures defined within a sole structure can allow for programmable deformation of a midsole based on the placement and arrangement of voids comprising the void structures. The void structures may be provided in combination with features along an outsole, which may aid in enhanced cushioning during running or other strenuous activities. Still further, alternative void structure configurations as described herein may be utilized to achieve some of the benefits of the midsoles specifically shown and described. The various elements and combination of elements within the articles of footwear described herein add varying athletic benefits to the shoe, such as dampening, spring-like effects, or pronation support.

In some embodiments, a method of using a marriage mold includes providing an upper plate with a first wall and at least one second wall, as well as providing a lower plate with a marriage cavity and a top wall. The method further provides at least two midsole components made of a first material. The at least two midsole components each have a first void structure, and a first region. The method further provides that the at least two midsole components are positioned into the marriage cavity. The method further provides that the upper plate is secured to the lower plate such that the top wall and the first wall form a seal. The at least two midsole components join together to form a midsole with a second void structure.

In some embodiments, a method of using a marriage mold includes further providing the step of providing an outsole with a second region. The assembly of the first regions together form a profile that is substantially the same as the second region of the outsole. The outsole is positioned into the marriage cavity along with the at least two midsole components, and then are joined to form a sole. In some embodiments, the first void structure forms at least one channel in each of the at least two midsole components. In some embodiments, each of the at least two midsole components exhibit an auxetic property. In some embodiments, the auxetic property comprises a programmable deformation, such that when a compressive force is applied to the first material of the at least two midsole components, the first material will contract, and is drawn inward in a direction that is transverse to the compressive force.

In some embodiments, the sole is withdrawn from the lower plate or the upper plate after the sole has cooled sufficiently such that the sole maintains the shape of the sole outside the sealed cavity. In some embodiments, the sole is withdrawn from the lower plate or the upper plate after a pre-determined amount of time has elapsed. In some embodiments, the marriage mold has two or more marriage cavities. In some embodiments, the outsole and the at least two midsole components are joined together to form a sole by the injection, pouring, or spraying of a liquid plastic material. In some embodiments, the lower plate has a plurality of exterior walls, at least one cavity wall, an at least one injection passage, and a body. The at least one injection passage begins at and extends from one of the plurality of exterior walls, through the body, and fluidly connects to each of the corresponding at least one cavity walls.

In some embodiments, a method of using a midsole components mold includes providing an upper plate and a lower plate. The upper plate has a first wall, at least one second wall, and a plurality of mandrels that project from the first wall. The lower plate has a top wall, a body, a plurality of exterior walls, and at least one cavity with at least one corresponding cavity wall. The upper plate is secured to the lower plate to form a seal, and wherein at least one midsole component is formed in the at least one cavity, and is formed of a first material and has a void structure when a liquid plastic material is injected, poured, or sprayed into the at least one cavity.

In some embodiments, the intersection of the top wall and the at least one cavity wall forms an edge. A first point and a second point are defined as the points on the edge most distal from one another, and a third point is defined as the point equally most distal to the first point and the second point on the edge. An insertion plane is defined as the plane that intersects the first point, the second point, and the third point. In some embodiments, the plurality of mandrels project from the first wall in a direction that is substantially perpendicular or normal to the insertion plane when the upper plate is secured to the lower plate to form a seal. In some embodiments, the lower plate has an injection passage.

In some embodiments, the injection passage begins at and projects from at least one of the plurality of exterior walls, through the body, and is fluidly connected to the at least one cavity.

In some embodiments, a sole for an article of footwear includes an outsole, a left midsole component, and a right midsole component. The outsole has a first region, the left midsole component has a second region, and the right midsole component has a third region. The second region and the third region assembled together are substantially the same size and shape as the first region. The outsole, the left midsole component, and the right midsole component are joined together. In some embodiments, the sole has a sole structure with elongated voids that form at least one channel. In some embodiments, the sole has a medial surface and a lateral surface, and the at least one channel extends from the medial surface to the lateral surface. In some embodiments, a first channel extends from a first wall of the left midsole component to a second wall of the left midsole component. In some embodiments, a first channel extends from a first wall of the left midsole component but does not extend to a second wall of the left midsole component. In some embodiments, the left midsole component has a first channel having a taper of two degrees or more along the length of the first channel. In some embodiments, the left midsole component has a first channel having a taper of less than two degrees along the length of the first channel. In some embodiments, the sole formed has a sole structure that exhibits auxetic properties.

Other aspects of the articles of footwear described herein, including features and advantages thereof, will become apparent to one of ordinary skill in the art upon examination of the figures and detailed description herein. Therefore, all such aspects of the articles of footwear are intended to be included in the detailed description and this summary.

BRIEF DESCRIPTION OF THE DRAWINGS

FIG. 14 is a perspective, exploded view of an upper plate, a hinge bar, and a lower plate of a fifth mold that is configured to produce midsole components having curved channels;

FIG. 15A is a side view of the mold of FIG. 14;

FIG. 15B is a side view of a midsole component having curved channels therein that has been made using the fifth mold of FIG. 14;

FIG. 16 is a perspective, exploded view of an upper plate, four volume elements or mandrels, and a lower plate of a sixth mold that is configured to produce midsole components having ray configuration channels;

DETAILED DESCRIPTION OF THE DRAWINGS

Figure 1:
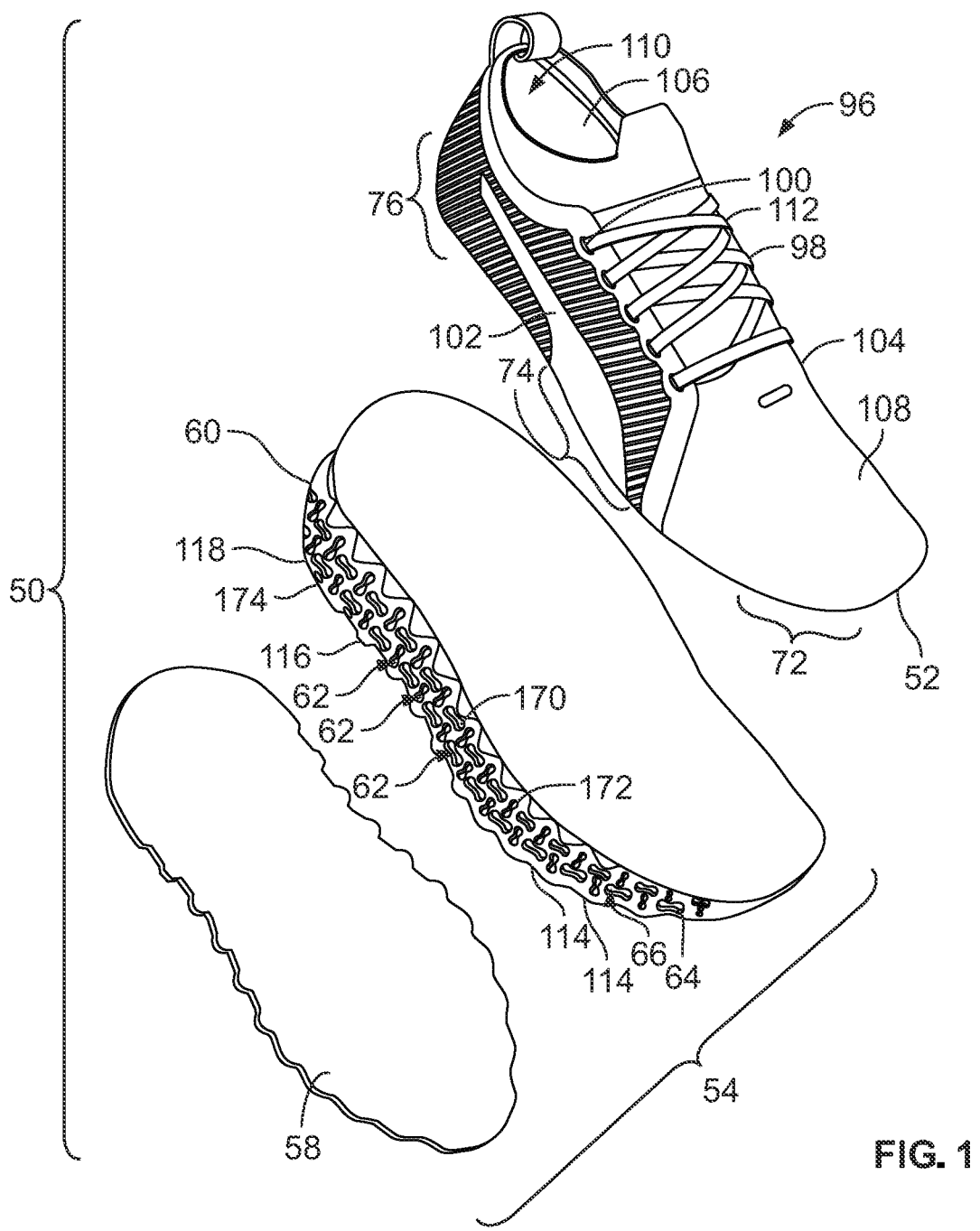
FIG. 1 is a perspective, exploded view of an article of footwear or shoe having a sole that is made in accordance with the present disclosure, the article of footwear including an upper, a midsole with a plurality of channels extending therethrough, and an outsole.

The following discussion and accompanying figures disclose various embodiments or configurations of a shoe having an upper and a sole structure. Although embodiments are disclosed with reference to a sports shoe, such as a running shoe, tennis shoe, basketball shoe, etc., concepts associated with embodiments of the shoe may be applied to a wide range of footwear and footwear styles, including basketball shoes, cross-training shoes, football shoes, golf shoes, hiking shoes, hiking boots, ski and snowboard boots, soccer shoes and cleats, walking shoes, and track cleats, for example. Concepts of the shoe may also be applied to articles of footwear that are considered non-athletic, including dress shoes, sandals, loafers, slippers, and heels.

The term "about," as used herein, refers to variations in the numerical quantity that may occur, for example, through typical measuring and manufacturing procedures used for articles of footwear or other articles of manufacture that may include embodiments of the disclosure herein; through inadvertent error in these procedures; through differences in the manufacture, source, or purity of the ingredients used to make the compositions or mixtures or carry out the methods; and the like. Throughout the disclosure, the terms "about" and "approximately" refer to a range of values ±5% of the numeric value that the term precedes.

The present disclosure is directed to an article of footwear or specific components of the article of footwear, such as an upper or a sole structure. More specifically, the present disclosure describes a method of molding a sole, an outsole, and various midsole components using various molds. In addition, an assembled article of athletic footwear, the sole, the outsole, and various midsole components are also described. The various midsole components have void structures defined by voids within the respective midsole components. The upper may comprise a knitted component, a woven textile, a non-woven textile, leather, mesh, suede, or a combination of one or more of the aforementioned materials. The knitted component may be made by knitting of yarn, the woven textile by weaving of yarn, and the non-woven textile by manufacture of a unitary non-woven web. Knitted textiles include textiles formed by way of warp knitting, weft knitting, flat knitting, circular knitting, or other suitable knitting operations. The knit textile may have a plain knit structure, a mesh knit structure, or a rib knit structure, for example. Woven textiles include, but are not limited to, textiles formed by way of any of the numerous weave forms, such as plain weave, twill weave, satin weave, dobbin weave, jacquard weave, double weaves, or double cloth weaves, for example. Non-woven textiles include textiles made by air-laid or spun-laid methods, for example. The upper may comprise a variety of materials, such as a first yarn, a second yarn, or a third yarn, which may have varying properties or varying visual characteristics.

Figure 19A:
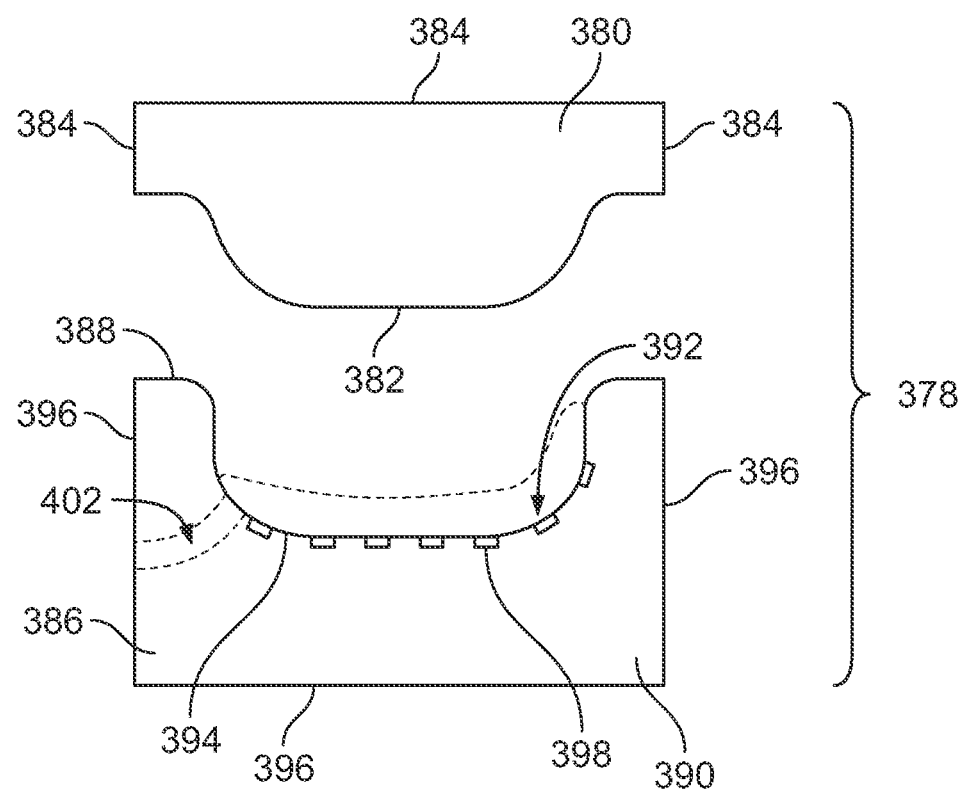
FIG. 19A is a side view of an outsole mold.
Figure 19B:
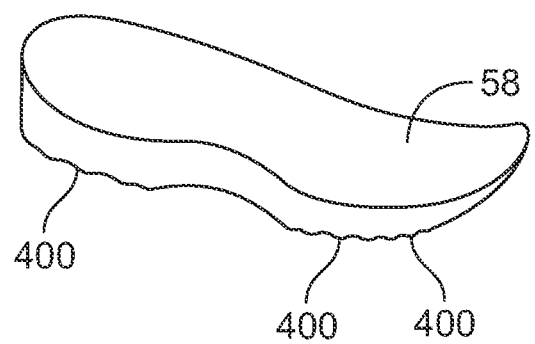
FIG. 19B is a perspective view of an outsole that has been made with the outsole mold of FIG. 19A.
Figure 20A:
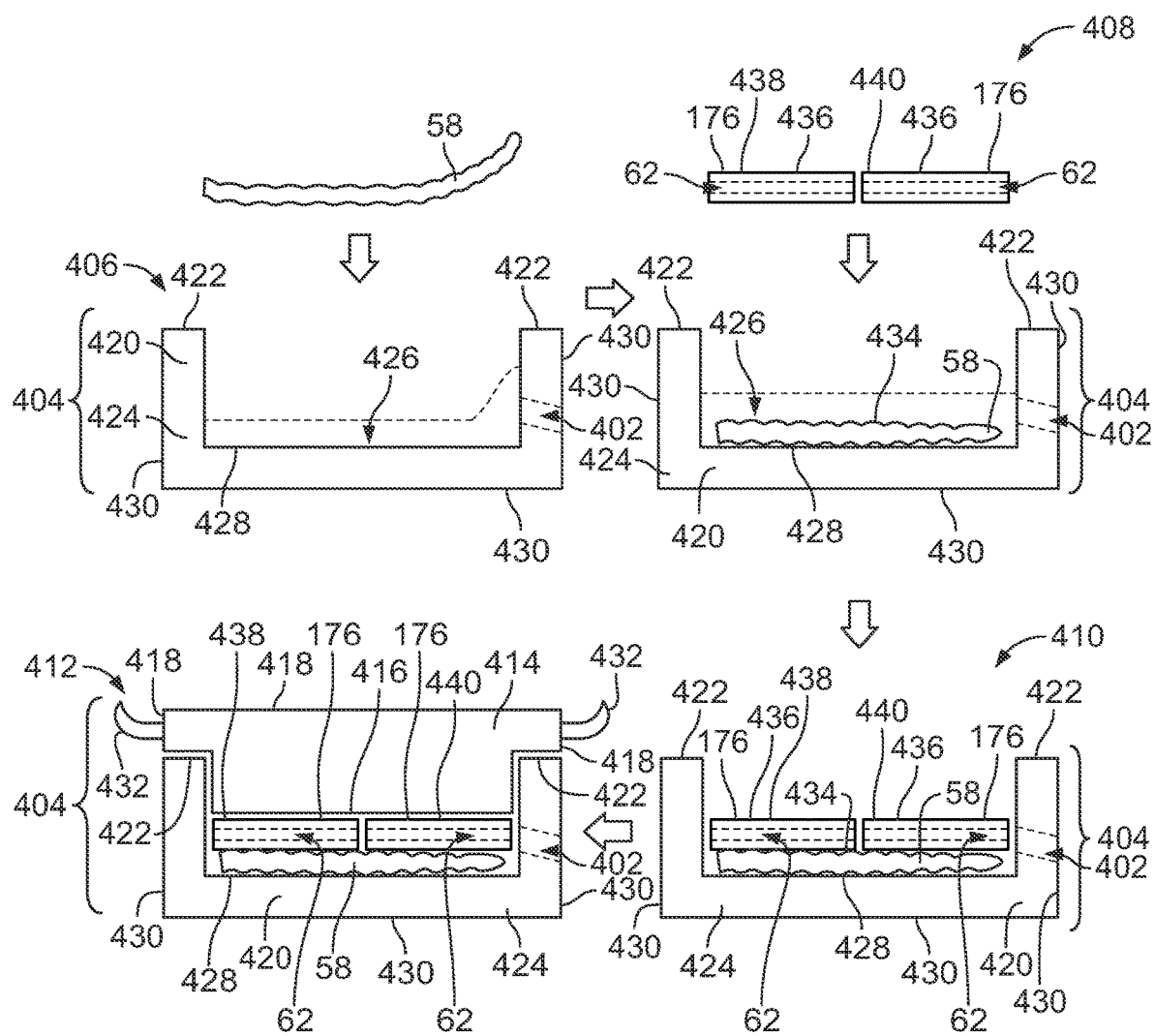
FIG. 20A is a side view of a sequence of processes utilizing a marriage mold.
Figure 20B:
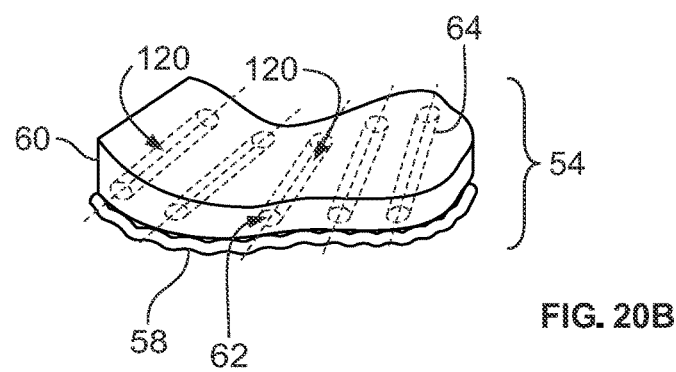
FIG. 20B is a perspective view of a sole having normal channels therein that has been made with the mold of FIG. 20A.

As a general overview for the following description, FIGS. 1-5 disclose articles of footwear and components thereof in accordance with the present disclosure. FIG. 6 is a graph that illustrates the displacement of various auxetic materials compared against an amount of force applied. FIGS. 7A-18B disclose six molds that produce various midsole components along with the various midsole components. FIGS. 19A and 19B discloses an outsole mold and an outsole produced using the outsole mold. FIGS. 20A and 20B discloses a marriage mold and a sole produced using the marriage mold. FIGS. 21-24 disclose step diagrams to utilize the outsole mold, the six molds that produce various midsole components, and the marriage mold. FIG. 25 is a flow chart that illustrates the flow of production of the midsole components, the outsole, and the sole produced by a midsole components mold station, an outsole mold station, and a marriage mold station respectively. FIGS. 26-41B illustrate various assemblies of midsole components that provide examples of the various soles that can be produced utilizing the aforementioned molds.

Figure 2:
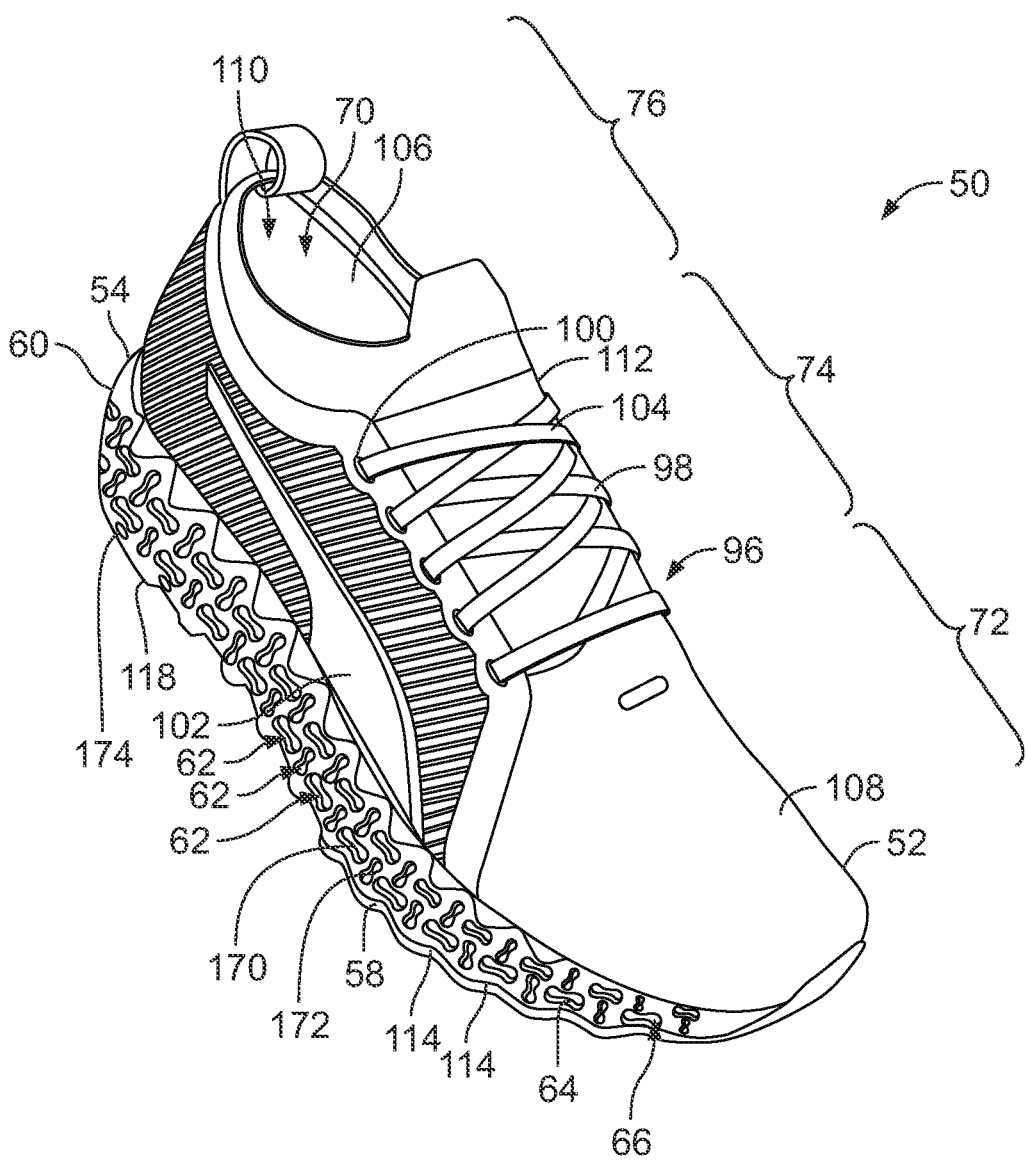
FIG. 2 is a perspective view of the article of footwear of FIG. 1 in an assembled configuration.

Referring now to FIGS. 1 and 2, an exemplary embodiment of an article of footwear or shoe 50 is shown, which is configured as a right shoe, and includes an upper 52 and a sole or sole structure 54. However, in some figures the article of footwear 50 is shown as a left shoe, and the exemplary embodiment encompasses a left shoe (not shown) as well. FIG. 1 depicts the shoe 50 in a perspective exploded view, and includes the upper 52 and the sole 54, the sole 54 further comprising an outsole 58 and a midsole 60. The midsole 60 and the corresponding outsole 58 have substantially the same area. To that end, the midsole 60 and the outsole 58 have a shape and size when measured from a top view of the midsole 60 that is substantially similar to a shape and size when measured from a top view of the outsole 58. The outsole 58 and the midsole 60 are combined as shown in FIG. 2 to form the sole 54.

FIG. 2 is a perspective view of the shoe 50 with the upper 52 and the sole 54 assembled together to form the right shoe 50. The midsole 60 is shown with a void structure 62 comprising a plurality of voids 64, the voids 64 defining a pattern that provides for enhanced cushioning or programmable deformation of the sole 54 in accordance with the present disclosure. Programmable deformation includes fashioning the voids 64 and/or the sole material so that the sole deforms in a predictable, repeatable manner when subjected to forces applied from a given direction. The voids 64 extend in a first direction and define channels 66 within the midsole 60. The material of the midsole 60 that surrounds and defines the void structure 62 comprises any known material for making midsoles. The upper 52 is attached to the sole structure 54 and together with the sole structure 54 defines an interior cavity 70 (the interior cavity 70 is shown in FIG. 2 for clarity) into which a foot of a user may be inserted. For reference, the shoe 50 defines a forefoot region 72, a midfoot region 74, and a heel region 76 (See FIGS. 2, 3).

Figure 3:
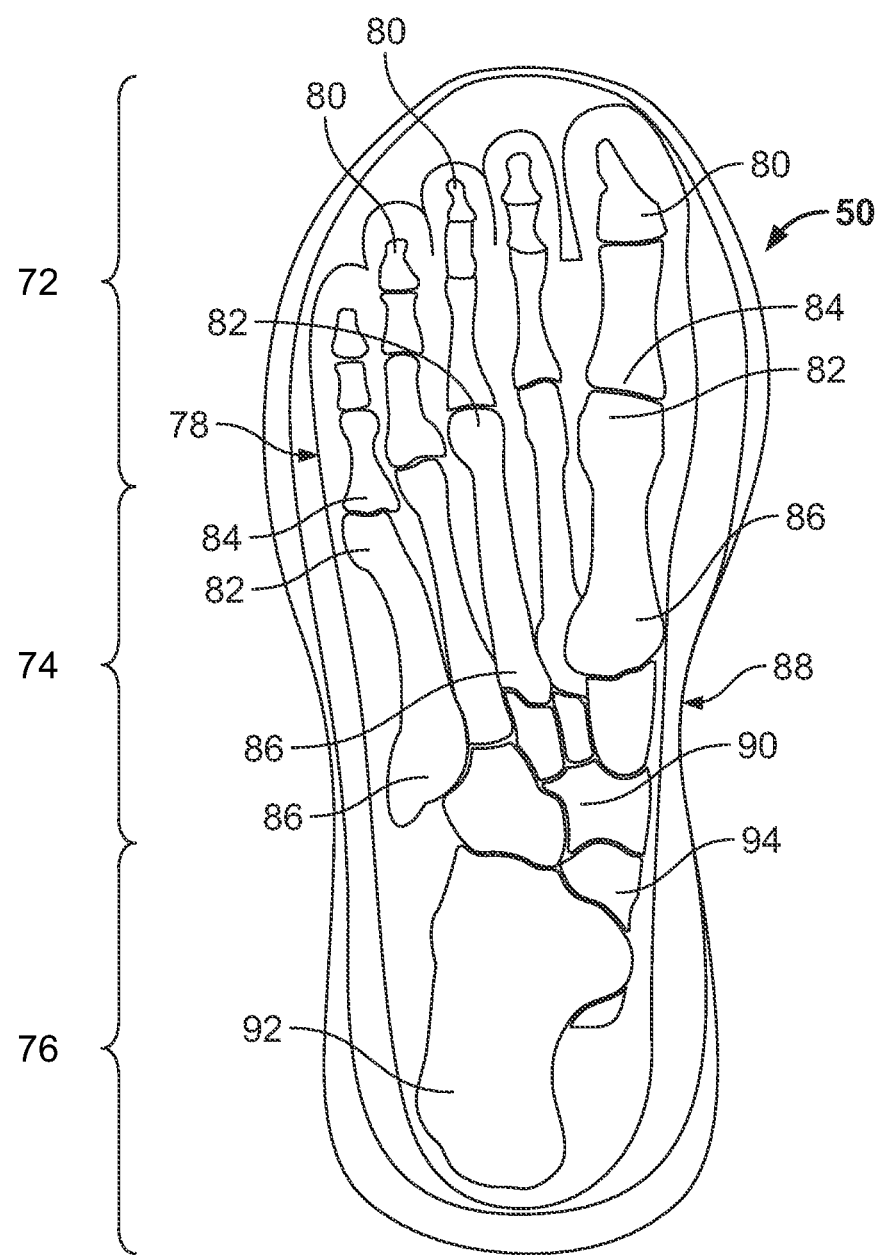
FIG. 3 is a top plan view of the article of footwear of FIG. 1, with an upper removed and a user's skeletal foot structure overlaid thereon.

Referring to FIG. 3, the forefoot region 72 generally corresponds with portions of the shoe 50 that encase portions of a foot 78 that include a set of toes or phalanges 80, a ball 82 of the foot 78, and a set of joints 84 connecting a set of metatarsals 86 with the toes 80. The midfoot region 74 is proximate and adjoining the forefoot region 72, and generally corresponds with portions of the article of footwear 50 that encase an arch 88 of the foot 78, along with a bridge 90 of the foot 78. The heel region 76 is proximate and adjoining the midfoot region 74 and generally corresponds with portions of the article of footwear 50 that encase rear portions of the foot 78, including a heel or calcaneus bone 92, an ankle 94, or an Achilles tendon (not shown). While the present disclosure relates to right and left shoes 50 that are substantially the same, in some embodiments there may be differences between the left and right shoes 50 other than the left/right configuration. Further, in some embodiments, the left shoe 50 may include one or more additional elements that the right shoe 50 does not include, or vice versa.

Referring specifically to the shoe 50 of FIG. 2, the upper 52 is shown disposed above and coupled with the sole 54. The upper 52 could be formed conventionally from multiple elements, e.g., textiles, polymer foam, polymer sheets, leather, or synthetic leather, which are joined through bonding or stitching at a seam. In some embodiments, the upper 52 is formed from a knitted structure or knitted components. In various embodiments, a knitted component may incorporate various types of yarn that may provide different properties to an upper 52. For example, an upper mesh layer may be warp knit, while a mesh backing layer may comprise a circular knit. In some embodiments, various layers of the upper 52 are heat pressed together so as to bond the various layers of the upper 52.

With reference to the material(s) that comprise the upper 52, the specific properties that a particular type of yarn will impart to an area of a knitted component may at least partially depend upon the materials that form the various filaments and fibers of the yarn. For example, cotton may provide a soft effect, biodegradability, or a natural aesthetic to a knitted material. Elastane and stretch polyester may each provide a knitted component with a desired elasticity and recovery. Rayon may provide a high luster and moisture absorbent material, wool may provide a material with an increased moisture absorbance, nylon may be a durable material that is abrasion-resistant, and polyester may provide a hydrophobic, durable material.

Other aspects of a knitted component may also be varied to affect the properties of the knitted component and provide desired attributes. For example, a yarn forming a knitted component may include monofilament yarn or multifilament yarn, or the yarn may include filaments that are each formed of two or more different materials. In addition, a knitted component may be formed using a particular knitting process to impart an area of a knitted component with particular properties. Accordingly, both the materials forming the yarn and other aspects of the yarn may be selected to impart a variety of properties to particular areas of the upper 52. In some embodiments, an elasticity of a knit structure may be measured based on comparing a width or length of the knit structure in a first, non-stretched state to a width or length of the knit structure in a second, stretched state after the knit structure has a force applied to the knit structure in a lateral direction. In some embodiments, the properties associated with an upper, e.g., a stitch type, a yarn type, or characteristics associated with different stitch types or yarn types, such as elasticity, aesthetic appearance, thickness, air permeability, or scuff-resistance, may be varied.

Still referring to FIGS. 1 and 2, the article of footwear 50 also includes a tightening system 96 that includes a lace 98 and a plurality of eyelets 100. The tightening system 96 may allow a user to modify dimensions of the upper 52, e.g., to tighten or loosen portions of the upper 52, around a foot 78 (see FIG. 3) as desired by the wearer. In other embodiments, the tightening system 96 may be a hook-and-loop fastening system, such as Velcro®. For example, in some embodiments, the tightening system 96 may include one or more hook-and-loop fastening straps. In some embodiments, the tightening system 96 may be another laceless fastening system known in the art. In still further embodiments, the tightening system 96 may include a different manual lacing system or an automatic lacing system, such as the lacing system described in U.S. patent application Ser. No. 16/392, 470, filed on Apr. 23, 2019, which is hereby incorporated by reference in its entirety.

Referring to FIG. 2, the article of footwear 50 defines a lateral side 102 and a medial side 104, and the lace 98 extends from the lateral side 102 to the medial side 104. When a user is wearing the shoe 50, the lateral side 102 corresponds with an outside-facing portion of the article of footwear 50 while the medial side 104 corresponds with an inside-facing portion of the article of footwear 50. As such, a left shoe (not shown) and the right shoe 50 have opposing lateral sides and medial sides, such that the medial sides are closest to one another when a user is wearing the shoes, while the lateral sides are defined as the sides that are farthest from one another while the shoes are being worn. The medial side 104 and the lateral side 102 adjoin one another at opposing, distal ends of the article of footwear 50.

Referring again to FIG. 1, the upper 52 extends along the lateral side 102 and the medial side 104, and across the forefoot region 72, the midfoot region 74, and the heel region 76 to house and enclose the foot 78 (see FIG. 3) of a user. When fully assembled, the upper 52 also includes an interior surface 106 and an exterior surface 108. The interior surface 106 faces inward and generally defines the interior cavity 70 (see FIG. 2), and the exterior surface 108 of the upper 52 faces outward and generally defines an outer perimeter or boundary of the upper 52. The interior surface 106 and the exterior surface 108 may comprise portions of the upper layers disclosed above. The upper 52 also includes an opening 110 that is at least partially located in the heel region 76 of the article of footwear 50, and provides access to the interior cavity 70 and through which the foot 78 may be inserted and removed. In some embodiments, the upper 52 may also include an instep area 112 that extends from the opening 110 in the heel region 76 over an area corresponding to an instep of a foot 78 to an area adjacent the forefoot region 72.

Referring to FIG. 2, the sole 54 is shown in detail. The sole 54 of the present embodiment is formed to provide an enhanced or a different athletic benefit such as, e.g., trampoline effect, dampening, or pronation support. A plurality of notches 114 (see FIGS. 1, 2 and 4) are defined within the midsole 60, and the outsole 58 extends across the plurality of notches 114. The sole 54 includes the void structure 62, which comprises the plurality of voids 64 that are provided in alternating configurations. In some embodiments, each of the voids 64 extends or is elongated along the entire width of the sole 54 forming a channel 66. The voids 64 extend through the midsole 60 of the sole 54, while the outsole 58 is shown extending from a bottom surface 116 (see FIG. 1) of the midsole 60. An insole (not shown) is included, and may be connected to an interior surface of the article of footwear 50. The insole may be positioned to be in direct contact with a user's foot 78 while the shoe 50 is being worn.

In some embodiments (not shown), the outsole 58 does not extend across some of the notches 114 that are disposed within the midfoot region 74. In some embodiments, the outsole 58 may not extend across more or fewer of the notches 114. While FIG. 2 includes eleven of the notches 114 along the sole 54, more or fewer of the notches 114 may be included. For example, there may be between four notches 114 and eighteen notches 114, or between six notches 114 and sixteen notches 114, or between eight notches 114 and fourteen notches 114. The heel region 76 also includes a generally flat portion 118. The various notches 114 are positioned in combination with the voids 64 to provide enhanced and pre-determined cushioning features to the shoes 50.

In some instances, the outsole 58 may be defined as a portion of the sole 54 that at least partially contacts an exterior surface, e.g., the ground, when the articles of footwear 50 are worn. The insole (not shown) may be defined as a portion of the sole structure 54 that at least partially contacts a user's foot when the article of footwear 50 is worn. Finally, the midsole 60 may be defined as at least a portion of the sole 54 that extends between and connects the outsole region with the insole region. The midsole 60 may comprise a variety of materials, such as EVA Foam, e.g., PUMA Profoam Lite™. In some embodiments, polyurethane may be used within the midsole 60. In some embodiments, the midsole 60 or portions of the midsole 60 may comprise beads or pellets comprising particle foams such as eTPU or eTPE-E. Further, a dual- or multi-density midsole 60 may be used in some embodiments. In some embodiments, the midsole 60 comprises a gel. Further, in some embodiments, the midsole 60 comprises rubber. Still further, in some embodiments, the midsole 60 comprises a supercritical foam.

Still referring to FIG. 2, the void structure 62, in combination with the various notches 114 defined within and by the outsole 58, provide mechanical cushioning to the sole structure 54. As will be discussed in greater detail hereinafter below, the voids 64 of the void structure 62 are positioned such that the voids 64 allow the sole 54 to behave as an auxetic material, i.e., a structure having auxetic properties. Auxetic structures have high energy absorption when compressed and expand for more flexibility, and generally comprise structures or materials that have a negative Poisson's ratio. Generally, when an auxetic material is stretched, the material becomes thicker in a direction that is perpendicular to the applied force. As a result, under a tensile load, a material that exhibits auxetic properties will expand in a direction that is transverse to the direction of the load. The same principle applies when a compressive force is applied to an auxetic material, which in the present disclosure occurs when a wearer of the shoe 50 applies a downward force by taking a step to impact the ground.

When a compressive force is applied to an auxetic material, the material will contract, and is drawn inward in a direction that is transverse to the load. The deformation of auxetic structures occurs due to the particular internal structure of various voids and/or flexure arrangements. In the embodiment of FIG. 1, at least some of the voids 64 behave with auxetic characteristics, and are distributed in such an arrangement that the sole 54 programmably deforms when a downward, axial force is applied to the sole 54. The specific placement and arrangement of the various voids 64 depends on a desired amount of compression within a particular region of the sole 54, and the deformation of at least some of the voids 64 causes material that forms the sole 54 to be drawn inward, toward a center of the sole 54. With respect to the soles 54 discussed herein, implementing an auxetic void structure 62 results in less material being required to achieve a desired compression of the sole 54, which reduces an overall weight of the shoe 50. Reducing the weight of the sole 54 is a desirable outcome for wearers of shoes that engage in a number of activities, such as running, football, basketball, etc.

While the right shoe 50 shown in FIGS. 1 and 2 includes a sole 54 having superior cushioning properties due to the particular configuration of the void structure 62 therein, the present disclosure is directed to a variety of alternative void structures 62 (see also FIGS. 5, 6, 7B, 9B, and 11B) having varying void patterns that could be implemented within the sole 54 (see FIG. 6). As will be discussed in greater detail hereinafter below, the particular configuration of the voids 64 shown in FIG. 1 (and also FIG. 6) has been developed based on data collection and analysis related to pressure points and forces applied to the sole 54 to develop a structure for progressive cushioning. The sole 54 of the shoe 50 implements voids that define negative space resembling a lemniscate, i.e., an infinity sign or the outer profile of a "FIG. 8", and a structure that comprises foam, such as the materials discussed above. However, the void structure 62 can embody voids 64 and channels 66 that have a different cross-sectional shape than lemniscate, such as circular. The elongated voids 64 are cavities that form channels 66.

Figure 4:
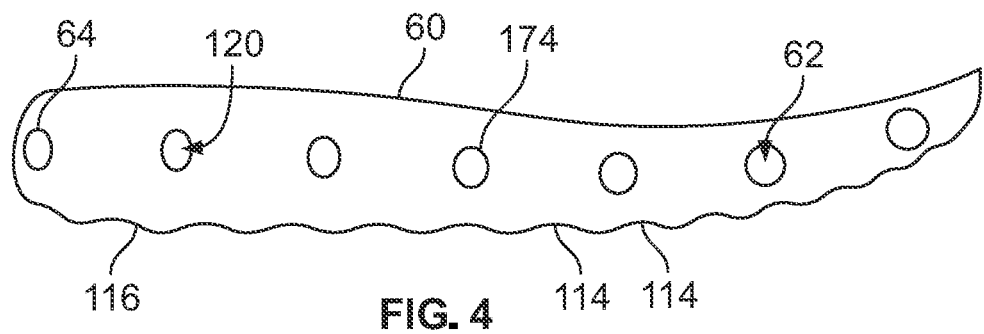
FIG. 4 is a side view of a midsole with a single row with multiple columns of perpendicular or normal channels shown extending therethrough.

Referring now to FIG. 4, although the midsole 60 of FIG. 4 has only a single row of voids 64, the midsole 60 of FIG. 2 has more than a single column of the voids 64. The voids 64 are elongated or extend along a width of the midsole 60 to form normal or perpendicular channels 120 therein (see FIGS. 7A and 7B for a further discussion regarding normal channels 120). The notches 114 are shown on the bottom of the midsole 60. In comparison, FIG. 2 has several rows of voids 64 that are staggered with respect to the adjacent rows above and below such that one particular row of voids 64 is offset from the next row of voids 64 directly above and below. The contours or notches 114 on the bottom side of the midsole of FIG. 4 face the outsole 58, and serve to improve the securing of the midsole 60 and the outsole 58 (see FIG. 2) to one another.

Figure 5:
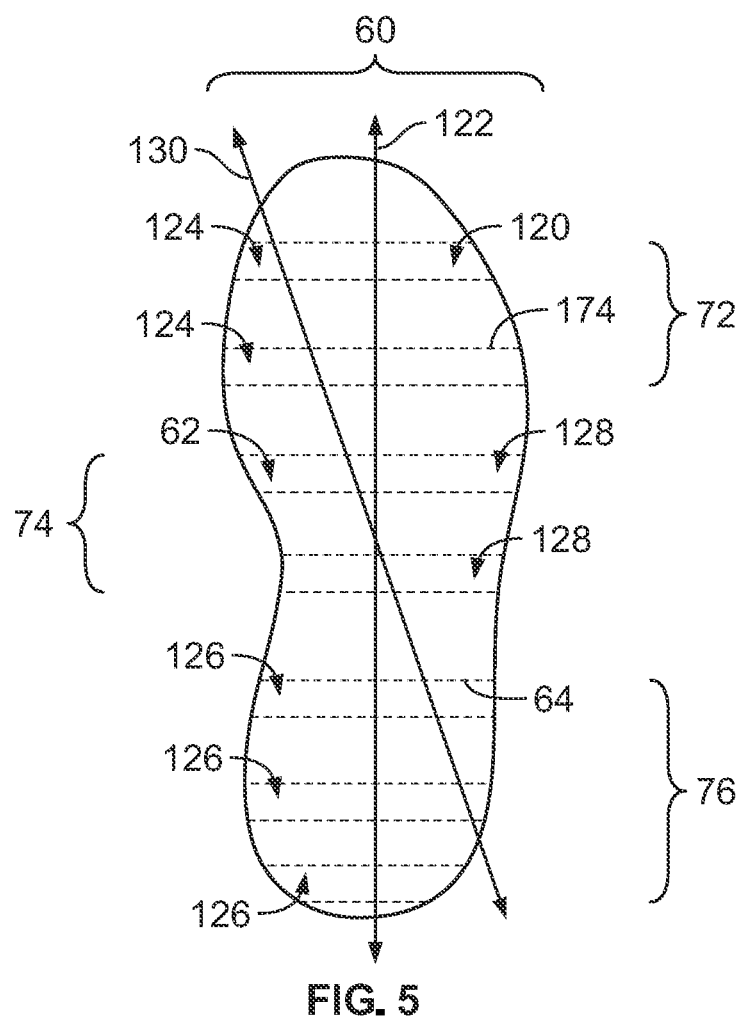
FIG. 5 is a top plan view of the midsole of FIG. 4 with the normal channels shown in dashed lines.
Figure 6:
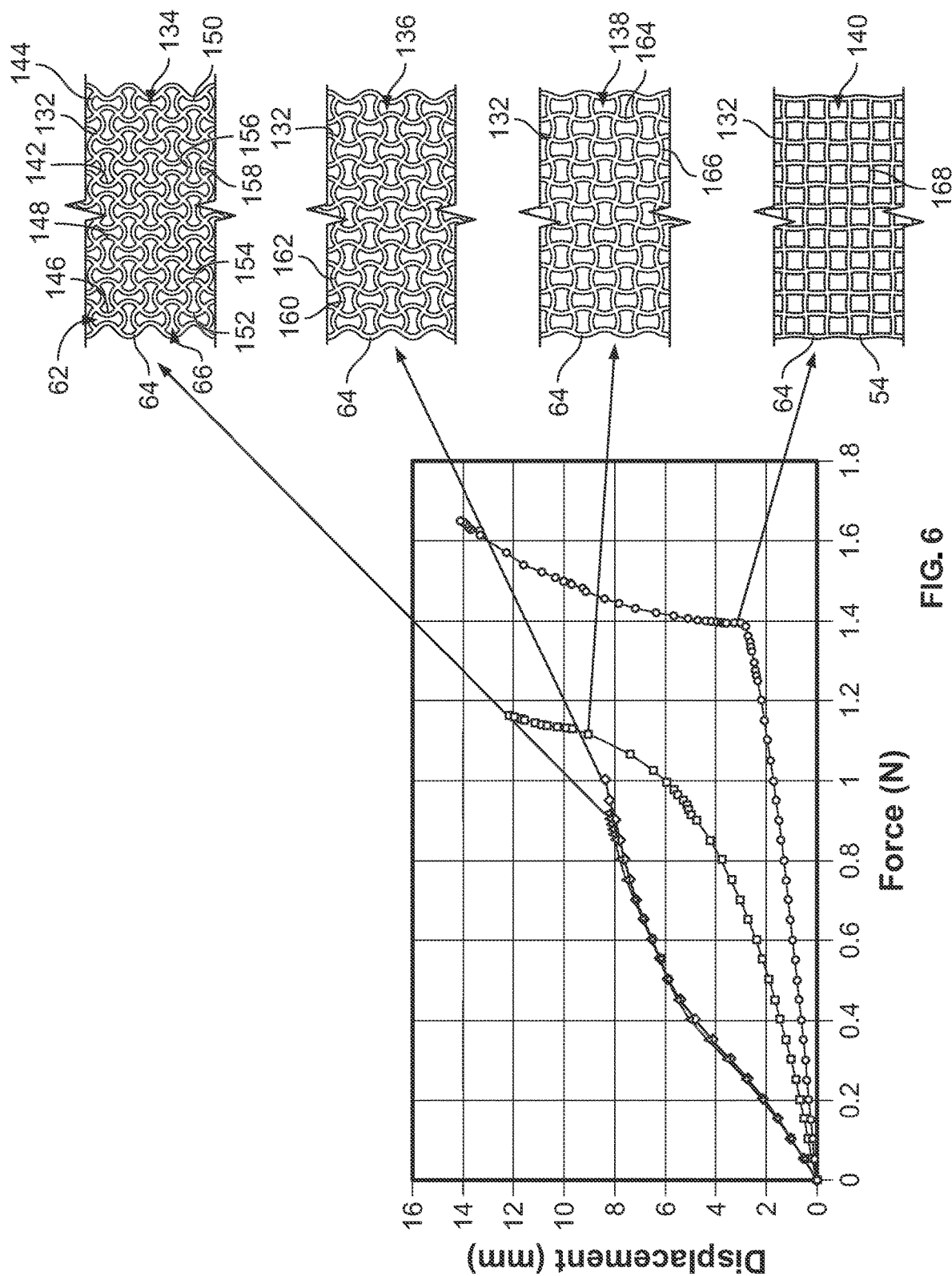
FIG. 6 is a graph comparing displacement of auxetic materials comprising various void structures against a force applied to the various void structures.

FIG. 5 is a top view of the midsole 60 of FIG. 4 with the normal channels 120 shown in dashed lines. The normal channels 120 traverse the full width of the midsole 60, and extend perpendicular to a main or longitudinal axis 122 of the midsole 60. The main axis 122 is defined as the axis of the midsole 60 that projects along the general direction of a footstep from the heel region 76 towards the forefoot region 72. The midsole 60 of FIG. 5 is for a right shoe, and is configured to be secured or joined to an outsole 58 (see FIG. 2). The normal channels 120 include forefoot channels 124, heel channels 126, and midfoot channels 128. Two of the forefoot channels 124 are located in the forefoot region 72, three of the heel channels 126 are located in the heel region 76, and two midfoot channels 128 are located between the forefoot channels 124 and the heel channels 128 in the midfoot region 74 of the midsole 60. The normal channels 120 that are formed by the voids 64 (see FIG. 4) enhance the resiliency produced by the midsole 60 as the normal channels 120 are first compressed and then later released with each footstep.

The embodiments disclosed herein enable the midsole 60 of the shoe 50 (see FIG. 2), and therefore the sole 54 (see FIG. 2) of the shoe 50, to exhibit a special spring or cushioning behavior, whereby the sole 54 collapses in a predetermined manner due to the recesses that encompass the void structure 62. The orientation of the forefoot channels 124, the heel channels 126, and the midfoot channels 128 in FIG. 5 provide a certain programmable deformation as a wearer of the article of footwear 50 takes a forward step, heel to toe, along the main axis 122. The forefoot channels 124, the heel channels 128, and the midfoot channels 128 are all normal channels 120 as defined in the discussion of FIGS. 7A and 7B below. The orientation of the forefoot channels 124, the heel channels 128, and the midfoot channels 128 provide a different programmable deformation as a wearer takes a footstep, heel to toe, along a secondary axis 130 that projects at an angle with respect to the main axis 122 as shown in FIG. 5. Therefore, the orientation of the forefoot channels 124, heel channels 128, and the midfoot channels 128 with respect to the general direction of movement makes a difference in the cushioning and springing effect produced.

FIG. 6 is a graph comparing displacement of auxetic materials 132 comprising various void structures 134, 136, 138, 140 against a force applied to the various void structures 134, 136, 138, 140. A linear compression was applied to materials 132 comprising a first void structure 134, a second void structure 136, a third void structure 138, and a fourth void structure 140 shown adjacent the graph. The first void structure 134 and the second void structure 136 achieve a relatively constant displacement from 0.0 N (Newtons) to 0.40 N, and a relatively constant, linear displacement from 0.45 N to 0.90 N. In contrast, the third void structure 138 achieves an exponential displacement, while the fourth void structure 140 achieves a linear displacement between 0.0 N and 1.4 N, and a logarithmic displacement between 1.4 N and 1.65 N. The various displacement curves depicted in the graph of FIG. 6 highlight the different displacement characteristics that can be achieved by varying the geometry of the void structures 134, 136, 138, 140 even among repeating quadratic structures. The graph further illustrates that patterns of void structures 134, 136, 138, 140 that have elements of curvature and self-reinforcement can provide a transitionary increase in compression resistance. Still further, the data indicates how various portions of the sole structure 54, which are subject to different loading forces, can be manufactured to include varying void structures 134, 136, 138, 140 to achieve programmable deformation.

FIG. 6 underscores the basic idea that the material 132 including the void structure 62 distorts and builds up a resisting force, which assists the springing back of the auxetic material 132 once the compressing force is removed. However, the amount of distortion or displacement versus the amount of force required to achieve the displacement is often not a straight line. The shape of the void structure 62 makes a difference in how the material 132 responds. It follows that as the void structure 62 is fashioned into channels 66, the shape, density, location and orientation of the channels 66 in the void structure 62 make a difference in the strength and resiliency experienced while wearing and using the shoe 50. For instance, during running, the shoe 50 could begin by experiencing compressing force in the heel region 76 (see FIG. 3), then as the foot (and therefore the shoe 50) rolls forward, the heel region 76 experiences less compression, until the forefoot region 72 (see FIG. 3) begins to experience more compression and the heel region 76 begins to experience a resilient force or spring-back. Similarly, when the forefoot region 72 completes pushing off, the forefoot region 72 begins to experience a resilient force or spring-back. These compression-resistant forces and spring-back forces are created in part by the design of the void structure 62, which includes the design, shape, density, and orientation of the channels 66 formed by the voids 64.

Certain areas of the sole structure 54 may include fewer or alternative types of voids 64 to provide for an enhanced or optimal cushioning effect. Regardless, the positioning of the voids 64 within the sole structure 54 is based upon a targeted, programmable cushioning level for the particular sole structure 54. The various void structures 134, 136, 138, 140 shown in FIG. 6 define patterns that could be implemented within the sole structure 54 disclosed herein, and may be provided with alternating shapes, or varying sizes along the sole structure 54. The void structures 134, 136, 138, 140 of FIG. 6 have been found to fit within the constraints of various injection molded manufacturing processes, and have desirable compression and deformation properties. While the patterns of void structures 134, 136, 138, 140 disclosed in FIG. 6 are shown having material 132 of a particular thickness between each of the voids 64, it is contemplated that additional material 132 may be provided between the various voids 64 that comprise the void structures 134, 136, 138, 140 shown therein, and that the voids 64 may comprise alternating sizes. Still further, any of the void structures 134, 136, 138, 140 shown in FIG. 6 may be combined within a midsole 60 with a different type of void structure 134, 136, 138, 140 and need not be limited to the particular arrangement or orientation as shown in the figures. As noted above, the void structures 134, 136, 138, 140 of FIG. 6 include voids 64 that extend entirely through the material 132 to define channels 66.

Still referring to FIG. 6, the first void structure 134 shown therein defines a quadratic structure, i.e., each of the voids 64 is defined by four sides. The first void structure 134 includes alternating horizontal voids 142 and vertical voids 144, which are separated by portions of the material 132. To that end, the first void structure 134 of FIG. 6 only includes two types of voids, i.e., horizontal voids 142 and vertical voids 144. The voids 142, 144 include lobes 146, 148 at opposing ends thereof, and a waisted midsection 150 between the lobed ends 146, 148. The horizontal voids 142 of the first void structure 134 include opposing left and right ends 152, 154 that generally define a convex profile, bowing away from the midsection 150. The horizontal voids 142 further define top and bottom ends 156, 158 that are generally concave and bow inward with respect to the midsection 150 thereof. As a result, the left and right ends 152, 154 of the voids 142, 144 intersect with the top and bottom ends 156, 158 thereof. The vertical voids 144 are identical in profile to the horizontal voids 142, but are offset by 90 degrees from the horizontal voids 142. As noted above, portions of the material 132 may be thickened to adjust the compressibility of the structure shown in FIG. 6.

The second void structure 136 is also shown in FIG. 6, and includes first voids 160 and second voids 162, which alternate moving from left to right across the rows, and alternate moving up and down the columns. The third void structure 138 is shown, which includes first voids 164 and second voids 166 that alternate moving from left to right across the rows, and alternate moving up and down the columns. A fourth void structure 140 is shown within the material 132. The fourth void structure 140 of FIG. 6 is quadratic, and is symmetric about orthogonal axes that intersect one another at a central point within one of the voids 168. The voids 168 are all identical, and are oriented in the same direction within the various rows and columns.

The various void structures 134, 136, 138, 140 shown in FIG. 6 define patterns that could be implemented within the sole structure 54 disclosed herein, and may be provided with alternating shapes, different orientations, or varying sizes along the sole structure 54. The void structures 134, 136, 138, 140 of FIG. 6 have been found to achieve various benefits, and define varying levels of compression and shear. As discussed herein, the term "shear" refers to deformation of the material 132 in a horizontal direction, perpendicular to the direction of the applied force. Some of the materials 132 discussed herein are shearing auxetic materials 132, which expand with a bias rather than isotopically expanding.

Still referring to FIG. 6, as shown in the graph, a higher force is required to create an initial displacement of the void structure 140, but once a certain degree of displacement is reached, a larger displacement can be achieved with a small additional amount of force. As discussed above, the various void structures 134, 136, 138, 140 discussed herein that are configured to form auxetic materials 132 are beneficial because when a compressive force is applied to the void structures 134, 136, 138, 140 the material 132 surrounding the void structure 134, 136, 138, 140 contracts, and is drawn inward in a direction that is transverse to the load. Thus, when a compressive force is applied, the void structure 134, 136, 138, 140 causes the material 132 to contract, and provides additional material 132 and support underneath the compressive load. Because the material 132 is caused to contract inward when a force is applied, less material 132 is required to provide a similar amount of support as a material 132 that does not include any type of void structure 134, 136, 138, 140 therein.

It should be understood that numerous modifications may be apparent to those skilled in the art in view of the foregoing description, and individual components thereof may be incorporated into numerous articles of footwear 50. Accordingly, aspects of the article of footwear 50 and components thereof, may be described with reference to general areas or portions of the article of footwear 50, with an understanding that the boundaries of the forefoot region 72, the midfoot region 74, the heel region 76, the medial side 104, or the lateral side 102 as described herein may vary between articles of footwear 50. However, aspects of the article of footwear 50 and individual components thereof, may also be described with reference to exact areas or portions of the article of footwear 50 and the scope of the appended claims herein may incorporate the limitations associated with these boundaries of the forefoot region 72, the midfoot region 74, the heel region 76, the medial side 104, or the lateral side 102 discussed herein.

Referring to FIGS. 1-5, while the particular embodiments and configurations of various voids 64 and void structures 134, 136, 138, 140 discussed above in the discussion of FIG.

6 are characterized with having particular configurations, it should be appreciated that the particular arrangement of voids 64, with respect to placement, size, orientation, and shape, may be varied depending upon a desired cushioning effect within the sole structure 54. For example, the sole structures 54 may comprise a variety of materials and thicknesses, and as a result, each sole structure 54 has forces applied thereto in different ways. The void structures 134, 136, 138, 140 disclosed herein are intended to allow for programmable deformation of a sole structure 54, depending on the characteristics of each particular sole structure 54, and may be varied from sole structure 54 to sole structure 54. The present disclosure contemplates that the void structures 134, 136, 138, 140 discussed herein may include voids 64 that comprise one or more of the aforementioned shapes, that comprise alternating shapes or are disposed in alternating configurations, or that vary in size within the various zones or regions of the sole structure 54.

Referring again to FIGS. 1 and 2, the void structure 62 of the midsole 60 includes first voids 170 and second voids 172. The void structure 62 only includes two rows of voids 170, 172. However, the void structure 62 includes twenty-six columns of the voids 170, 172 (see FIG. 2). In addition, the sole structure 54 includes two circular shaped voids 174. The void structure 62 may include one row of voids 170, 172, or may include two rows of voids 170, 172, or may include three rows of voids 170, 172, or may include four rows of voids 170, 172, or may include five rows of voids 170, 172, or may include six rows of voids 170, 172. The void structure 62 may include between ten and forty-five columns of voids 170, 172, or between fifteen and forty rows of voids 170, 172, or between twenty and thirty-five rows of voids 170, 172, or between twenty-five and thirty rows of voids 170, 172. In the embodiment shown in FIGS. 4 and 5, seven circular voids 174 that form seven circular channels 120 arrayed from a single row are shown. The channels 120 shown in the various midsoles 60 and various midsole components 176 in the following FIGS. 7, 9, 11, 13, 15, 17-18, 20, and 26-40 are all depicted as a single row of circular shaped channels 120. However, it is understood that the more elaborate shaped voids 64, especially the lemniscate shaped voids 170, 172 depicted in FIGS. 1, 2, and 6 can be utilized in the depicted sole structure 54 as well.

Figure 7A:
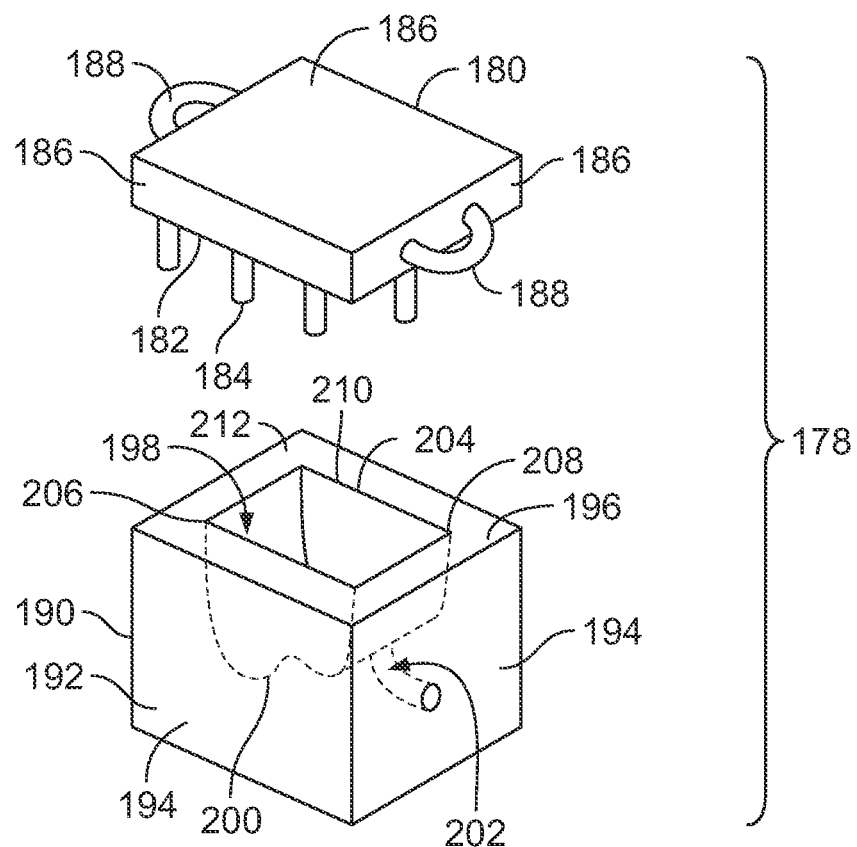
FIG. 7A is a perspective, exploded view of a first mold.
Figure 7B:
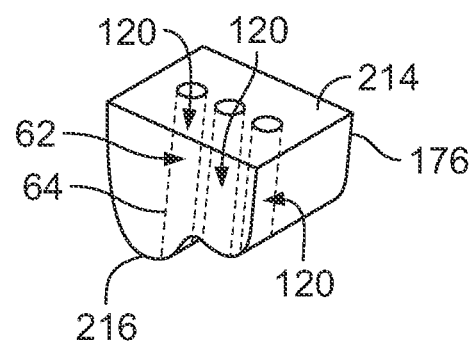
FIG. 7B is a perspective view of a midsole component having normal channels therein that has been made using the first mold of FIG. 7A.

Referring now to FIG. 7A, a perspective, exploded view is shown of a first mold 178, and FIG. 7B illustrates a perspective view of a midsole component 176 having normal channels 120 therein that has been made by the first mold 178. Referring to FIG. 7A, an upper plate 180 of the first mold 178 has a first or bottom wall 182 from which perpendicular or normal volume elements or mandrels 184 project, as well as an at least one second or side wall 186. The normal mandrels 184 are made of a substantially rigid material, such as steel or aluminum. In some embodiments, the at least one second wall 186 has handles 188 to assist in lifting or placing the upper plate 180 into position with respect to a lower mold or plate 190. The lower plate 190 has a body 192, a plurality of exterior walls 194, a top wall 196, and at least one cavity 198. The cavity is defined by at least one cavity wall 200 in the body 192. At least one injection passage 202 begins at and extends from one of the plurality of exterior walls 194, through the body 192, and fluidly connects to each of the corresponding at least one cavity walls 200. The first wall 182 and the top wall 196 are configured to be selectively secured together to seal the at least one cavity 198.

Still referring to FIG. 7A, a boundary or edge 204 is formed between the corresponding at least one cavity wall 200 and the top wall 196. In FIG. 7A, the edge 204 is rectangular shaped. The edge 204 represents a parting line for the first mold 178, where the midsole component 176 can be withdrawn from once cooled. A first point 206 and a second point 208 are defined as the points that are most distal from one another along the boundary 204. A third point 210 is defined as the point that is located on the boundary 204 that is equally most distal from the first point 206 and the second point 208, i.e., the points 206, 208, 210 form a triangle and the distances between points 206 and 210, and 208 and 210 are equal. Since the edge 204 of FIG. 7A is not a square, the third point 210 is located along one of the longer segments of the rectangular shaped edge 204, and not located at a corner. An insertion plane 212 is defined as the plane that intersects the first point 206, the second point 208, and the third point 210. When the first wall 182 and the top wall 196 are secured to one another to form a seal, the normal mandrels 184 project substantially perpendicular or normal to the insertion plane 212. In the present embodiment, the insertion plane 212 extends along the same plane formed by the top wall 196; however, alternative configurations are contemplated. Liquid plastic material can be injected, poured, or sprayed into the at least one cavity 198 to form a midsole component 176 (see FIG. 7B) with normal channels 120. Here, the liquid plastic material refers to the material that is utilized to form the midsole component 176. However, the phrase should not be construed to be limited to materials that are applicable to forming midsole components 176 throughout the present disclosure, and will be addressed application by application. In some embodiments, the liquid plastic material is injected, poured, or sprayed into the at least one cavity 198 via the at least one injection passage 202.

Still referring to FIG. 7A, the normal mandrels 184 that project from the first wall 182 are configured to project into the at least one cavity 198, and contact the corresponding at least one cavity wall 200 when the upper plate 180 is secured to the top wall 196 of the lower plate 190. The normal mandrel 184 has a cross sectional shape that matches the cross-sectional shape of the channel 120 that is formed by the normal mandrel 184. If the normal mandrel 184 has a circular cross-sectional shape, then a circular cross-sectional shaped channel 120 is formed in the midsole component 176. If the normal mandrel 184 has a lemniscate cross-sectional shape, then a leminscate cross-sectional shaped channel 120 is formed in the midsole component 176. The normal channel 120 shown in FIG. 7B has a taper or pitch of no more than two degrees. In some embodiments, the normal channel 120 has no taper or pitch at all. This small or absence of an angle of tapering ensures that the cross section of the normal channel 120 is substantially consistent along its length. This, in turn, ensures that the void structure 62 performs generally the same (i.e. has the same cushioning effect) along an entire length of the normal channel 120. However, it is contemplated that the degree of tapering along a mandrel 184, and therefore the formed normal channel 120 can be varied along the length of the mandrel 184 and therefore the formed normal channel 120. For instance, the degree of tapering may be 0.5 degrees for the majority of the length of the channel 120, but increase to almost 2 degrees in one segment of the normal channel 120.

FIG. 7B shows a midsole component 176 formed by the first mold 178 that has an insertion wall 214 that is proximate the first wall 182 of the upper plate 180 (see FIG. 7A), and has a cavity facing wall 216 that is proximate the corresponding at least one cavity wall 200 of the lower plate 190 (see FIG. 7A) when being formed in the first mold 178

(see FIG. 7A). Three of the normal channels 120 are shown in the midsole component 176 of FIG. 7B that extend from the insertion wall 214 to the cavity facing wall 216.

Figure 8:
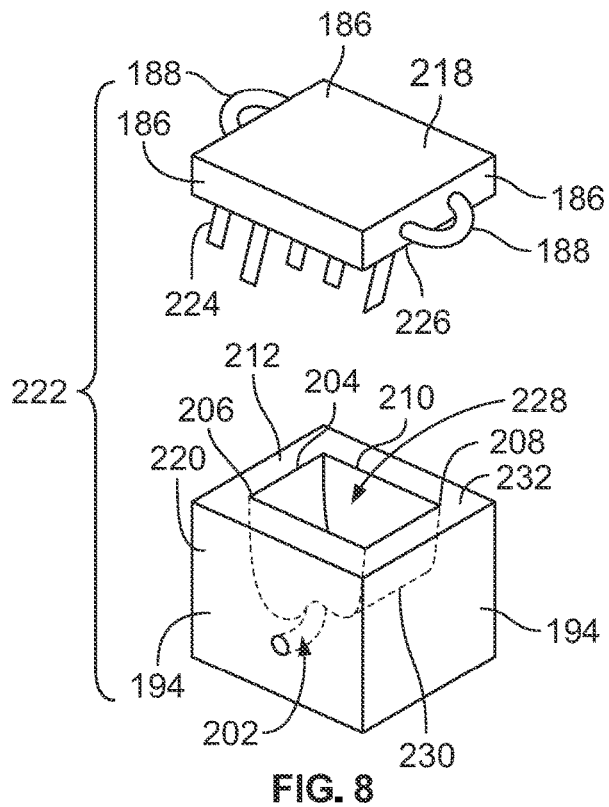
FIG. 8 is a perspective, exploded view of an upper plate and a lower plate of a second mold that is configured to produce midsole components having normal channels.

FIG. 8 is a perspective, exploded view of an upper plate 218 and a lower plate 220 of a second mold 222 that is configured to produce midsole components 176 (see FIG. 9B) having normal channels 120. The normal mandrels 224 that project from a first wall 226 (see FIGS. 8, 9A) are configured to project into an at least one cavity 228, but do not contact a corresponding at least one cavity wall 230 when the upper plate 218 is secured to the top wall 232 of the lower plate 220. The normal mandrels 224 have a cross sectional shape that matches the cross-sectional shape of the channels 120 that are formed by the corresponding normal mandrel 224. If the normal mandrel 224 has a circular cross-sectional shape, then a circular cross-sectional shaped channel 120 is formed in the midsole component 176 (see FIG. 9B). If the normal mandrel 224 has a lemniscate cross-sectional shape, then a lemniscate cross-sectional shaped channel 120 is formed in the midsole component 176. The normal channel 120 of FIG. 8 has a taper or pitch of no more than two degrees. In some embodiments, the normal channel 120 has no taper or pitch at all. This small or absence of an angle of tapering ensures that the cross section of the normal channel 120 is substantially consistent along its length. This ensures that the void structure 62 (see FIG. 9B) performs generally the same (i.e. has the same cushioning effect) along an entire length of the normal channel 120, until the normal channel 120 ends.

Figure 9A:
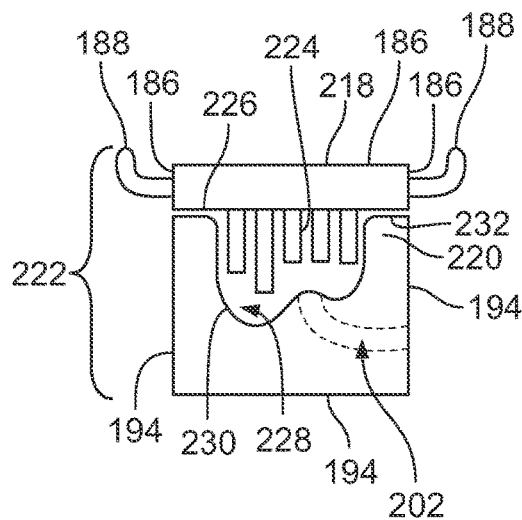
FIG. 9A is a side view of the mold of FIG. 8.
Figure 9B:
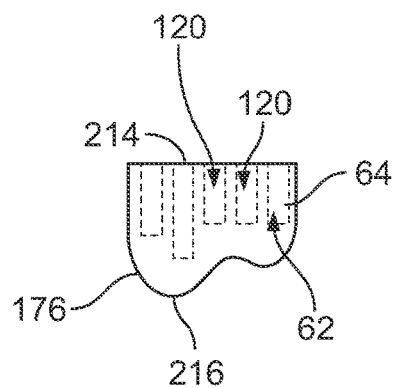
FIG. 9B is a side view of a midsole component having normal channels therein that has been made using the second mold of FIG. 8.

Referring to FIGS. 9A and 9B, the normal channels 120 that are formed do not extend an entire length of the midsole component 176. The midsole component 176 formed by the second mold 222 has an insertion wall 214 that is proximate the first wall 226 of the upper plate 218, and has a cavity facing wall 216 that is proximate the corresponding at least one cavity wall 230 of the lower plate 220 when being formed in the second mold 222. Five of the normal channels 120 are shown in the midsole component 176 of FIG. 9B, which extend from the insertion wall 214 but do not reach to the cavity facing wall 216. The normal mandrels 224 form voids 64 and therefore normal channels 120 in the midsole component 176. The normal mandrels 224 have a cross sectional shape that matches the cross-sectional shape of the void 64 that is configured to be formed by the normal mandrels 224. The cross-sectional shape of the void 64 defines the cross sectional shape of the normal channels 120 produced.

Figure 10:
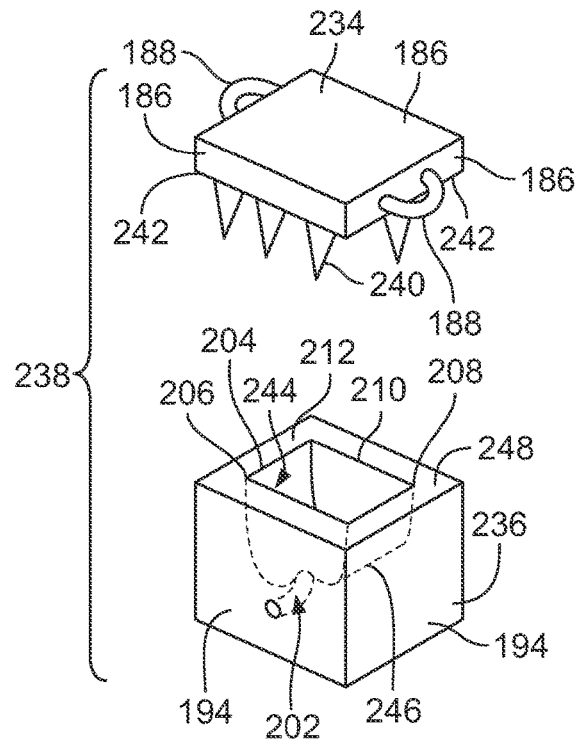
FIG. 10 is a perspective, exploded view of an upper plate and a lower plate of a third mold that is configured to produce midsole components having normal channels.
Figure 11A:
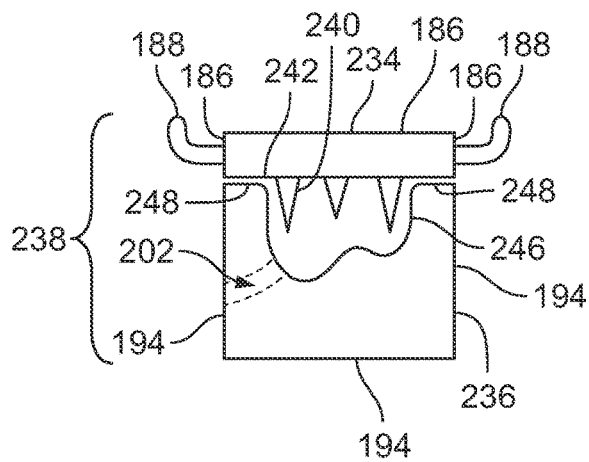
FIG. 11A is a side view of the mold of FIG. 10.
Figure 11B:
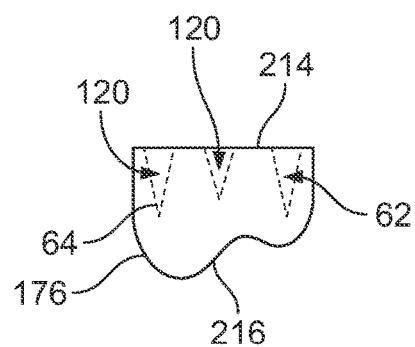
FIG. 11B is a side view of a midsole component having normal channels therein that has been made using the third mold of FIG. 10.

FIG. 10 is a perspective, exploded view of an upper plate 234 and a lower plate 236 of a third mold 238 that is configured to produce midsole components 176 (see FIG. 11B) having normal channels 120 (see FIG. 11B). Normal mandrels 240 that project from a first wall 242 are configured to project into an at least one cavity 244, and may contact a corresponding at least one cavity wall 246. In some embodiments, the mandrels 240 do not contact the corresponding at least one cavity wall 246 when the upper plate 234 is secured to a top wall 248 of the lower plate 236 (see FIG. 11A). The normal mandrel 240 has a cross sectional shape that matches the cross-sectional shape of the channel 120 that is formed by the normal mandrel 240. If the normal mandrel 240 has a circular cross-sectional shape, then a circular cross-sectional shaped channel 120 is formed in the midsole component 176 (see FIG. 11B).

The normal channels 120 formed by the third mold 238 of FIG. 10 are tapered and have a taper or pitch of two degrees or more. In some embodiments, the normal channels 120 have a taper of more than 3 degrees, or more than 4 degrees, or more than 5 degrees, or more than 6 degrees, or more than 7 degrees, or more than 8 degrees, or more than 9 degrees, or more than 12 degrees, or more than 15 degrees, or more than 20 degrees, or more than 25 degrees, or more than 30 degrees. In some embodiments, the normal channel 120 extends to the corresponding at least one cavity wall 246, in a similar fashion as the first mold 178 of FIG. 7A. In some embodiments, the normal channel 120 does not extend to the corresponding at least one cavity wall 246, in a similar fashion as the second mold 222 of FIG. 8. The angle of tapering of the present embodiment ensures that the cross section of the normal channel 120 is substantially different along its length. This ensures that the void structure 62 performs differently, i.e., has a different cushioning effect, along an entire length of the normal channel 120 that is tapered with a taper of two degrees or more.

FIG. 11A is a side view of the mold 238 of FIG. 10, and FIG. 11B is a midsole component 176 made with the mold 238 of FIG. 10 with normal channels 120 shown. Referring to FIG. 11B, the insertion wall 214 and the cavity facing wall 216 of the midsole component 176 are shown, and the normal channels 120 do not extend to the cavity facing wall 216. Although the normal channels 120 are shown with a spike or pointed shape, the tapering can be steeper or less steep than as illustrated. In addition to making the withdrawal of the upper plate 234 (see FIG. 11A) easier, the normal channels 120 of the present embodiment allow the cushioning effect to be different along the length of the normal channel 120 because the taper or pitch of the normal channel 120 is different, e.g., two degrees or more.

Figure 12:
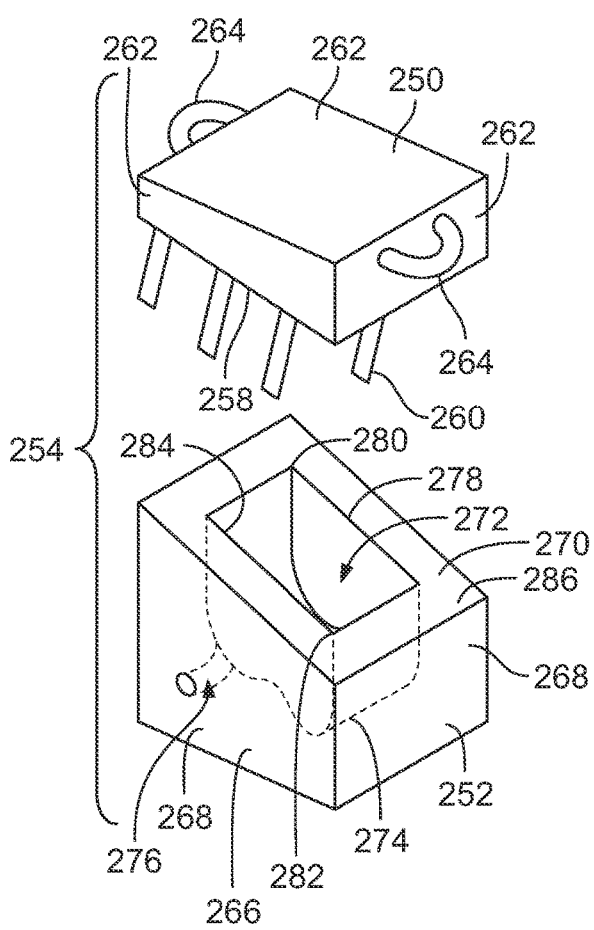
FIG. 12 is a perspective, exploded view of an upper plate and a lower plate of a fourth mold that is configured to produce midsole components having angled channels.

FIG. 12 is a perspective exploded view of an upper plate 250 and a lower plate 252 of a fourth mold 254 that is configured to produce midsole components 176 (see FIG. 13B) having angled channels 256. The upper plate 250 has a first wall 258 from which angled volume elements or mandrels 260 project, as well as an at least one second wall 262. In some embodiments, the first wall 258 is not horizontal, and is instead disposed at an angle with respect to the horizontal (see FIG. 13A). The angled mandrels 260 are made of a substantially rigid material, such as steel or aluminum. In some embodiments, the at least one second wall 262 has handles 264 to assist in lifting or placing the upper plate 250 into position with respect to a lower plate 252. The lower plate 252 has a body 266, a plurality of exterior walls 268, a top wall 270 which is configured to be sealed against the first wall 258, and at least one cavity 272 with a corresponding at least one cavity wall 274. At least one injection passage 276 begins at, and extends from, one of the plurality of exterior walls 268, through the body 266, and fluidly connects to each corresponding at least one cavity wall 274. The first wall 258 and the top wall 270 are configured to be selectively secured together to seal the at least one cavity 272.

Still referring to FIG. 12, an edge or boundary 278 is formed between the corresponding at least one cavity wall 274 and the top wall 270. The edge 278 of FIG. 12 is rectangular shaped, but in other embodiments, the edge 278 can be square shaped. The edge 278 represents a parting line for the fourth mold 254, where the midsole component 176 can be withdrawn once cooled. A first point 280 and a second point 282 are defined as the points that are most distal from one another along the edge 278. A third point 284 is defined as the point that is located on the boundary 278 that is equally most distal from the first point 280 and the second point 282, i.e., the points 280, 282, and 284 form a triangle and the distances between points 280 and 284, and 282 and 284 are equal. Since the edge 278 is rectangular shaped in FIG. 12, the third point 284 is located along a segment of the edge 278, and not at a corner of the edge 278. An insertion plane 286 (shown in FIG. 13A) is defined as the plane that intersects the first point 280, the second point 282, and the third point 284. Here, the insertion plane 286 is co-planar with the top wall 270. When the first wall 258 and the top wall 270 are secured to one another to form a seal, the angled mandrels 260 do not project substantially perpendicular or normal to the insertion plane 286. Liquid plastic material can be injected, poured, or sprayed into the at least one cavity 272 to form a midsole component 176 with angled channels 256. In some embodiments, the liquid plastic material is injected, poured, or sprayed into the at least one cavity 272 via the at least one injection passage 276.

The angled mandrels 256 do not project from the first wall 258 substantially perpendicularly. This can be achieved by one of at least two ways. First, by having the first wall 258 oriented at an angle other than horizontal (see FIG. 13A), when the upper plate 250 is withdrawn vertically, the angled mandrels 256 can be withdrawn from the at least one cavity 272. Second, the first wall 258 can remain oriented along the horizontal, but the upper plate 250 is withdrawn at an angle with respect to the vertical (not shown). The result is the same, i.e., the formed midsole component 176 has angled channels 256 that do not project substantially perpendicular with respect to an insertion plane 286 (see FIGS. 13A and 13B). When the midsole component 176 is removed from the lower plate 252, the midsole component 176 is removed at an angle that is perpendicular (not shown) to the top wall 270 to clear the body 266 without interference.

Still referring to FIG. 12, the angled mandrels 260 that project from the first wall 258 are configured to project into the at least one cavity 272, and may or may not contact the at least one cavity walls 274 when the upper plate 250 is secured to the top wall 270 of the lower plate 252. The angled mandrel 260 has a cross sectional shape that matches the cross-sectional shape of the angled channel 256 that is formed by the angled mandrel 260. If the angled mandrel 260 has a circular cross-sectional shape, then a circular cross-sectional shaped angled channel 256 is formed in the midsole component 176. If the angled mandrel 260 has a lemniscate cross-sectional shape, then a lemniscate cross-sectional shaped angled channel 256 is formed in the midsole component 176. The angled channel 256 that is formed is not limited by the degree of tapering along the channel 256. The angled channel 256 may have a taper of less than two degrees of pitch or taper. The angled channel 256 may have a taper of two degrees or more. In some embodiments, the angled channels 256 have a taper of more than 3 degrees, or more than 4 degrees, or more than 5 degrees, or more than 6 degrees, or more than 7 degrees, or more than 8 degrees, or more than 9 degrees, or more than 12 degrees, or more than 15 degrees, or more than 20 degrees, or more than 25 degrees, or more than 30 degrees. The angled mandrel 260 is also not limited to contacting or not contacting the corresponding at least one cavity wall 274 of the lower plate 252.

Figure 13A:
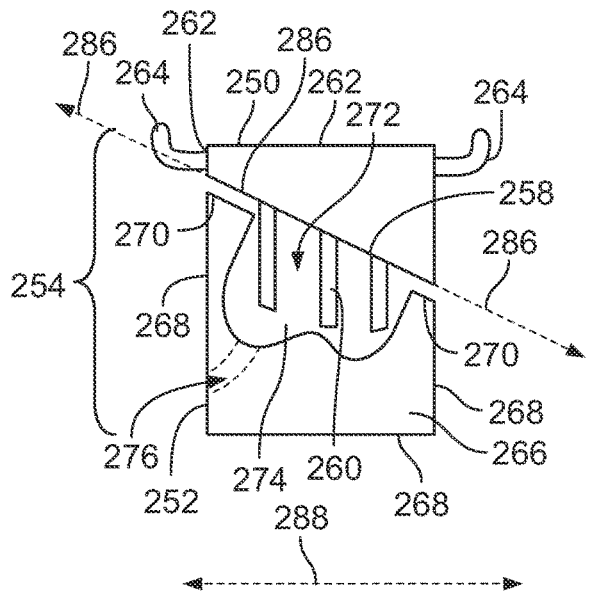
FIG. 13A is a side view of the mold of FIG. 12.
Figure 13B:
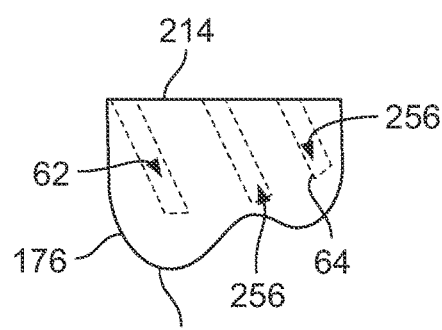
FIG. 13B is a side view of a midsole component having angled channels therein that has been made using the fourth mold of FIG. 12.

Referring now to FIG. 13A, a side view of the mold 254 of FIG. 12 is shown, and FIG. 13B illustrates a side view of the midsole component 176 made with the mold 254 of FIG. 12 with angled channels 256. The upper plate 250 has angled mandrels 260 projecting from the first wall 258, with handles 264 projecting from the at least one second wall 262. The first wall 258 and a corresponding top wall 270 are not seated along a horizontal axis 288 (in FIG. 13A, the horizontal axis 288 is shown below the fourth mold 254), which makes withdrawing the upper plate 250 easier. The lower plate 252 has a plurality of exterior walls 268, a top wall 270, at least one cavity 272, a corresponding at least one cavity wall 274, and a body 266. The injection passage 276 (see FIG. 12) is shown as a dotted line. The angled mandrels 260 reach the corresponding at least one cavity wall 274 when the at least one cavity 272 is sealed in FIG. 13A. Referring to FIG. 13B, the midsole component 176 has three angled channels 256 that extend at an angle other than perpendicular with respect to the insertion wall 214 and extend to the cavity facing wall 216. The angled channels 256 in the midsole component 176 provide a different cushioning effect depending upon an orientation of the force experienced or movement generated. For example, and referring to FIG. 31 for reference, the angled channels 256 provide a different cushioning effect when experiencing a force F1 290, F2 292, and a force F3 294.

FIG. 14 is a perspective exploded view of an upper plate 296, a hinge bar 298, and a lower plate 300 of a fifth mold 302 that is configured to produce midsole components 176 having curved channels 304 (see FIG. 15B). The upper plate 296 has a first or bottom wall 306 from which curved volume elements or mandrels 308 project from, as well as an at least one second wall 310 (see FIGS. 14, 15). In some embodiments, the upper plate 296 has a handle 312 (to be clear, the handle 312 is removed in FIG. 15 for clarity). In some embodiments, the upper plate 296 has a hinge bar retaining device or first lobes 314 configured to retain the hinge bar 298. The curved mandrels 308 are made of a substantially rigid material, such as steel or aluminum.

Referring to FIG. 15A, the fifth mold 302 is shown, which has a hinge bar 298 or an equivalent element that facilitates the upper plate 296 lifting and lowering onto the lower plate 300 around a pivoting hinge 316. The lower plate 300 of the fifth mold 302 has a body 318, a plurality of exterior walls 320, a hinge bar retaining device or second lobes 322, a top wall 324, and at least one cavity 326, each with a corresponding at least one cavity wall 328. At least one injection passage 330 begins at and extends from one of the plurality of exterior walls 320, through the body 318, and is fluidly connected to the respective corresponding at least one cavity walls 328. The first wall 306 and the top wall 324 are configured to selectively secure together to seal the at least one cavity 326 so that liquid plastic material can be injected, poured, or sprayed into the at least one cavity 326 to form a midsole component 176 (see FIG. 15B). The curved mandrels 308 that project from the first wall 306 are configured to project into the at least one cavity 326, and may reach the corresponding at least one cavity wall 328 or may not reach the corresponding at least one cavity wall 328. When the curved mandrels 308 reach the corresponding at least one cavity wall 328, the curved channels 304 extend from an insertion wall 214 of the midsole component 176 to a cavity facing wall 216 of the midsole component 176 (see FIG. 34). When the curved mandrels 308 do not reach the corresponding at least one cavity wall 328, the curved channels 304 formed extend from an insertion wall 214 of the midsole component 176 but do not reach the cavity facing wall 216 of the midsole component 176 (see FIG. 15B).

Referring again to FIG. 14, the curved mandrels 308 form voids 64 (see FIG. 15B) and therefore curved channels 304 in the midsole component 176. The curved mandrel 308 has a cross sectional shape that matches the shape of the cross section of the void 64 that is formed by the curved mandrel 308 in the midsole component 176. The cross sectional shape of the void 64 defines the cross sectional shape of the curved channel 304. The upper plate 296 and the lower plate 300 form a pivoting movement relationship around the hinge bar 298 (see FIG. 15A). The individual curved mandrels 308 are aligned along an arc 332 (see FIG. 15A) so that as the upper plate 296 is opened by pivoting around the hinge bar 298 (see FIG. 15A), the curved mandrels 308 insert and withdraw along the path of the arc 332.

The curved mandrels 308 can have a taper or pitch of two degrees or more, or the curved mandrels 308 can have no taper at all, or a taper or pitch of less than two degrees. In some embodiments, the curved channels 304 have a taper of more than 3 degrees, or more than 4 degrees, or more than 5 degrees, or more than 6 degrees, or more than 7 degrees, or more than 8 degrees, or more than 9 degrees, or more than 12 degrees, or more than 15 degrees, or more than 20 degrees, or more than 25 degrees, or more than 30 degrees. The curved mandrels 308 can form curved channels 304 in the midsole component 176 (see FIG. 15B) that reach from an insertion wall 214 of the midsole component 176 to a cavity facing wall 216. The curved mandrels 308 can form curved channels 304 in the midsole component 176 that do not reach the cavity facing wall 216 (see FIGS. 15A and 15B). The curved channels 304 provide a different cushioning experience along the length of a radial direction.

FIG. 15A is a side view of the mold 302 of FIG. 14 and FIG. 15B is a midsole component 176 made with the mold 302 of FIG. 14 with curved channels 304 shown. The upper plate 296 and the lower plate 300 form a pivoting relationship around the hinge bar 298. As the upper plate 296 is inserted into or withdrawn from the at least one cavity 326, the curved mandrels 308 traverse along their respective arcs 332. In FIG. 15B, the midsole component 176 has three curved channels 304 that are oriented along the same respective arc 332 followed by the curved mandrel 308 that formed the corresponding curved channel 304, however, more or fewer curved channels 304 are contemplated.

FIG. 16 is a perspective, exploded view of an upper plate 334, four ray configuration volume elements or mandrels 336, and a lower plate 338 of a sixth mold 340 that is configured to produce midsole components 176 (see FIGS. 18A, 18B) having ray configuration channels 342. The upper plate 334 has a first wall 344 (see FIGS. 16, 17B) and an at least one second wall 346 (see FIGS. 16, 17A). In some embodiments, the upper plate 334 has handles 348. A plurality of ray configuration mandrels 336 are made of a substantially rigid material, such as steel or aluminum. In some embodiments, the ray configuration mandrels 336 each have a collar 350. The lower plate 338 of the sixth mold 340 has a body 352, a plurality of exterior walls 354, a top wall 356, a plurality of insertion walls 358, and at least one cavity 360, each with a corresponding at least one cavity wall 362. At least one injection passage 364 begins at and extends from one of the plurality of exterior walls 354, through the body 352, and is fluidly connected to the respective corresponding at least one cavity wall 362.

Figure 17A:
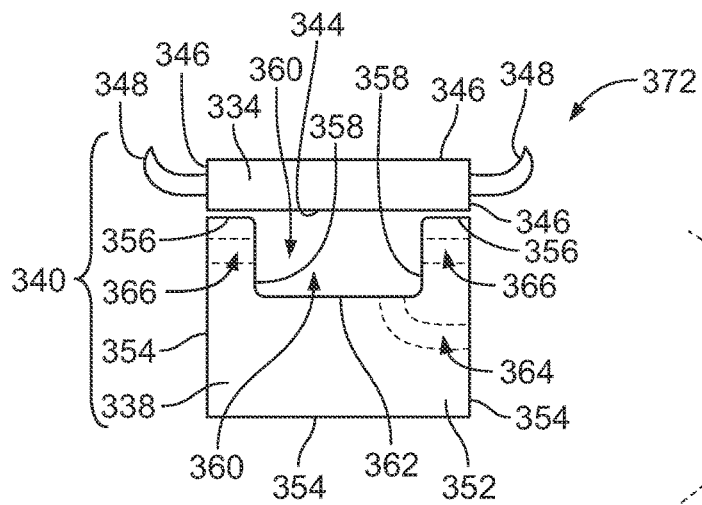
FIG. 17A is a side view of the mold of FIG. 16 in a first stage of three different stages of operation.
Figure 18A:
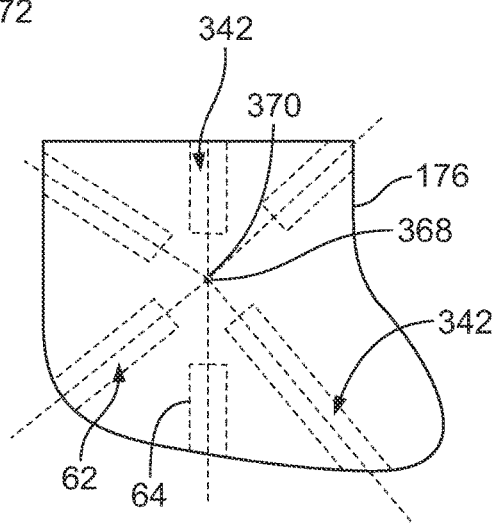
FIG. 18A is a top view of a midsole component having ray configuration channels therein that has been made with the mold of FIG. 16.
Figure 17B:
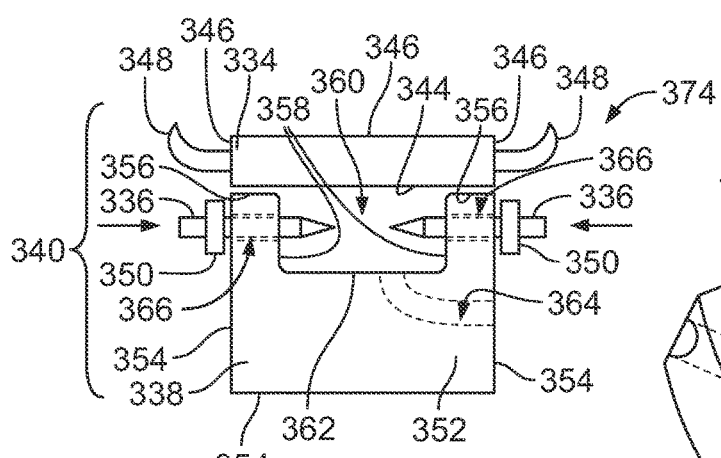
FIG. 17B is a side view of the mold of FIG. 16 in a second stage of three different stages of operation.
Figure 18B:
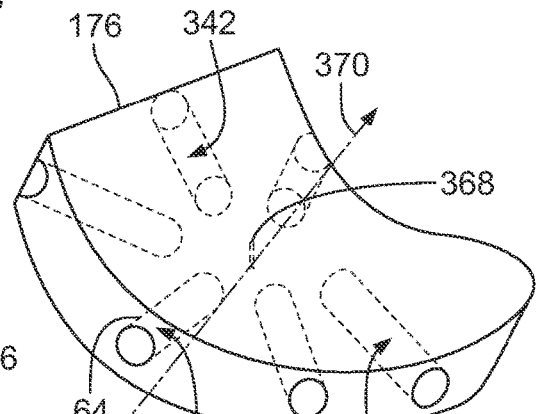
FIG. 18B is a perspective view of a midsole component having ray configuration channels therein that has been made with the mold of FIG. 16.
Figure 17C:
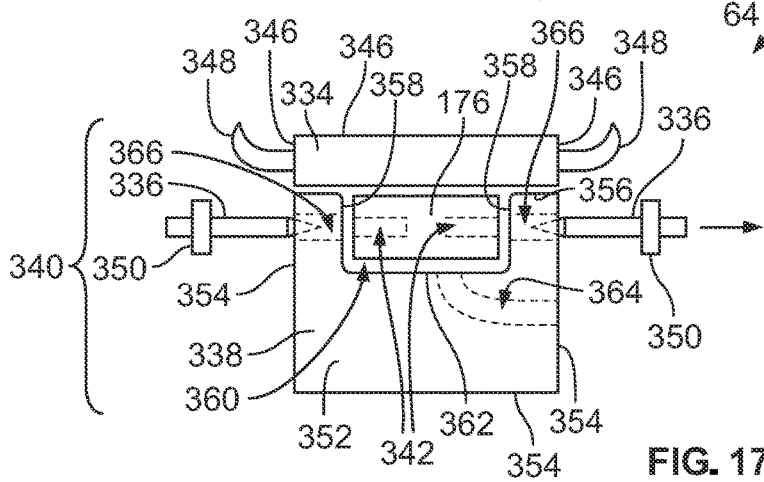
FIG. 17C is a side view of the mold of FIG. 16 in a third stage of three different stages of operation.

The first wall 344 and the top wall 356 are configured to selectively secure together to create part of the seal for the at least one cavity 360 so that liquid plastic material can be injected, poured, or sprayed into the at least one cavity 360 to form the midsole component 176 (see FIGS. 17C, 18A, 18B). A plurality of mandrel passages 366 extend through the plurality of exterior walls 354, the body 352, and the plurality of insertion walls 358, and each of the plurality of mandrel passages 366 is configured to sealingly retain a corresponding ray configuration mandrel 336 within each of the plurality of mandrel passages 366 when fully inserted. When present, the full insertion of the ray configuration mandrels 336 can be defined by the corresponding collar 350 contacting the plurality of exterior walls 354 (see FIG. 17B), which act as. Each of the plurality of mandrel passages 366 can be axially aligned opposite to a corresponding one of a plurality of mandrel passages 366 or not axially aligned with respect to another of the plurality of mandrel passages 366. However, each of the plurality of mandrel passages 366 is axially oriented to extend toward a pre-selected center-point 368 or a center-axis 370 when the plurality of mandrel passages 366 are not located on the same horizontal plane, for instance, see FIGS. 18A, 18B. A center-point 368 is the point that the axis of each of the mandrel passages 366 intersects, i.e., the point in the middle of the ray configuration channels 342 (See FIG. 18A for a clear view).

The center-point 368 or center-axis 370 (see FIGS. 18A, 18B) is not limited to being at the geographical center of the midsole component 176 (see FIGS. 18A, 18B), but can be any desired or pre-selected location within the midsole component 176. The first wall 344 and the top wall 356 cannot seal the at least one cavity 360 without the ray configuration mandrels 336 being sealingly retained within all of the corresponding plurality of mandrel passages 366. When present, the collar 350 provides a hard stop to control the depth of insertion of the ray configuration mandrel 336 into the at least one cavity 360.

Still referring to FIG. 16, the ray configuration mandrels 336 are moved linearly inwards into the at least one cavity 360 to seal the corresponding mandrel passage 366. The ray configuration mandrels 336 are moved linearly outwards from the at least one cavity 360 to break the seal and to provide enough clearance so that the midsole component 176 can be removed without interference or damage from a ray configuration mandrel 336. The ray configuration mandrels 336 are not oriented so that the ray configuration mandrels 336 could be attached to a single plate and then moved along a single axis. As a result, the ray configuration mandrels 336 are oriented in a radial fashion (see FIGS. 17C-18B) and each of the ray configuration mandrels 336 move at a different radial angle than the other ray configuration mandrels 336. The movement of the ray configuration mandrels 336 can be performed manually, or by automation, or by any combination of the two. It is contemplated that in a high volume production environment, each of the ray configuration mandrels 336 would be configured to be inserted or withdraw by a single device that moves each of the ray configuration mandrels 336 in unison; however, alternative configurations are contemplated.

The first wall 344, the top wall 356 and the ray configuration mandrels 336 are configured to selectively secure together to seal the at least one cavity 360 so that liquid plastic material can be injected, poured, or sprayed into the at least one cavity 360 to form a midsole component 176. The ray configuration mandrels 336 are configured to project into the at least one cavity 360, and may contact another ray configuration mandrel 356 at the center-point 368 within the at least one cavity 360 or may contact no other ray configuration mandrels 336. The ray configuration mandrels 336 may have two degrees or more taper or pitch, or less than two degrees taper, or no taper. In some embodiments, the ray configuration channels 342 have a taper of more than 3 degrees, or more than 4 degrees, or more than 5 degrees, or more than 6 degrees, or more than 7 degrees, or more than 8 degrees, or more than 9 degrees, or more than 12 degrees, or more than 15 degrees, or more than 20 degrees, or more than 25 degrees, or more than 30 degrees.

Still referring to FIG. 16, the ray configuration mandrels 336 form the voids 64 (see FIG. 18B) and therefore ray configuration channels 342 (see FIG. 18B) in the midsole component 176 (see FIG. 18B). The ray configuration mandrels 336 have a cross sectional shape that matches a shape of the cross section of the corresponding void 64 that is formed by the ray configuration mandrels 336. The cross sectional shape of the void 64 defines the cross sectional shape of the ray configuration channel 342. The ray configuration channels 342 provide a way to create a differently cushioned center-point 368 in a midsole component 176, such as within the heel region 76 (see FIGS. 3, 36). By migrating the center-point 368 to the left or the right, or forwards or backwards, the cushioning effect can be centered around a desired point within the midsole component 176 (see FIGS. 18A, 18B, and 36-39).

Referring to FIGS. 17A-17C, a side view of the midsole components mold 340 of FIG. 16 is illustrated in three different stages of operation. The first stage of operation 372 (see FIG. 17A) shows the upper plate 334 with handles 348, and the lower plate 338 with the at least one injection passage 364 fluidly connected to the at least one cavity 360, with two of the mandrel passages 366 shown. The second stage of operation 374 (see FIG. 17B) shows the ray configuration mandrels 336 fully inserted with the hard stop of the collar 350 to provide part of the seal of the at least one cavity 360. The third stage of operation 376 (see FIG. 17C) shows the ray configuration mandrels 336 axially withdrawn so that the midsole component 176 with the ray configuration channels 342 can be withdrawn from the sixth mold 340.

FIG. 18A is a top view of a midsole component 176 made with the mold 340 of FIG. 16 with ray configuration channels 342, and FIG. 18B is a perspective view of a midsole component 176 made with the mold 340 of FIG. 16 with ray configuration channels 342. The midsole part 176 includes six ray configuration channels 342 that are all oriented to axially intersect with the center-point 368. None of the ray configuration channels 342 reach the center-point 368, but in other embodiments the ray configuration channels 342 may reach the center-point 368 or center-axis 370. This design creates a central point where the cushioning effect is different than the cushioning along any of the ray configuration channels 342.

Referring now to FIG. 19A, a side view of an outsole mold 378 is illustrated, and FIG. 19B is an outsole 58 made with the outsole mold 378. The outsole mold 378 has an upper plate 380 with a first or bottom wall 382 and at least one second wall 384, as well as a lower plate 386 with a top wall 388, a body 390, at least one cavity 392, a corresponding at least one cavity wall 394, and a plurality of exterior walls 396. The cavity wall 394 includes contours 398 that form embossments or protuberances 400 on the bottom of the outsole 58 (see FIG. 19B) which are configured to become part of the exterior of the article of athletic footwear 50 (see FIGS. 1, 2). At least one injection passage 402 begins at and extends from at least one of the plurality of exterior walls 396, through the body 390, and fluidly connects to the corresponding at least one cavity wall 394 (see FIG. 19A). The first wall 382 and the top wall 388 are configured to selectively secure together to seal the at least one cavity 392. The volume of the at least one cavity 392 is shown in part by dotted lines when the first wall 382 and the top wall 388 are secured to one another and the at least one cavity 392 is sealed. A liquid plastic material is injected, poured or sprayed into the at least one cavity 392 to form the outsole 58 via the at least one injection passage 402 in at least one embodiment. Here, the liquid plastic material refers to the material that is utilized to form the outsole 58. However, the phrase should not be construed to be limited to materials that are applicable to forming the outsole 58 throughout the present disclosure, and will be addressed application by application.

FIG. 20A is a side view of a sequence of processes utilizing a marriage mold 404, and FIG. 20B illustrates the sole 54 made using the marriage mold 404. The sequence of processes includes a first step 406, a second step 408, a third step 410, and a fourth step 412 (see FIG. 20A). The marriage mold 404 has a selectively removable upper plate 414 (compare the third step 410 to the fourth step 412) with a first or bottom wall 416, and at least one second wall 418, as well as a lower plate 420 with a top wall 422, a body 424, at least one cavity 426, a corresponding at least one cavity wall 428, and a plurality of exterior walls 430 (see FIG. 20A). In some embodiments, the upper plate 414 has handles 432 (see the fourth step 412) that assist in the lifting and positioning of the upper plate 414. Although handles 432 are shown, it is contemplated that the marriage mold can be operated without handles, especially when using an automated process, which would not require handles. Automation in particular may eliminate the employment of handles in the other molds as well, specifically handles 188, 264, 312, and 348. In at least one embodiment, at least one injection passage 402 begins at and extends from one of the plurality of exterior walls 430, through the body 424, and is fluidly connected to the respective corresponding at least one cavity wall 428 (see FIG. 20A).

The first wall 416 and the top wall 422 are configured to selectively secure together to seal the at least one cavity 426. The volume of the at least one cavity 426 is shown in part by dotted lines (see the second step 408) to indicate the volume of the at least one cavity 426 when the at least one cavity 426 is sealed. In some embodiments, liquid plastic material can be injected, poured, or sprayed into the at least one cavity 426 to assist in bonding or joining the outsole 58 to the midsole components 176. Here, the liquid plastic material refers to the material that is utilized to bond or join the midsole components 176 to the outsole 58, which can be any material that is liquid, plastic, and can provide a joining or a bond of the various components 58, 176 once cooled. However, the phrase should not be construed to be limited to materials that are applicable to joining or bonding midsole components 176 and outsoles 58 together, and will be addressed application by application throughout the present disclosure. In some embodiments, the liquid plastic material, the midsole components 176 and the outsole 58 are subjected to heat (heating element not shown) in order to facilitate bonding and the conforming of the sole 54 to a desired final shape. In some embodiments, plastic material is not utilized to bond or join the midsole components 176 and the outsole 58 to form a sole 54 (see FIG. 20B), and only heat is applied to the marriage mold 404 to heat and partially melt the midsole components 176 and the outsole 58 together to form the sole 54. The heat partially melts the midsole components 176 and outsole 58, and the partially melted objects adhere better to one another once cooled. The heat also serves to facilitate the shaping of the sole 54 as well.

Still referring to FIG. 20A, the outsole 58 has a first region 434 that defines the shape and size of the outsole 58 when viewed from a top view. Each midsole component 176 has a second region 436 that defines the shape and size of the midsole component 176 when viewed from a top view. The marriage mold 404 is configured to place an assembly of midsole components 176 with second regions 436 that collectively have substantially the same profile as the first region 434 of a corresponding outsole 58. The assembly of midsole components 176 are configured to bond or join with the corresponding outsole 58 in the marriage mold 404 in order to form a sole 54. The assembly of midsole components 176 can be combined to form a single midsole 60 (see FIG. 27) that is fashioned to have a second region 436 that is substantially the same size and shape as the first region 434 of a corresponding outsole 58 (see FIGS. 26-27). Alternatively, the second region 436 of the midsole components 176, such as the second region 436 of a left side midsole component 438 and the second region 436 of a right side midsole component 440, when assembled together, can have substantially the same profile as the first region 434 of a corresponding outsole 58. Then the corresponding outsole 58 can be inserted into the marriage mold 404 with the two midsole components 438, 440 (see FIG. 30 for an example) to form a sole 54. In certain embodiments, the outsole 58 is made of a different material than the two corresponding midsole components 438, 440. More broadly, the outsole 58 and the midsole component 176 or each of the midsole components 176 can be made of different materials, or the outsole 58 and the midsole component or midsole components 176 can be made of the same material. The marriage mold 404 can form a single sole 54, or several soles 54 simultaneously. Although an upper plate 414 and a lower plate 420 are described to form the marriage mold 404, in other embodiments more than two plates can be utilized to form the at least one cavity 426, and the marriage mold 404 should not be construed to be limited to only the upper plate 414 and lower plate 420. In FIG. 20B, a sole 54 with the outsole 58 and a now combined midsole 60 (see FIG. 27) with normal channels 120 is shown.

Figure 21:
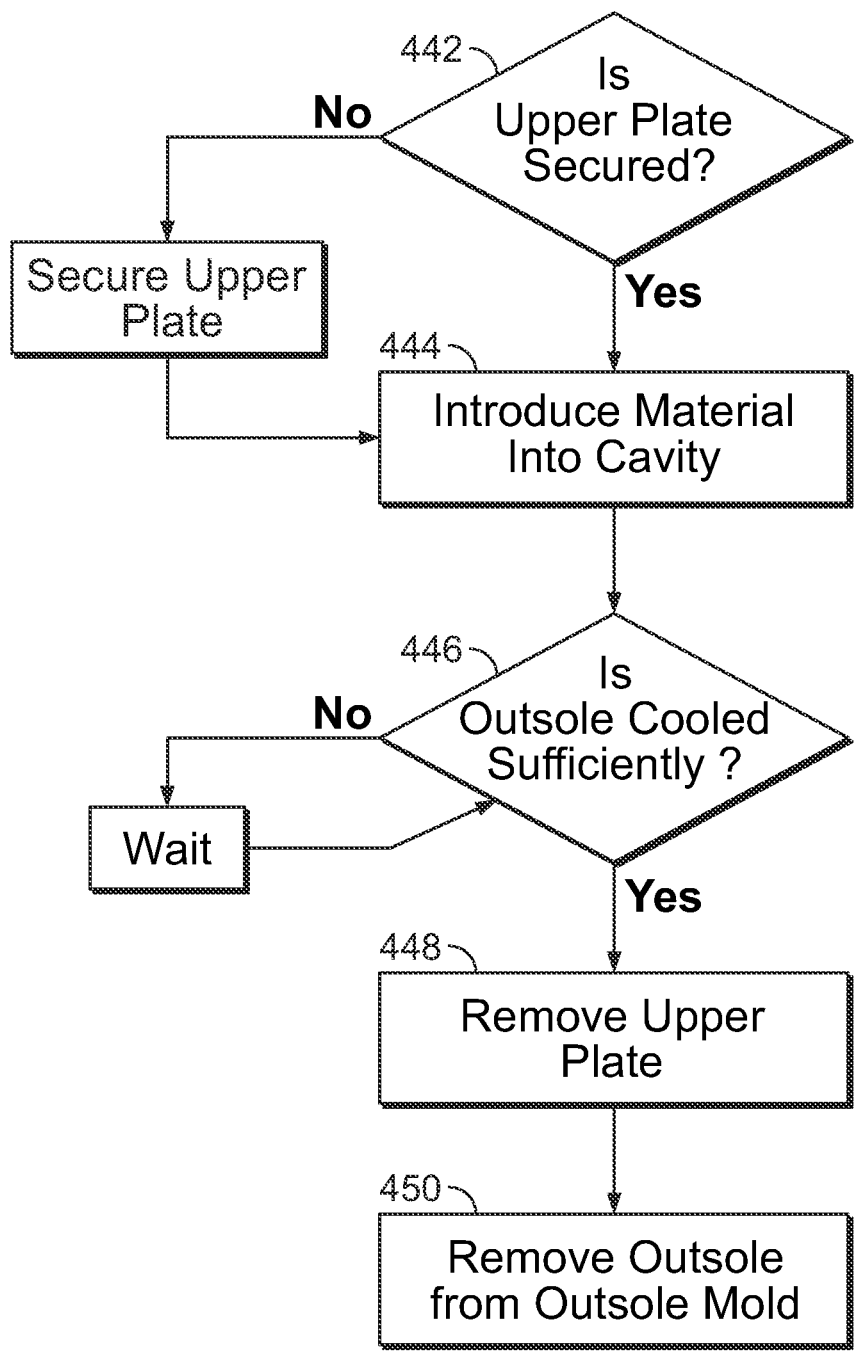
FIG. 21 is a step diagram for utilizing the mold of FIG. 19A.

FIG. 21 is a step diagram for utilizing the outsole mold 378 of FIG. 19A. It is understood that this method can be performed manually by an operator, by automation, or any combination of the two. At step one 442, a first query is set forth, and determines whether the upper plate 380 is currently secured to the lower plate 386 to form a seal or not. If the answer is "no," then the upper plate 380 is secured to the lower plate 386 to seal the at least one cavity 392. At step two 444, a liquid plastic material is introduced into the at least one cavity 392. The liquid plastic material can be introduced by injection, pouring, or spraying the liquid plastic material into the at least one cavity 392 to form an outsole 58 via the at least one injection passage 402.

At step three 446, a second query is set forth, which determines whether the cooling outsole 58 is cooled sufficiently to remove the upper plate 380. It is understood that the upper plate 380, the lower plate 386, or the cooling outsole 58 can each be selected for measurement to determine if the proper cooling temperature of the cooling outsole 58 has been reached. For instance, if a relationship between the temperature of the upper plate 380 and the temperature of the cooling outsole 58 can be determined, then the upper plate 380 can be measured to answer the query. Alternatively, a certain passage of time can be measured, relying upon the assumption that after a certain amount of time has passed, the cooling outsole 58 has cooled sufficiently for removal of the upper plate 380.

Still referring to FIG. 21, the cooling outsole 58 has cooled sufficiently when, if the upper plate 380 is removed, the cooling outsole 58 can retain its final shape without distortion. If the upper plate 380 is removed too early, then the outsole 58 may be too molten to hold its proper shape, and the outsole 58 when cooled will become defectively shaped. If the outsole 58 is allowed to cool too much, then time is wasted. If the answer to the second query is "no," then a certain predetermined amount of time is allowed to pass until the temperature is checked again, i.e., "wait." At step four 448, the upper plate 380 is removed. It is understood that alternatively the lower plate 386 could be removed from the upper plate 380, or both withdrawn from one another 380, 386 simultaneously. At step five 450, the outsole 58 is removed from the outsole mold 378. The outsole mold 378 may produce more than one outsole 58 at a time, and the steps above apply to each of the outsoles 58. This method provides a way to produce outsoles 58 that are suitable for the marriage mold 404.

Figure 22:
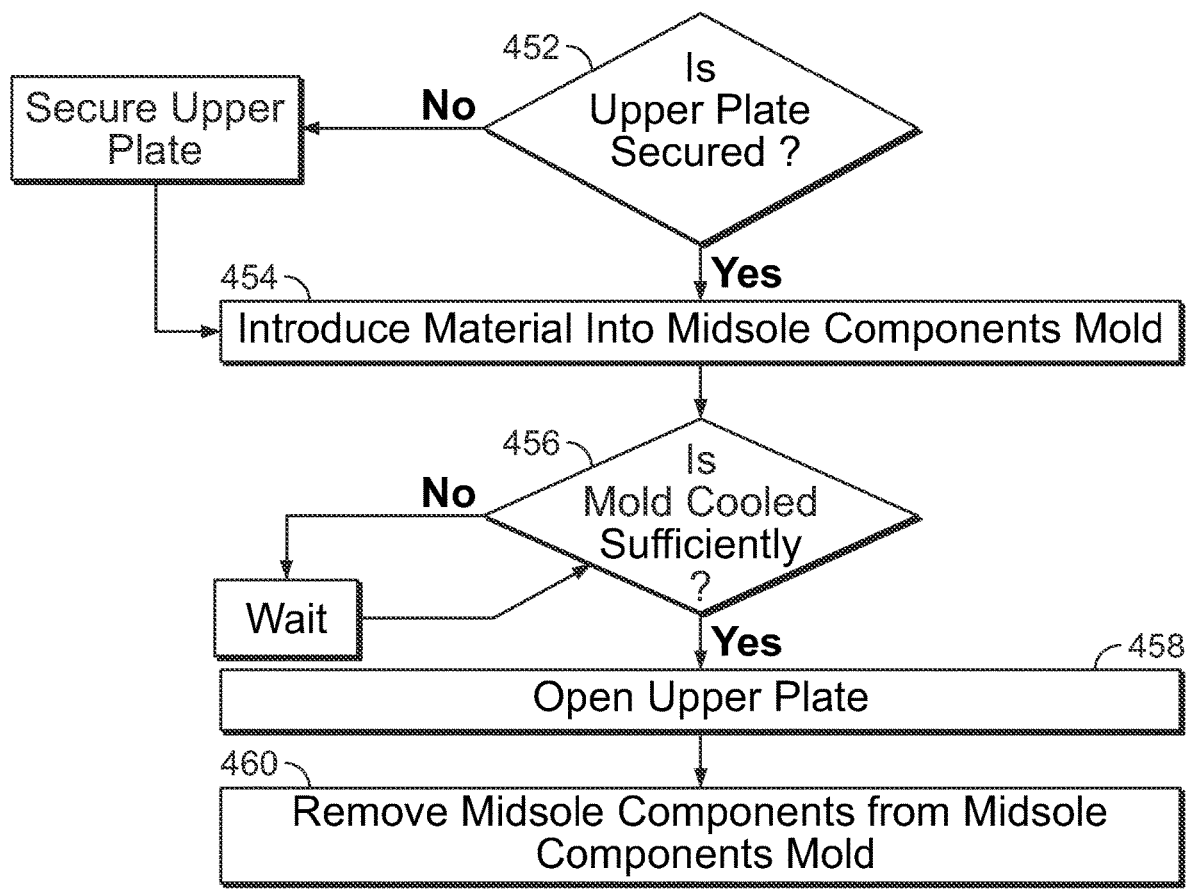
FIG. 22 is a step diagram for utilizing each of the various molds of FIGS. 7A, 8, 10, 12, and 14.

FIG. 22 is a step diagram for utilizing each of the various molds 178, 222, 238, 254, 302 of FIGS. 7A, 8, 10, 12, and 14, respectively. It is understood that this method can be performed manually by an operator, by automation, or any combination of the two. The steps remain the same regardless. At step one 452, a first query 452 determines whether the upper plate 180 (for the sake of this discussion, the first mold 178 of FIG. 7 and its accompanying elements are chosen for exemplary purposes) is currently secured to the lower plate 190 to form a seal or not. If the answer is "no", then the upper plate 180 is secured to the lower plate 190 to seal the at least one cavity 198. At step two 454, liquid plastic material is introduced into the respective at least one cavity 198. The liquid plastic material can be introduced by injection, pouring, or spraying the liquid plastic material into the at least one cavity 198 to form a midsole component 176 via the at least one injection passage 202. At step three 456, a second query determines whether the cooling midsole component 176 is cooled sufficiently to remove the upper plate 180. It is understood that the upper plate 180, the lower plate 190, or the cooling midsole component 176 can each be selected for measurement to determine if the proper cooling temperature of the cooling midsole component 176 has been reached. For instance, if a relationship between the temperature of the upper plate 180 and the temperature of the cooling midsole component 176 can be determined, then the upper plate 180 can be measured to answer the query. Alternatively, a certain passage of time can be measured, relying upon the assumption that after a certain amount of time has passed, the cooling midsole component 176 has cooled sufficiently for removal of the upper plate 180.

The cooling midsole component 176 has cooled sufficiently when, if the upper plate 180 is removed, the cooling midsole component 176 can retain its final shape without distortion. If the upper plate 180 is removed too early, the midsole component 176 may be too molten to hold its proper shape, and the midsole component 176 when cooled will become defectively shaped. If the midsole component 176 is allowed to cool too much, then time is wasted. If the answer to the second query is "no," then a certain predetermined amount of time is allowed to pass until the temperature is checked again, i.e., "wait." At step four 458, the upper plate 180 is removed. It is understood that alternatively the lower plate 190 could be removed from the upper plate 180, or both withdrawn from one another 180, 190 simultaneously. At step five 460, the midsole component 176 is removed from the first mold 178 (or one of the other four molds). The first mold 178 may produce more than one midsole component 176 at a time, and the steps above apply to each of the midsole components 176. This method provides a way to produce midsole components 176 that are suitable for the marriage mold 404.

Figure 23:
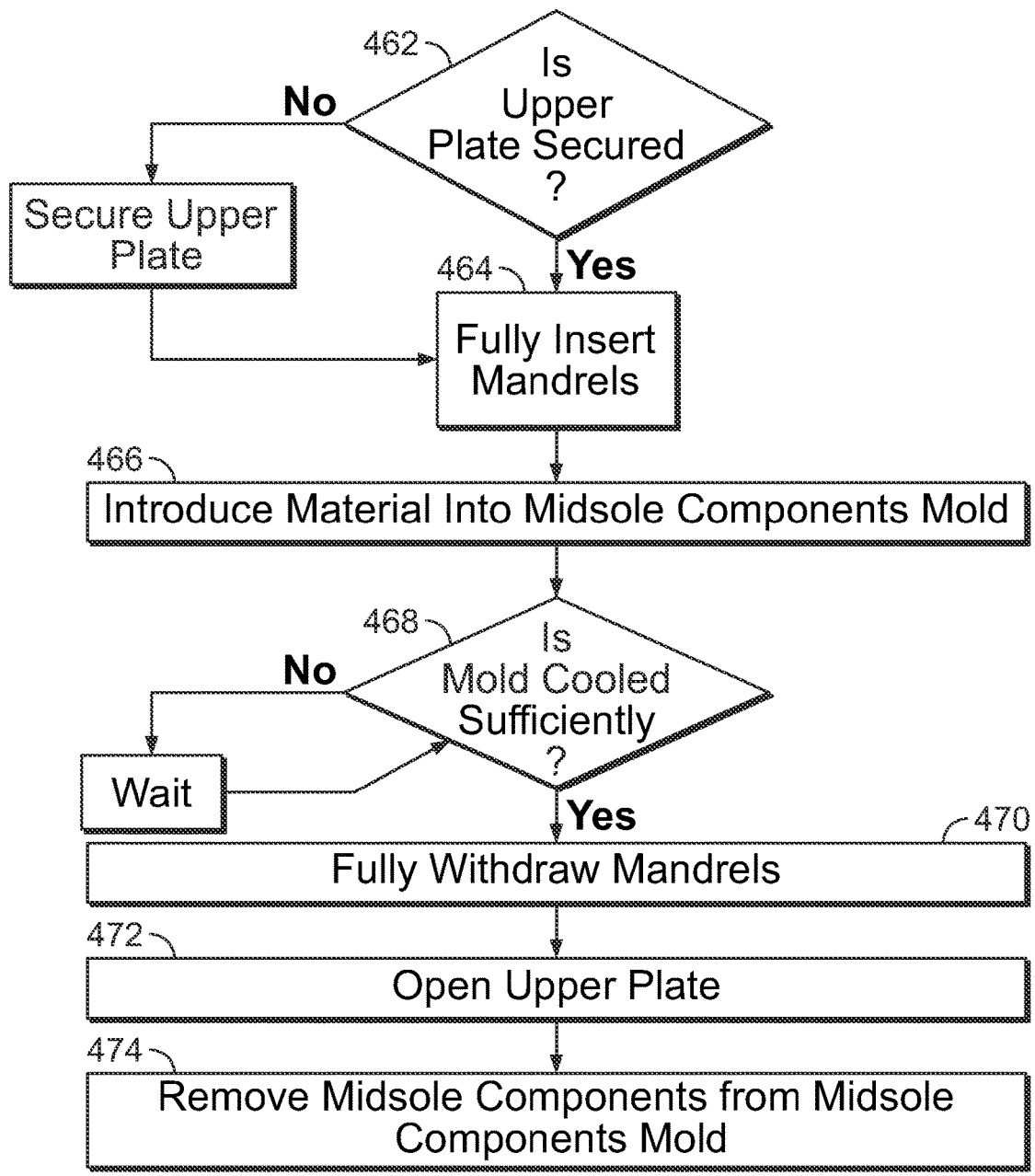
FIG. 23 is a step diagram for utilizing the mold of FIG. 16.

FIG. 23 is a step diagram for utilizing the sixth mold 340 of FIG. 16. It is understood that this method can be performed manually by an operator, by automation, or any combination of the two. The steps remain the same regardless. At step one 462, a first query determines whether the upper plate 334 is currently secured to the lower plate 338 or not. If the answer is "no", then the upper plate 334 is secured to the lower plate 338 to form a sealed at least one cavity 360. At step two 464, the ray configuration mandrels 336 are fully inserted into the mandrel passages 366 to form a seal. At step three 466, liquid plastic material is introduced into the at least one cavity 360. The liquid plastic material can be introduced by injection, pouring, or spraying the liquid plastic material into the at least one cavity 360 to form at least one midsole component 176 via the at least one injection passage 364. At step four 468, a second query determines whether the cooling midsole component 176 is cooled sufficiently to remove the upper plate 334.

It is understood that the upper plate 334, the lower plate 338, or the cooling midsole component 176 can each be selected for measurement to determine if the proper cooling temperature of the cooling midsole component 176 has been reached. For instance, if a relationship between the temperature of the upper plate 334 and the temperature of the cooling midsole component 176 can be determined, then the upper plate 334 can be measured to answer the query. Alternatively, a certain passage of time can be measured, relying upon the assumption that after a certain amount of time has passed, the cooling midsole component 176 has cooled sufficiently for removal of the upper plate 334.

The cooling midsole component 176 has cooled sufficiently when, if the upper plate 334 is removed, the cooling midsole component 176 can retain its final shape without distortion. If the upper plate 334 is removed too early, the midsole component 176 may be too molten to hold its proper shape, and the midsole component 176 when cooled will become defectively shaped. If the midsole component 176 is allowed to cool too much, then time is wasted. If the answer to the second query is "no", then a certain predetermined amount of time is allowed to pass until the temperature is checked again, "wait." At step five 470, the ray configuration mandrels 336 are withdrawn so that the at least one midsole component 176 can be readily removed without contacting the ray configuration mandrels 336. At step six 472, the upper plate 334 is removed. It is understood that alternatively the lower plate 338 could be removed from the upper plate 334, or both withdrawn from one another 334, 338 simultaneously. At step seven 474, the at least one midsole component 176 is removed from the sixth mold 340. The sixth mold 340 may produce more than one midsole component 176 at a time, and the steps above apply to each midsole component 176. These steps provide a way to produce midsole components 176 that are suitable for the marriage mold 404.

Figure 24:
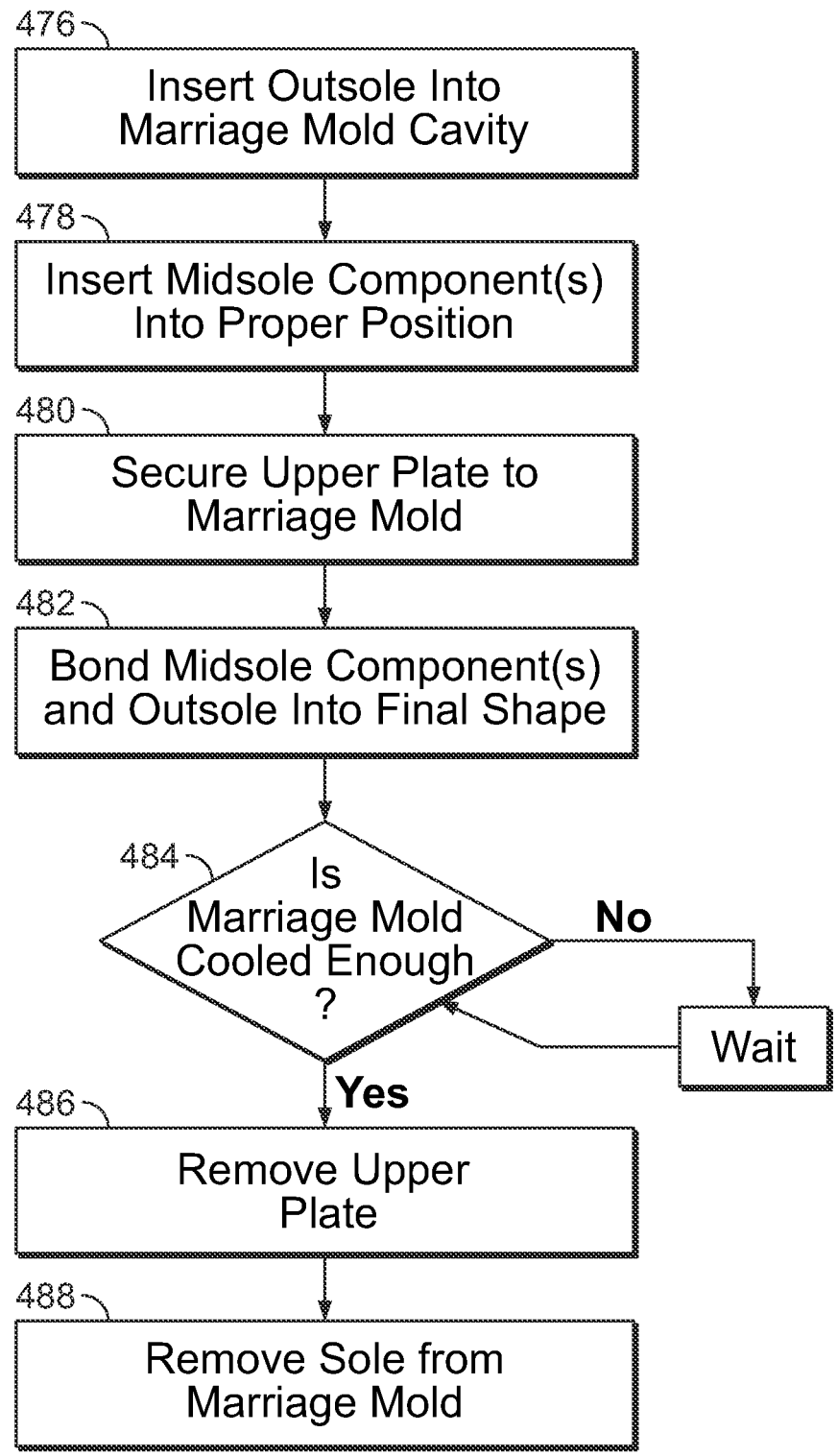
FIG. 24 is a step diagram for utilizing the mold of FIG. 20A.
Figure 25:
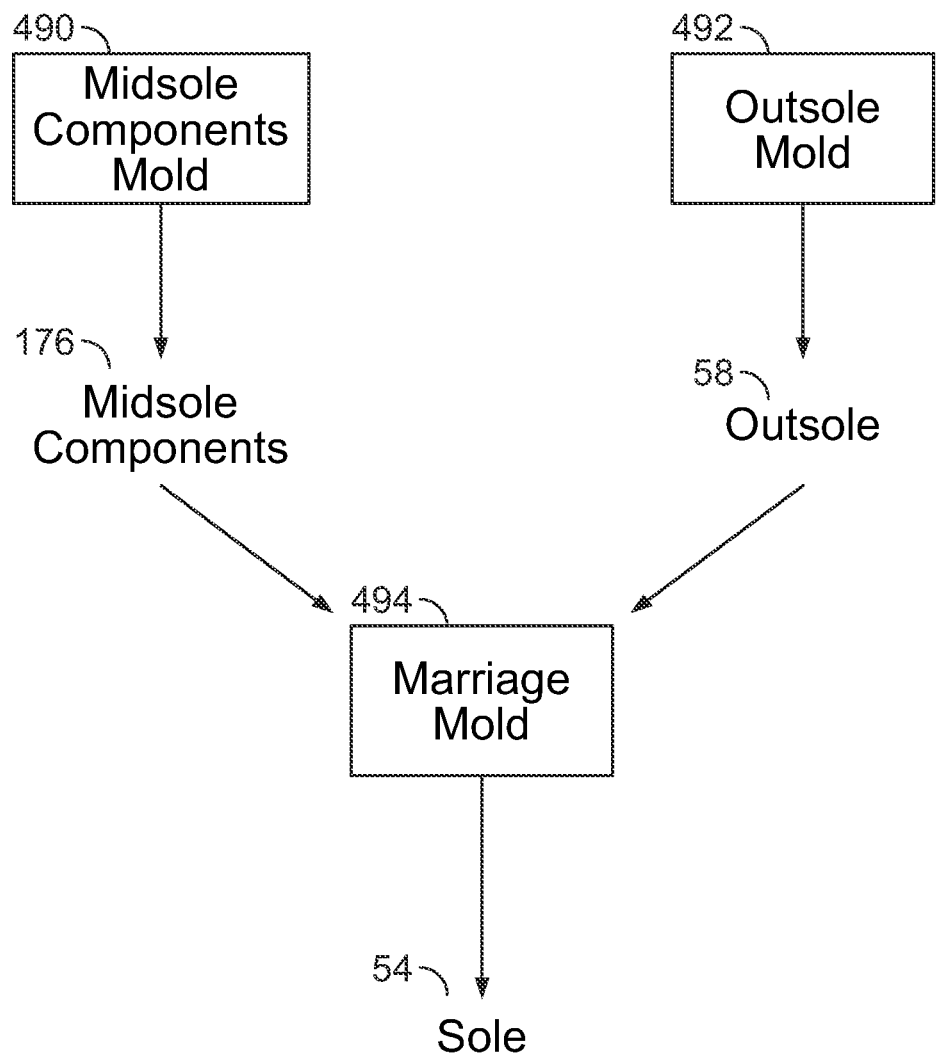
FIG. 25 is a flow chart that illustrates the flow of production of a sole from three mold stations and each respective component.

FIG. 24 is a step diagram for utilizing the marriage mold 404 of FIG. 20A. It is understood that this method can be performed manually by an operator, by automation, or any combination of the two. At step one 476, the outsole 58 is inserted into the at least one cavity 426. The outsole 58 should be placed into the desired position prior to the insertion of the assembly of corresponding midsole components 176. At step two 478, the assembly of corresponding midsole components 176 are inserted into proper position. Multiple midsole components 176 may be arranged for joining or bonding to the outsole 58, or only a single midsole component 176 or midsole 60 may be arranged for joining to the outsole 58. In addition, the sequence of step one 476 and step two 478 can be reversed when loading the assembly of corresponding midsole components 176 into the marriage mold 404 first is preferred. If step one 476 and step two 478 are performed in reverse sequence, then the assembly of corresponding midsole components 176 is placed into the desired position prior to insertion of the outsole 58.

At step three 480, the upper plate 414 is secured to the lower plate 420 to form a sealed at least one cavity 426. At step four 482, the assembly of corresponding midsole components 176 and the outsole 58 are bonded or joined into a final shape of the sole 54. The bonding is accomplished by liquid plastic material being injected, poured, or sprayed into the at least one cavity 426 via the at least one injection passage (not shown) and/or heat is applied to the at least one cavity 426 to assist with shaping and bonding of the assembly of corresponding midsole components 176 and the outsole 58 to one another to form a sole 54. In at least one embodiment, the marriage mold 404 is used for more than simply bonding the midsole components 176 and the outsole 58 together, but the shape of the at least one cavity 426 is utilized (with the assistance of the heat and bonding produced by the plastic material) to control the final form and shape of the sole 54.

Still referring to FIG. 24, the next step is step five 484, which is a first query 484 that determines whether the cooling sole 54 is cooled sufficiently to remove the upper plate 414. The cooling sole 54 has cooled sufficiently when, if the upper plate 414 is removed, the cooling sole 54 can retain its final shape without distortion. If the upper plate 414 is removed too early, the sole 54 may be too molten to hold its proper shape, and the sole 54 when cooled will become defectively shaped. If the sole 54 is allowed to cool too much, then time is wasted. It is understood that the upper plate 414, the lower plate 420, or the sole 54 can each be selected for measurement to determine if the proper cooling temperature of the cooling sole 54 has been reached. For instance, if a relationship between the temperature of the upper plate 414 and the temperature of the cooling sole 54 can be determined, then the upper plate 414 can be measured to answer the query. Alternatively, a certain passage of time can be measured, relying upon the assumption that after a certain amount of time has passed, to determine that the cooling sole 54 has cooled sufficiently for removal of the upper plate 414. If the answer to the step five 484 is "no," then a certain predetermined amount of time is allowed to pass until the temperature is checked again, i.e., "wait." At step six 486, the upper plate 414 is removed. It is understood that alternatively the lower plate 420 could be removed from the upper plate 414, or both withdrawn from one another 414, 420 simultaneously. At step seven 488, the sole 54 is removed from the marriage mold 404. It is understood that a marriage mold 404 may produce more than one sole 54 at a time, and the steps above apply to each sole 54. This method provides a way to produce soles 54 that are suitable for assembling an article of footwear 50.

Now referring to FIG. 25, a flow chart is shown, which illustrates the flow of production of the sole 54 from a first mold station 490, a second mold station 492, and a third mold station 494, and their respective products. The first mold station 490 is the collection of all of the outsole molds 378 (see FIG. 19A) used in production. The second mold station 492 is the collection of all of the various molds 178, 222, 238, 254, 302, 340 used to produce the midsole components 176 used in production (see FIGS. 7A, 8, 10, 12, 14, and 16). The third mold station 494 is the collection of all of the marriage molds 404 (see FIG. 20A) used in production. The outsole 58 (see FIG. 19B) and the midsole components 176 (see FIGS. 7B, 9B, 11B, 13B, 15B, and 18A) from the first mold station 490 and the second mold station 492 respectively provide the parts necessary to use the third station 494 to produce the soles 54 (see FIG. 20B) that ultimately are used to assemble an article of footwear 50.

The remaining FIGS. 26-41B are exemplary embodiments of the assembly of corresponding midsole components 176 to an outsole 58 to illustrate different midsole 60 arrangements. To summarize, the variation in the articles of footwear 50 is driven by variations in the sole 54. The variations in the sole 54 are driven by variations in the midsole 60. The variations in the midsole 60 are driven by variations in the assembly of corresponding midsole components 176. The variations in the assembly of corresponding midsole components 176 are driven by the different void structures 62. The different void structures 62 are defined by the voids 64 in the midsole components 176. The voids 64 are extended or elongated in the midsole components 176 to produce various channels 120, 256, 304, 342. The various channels 120, 256, 304, 342 are produced in the midsole components 176 by the various molds 178, 222, 238, 254, 302, 340, which are each capable of producing one of the various channels 120, 256, 304, 342.

FIGS. 26-41B show some of these assemblies of corresponding midsole components 176 arrangements, but other assemblies of corresponding midsole components 176 are possible beyond those that are illustrated herein. For instance, there is no limit on the number of midsole components 176 that can be combined or coupled to one another to assemble a midsole 60. For example, using nine midsole components 176 to produce one corresponding sole 54 is within the scope of this disclosure. In addition, in certain embodiments, the insertion wall 214 and the cavity facing wall 216 of the midsole component 176 are readily determined, but in other embodiments the insertion wall 214 and the cavity facing wall 216 for a particular midsole component 176 can be molded in reverse as well. For instance, the midsole components 438, 440 of FIG. 30 have insertion walls 214 and cavity facing walls 216; however, in FIG. 40, a left front midsole component 496, a right front midsole component 498, a left rear midsole component 500, and a right rear midsole component 502 can all be molded using either wall as the insertion wall 214 or the cavity facing wall 216.

Figure 26:
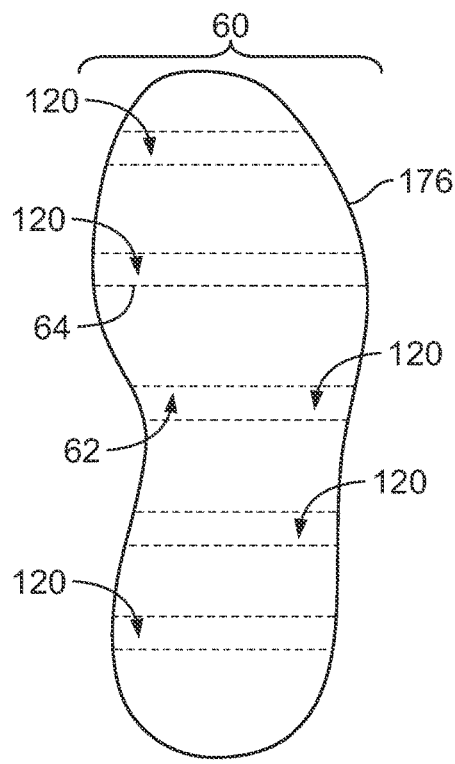
FIG. 26 is a top view of a midsole component with normal channels.
Figure 27:
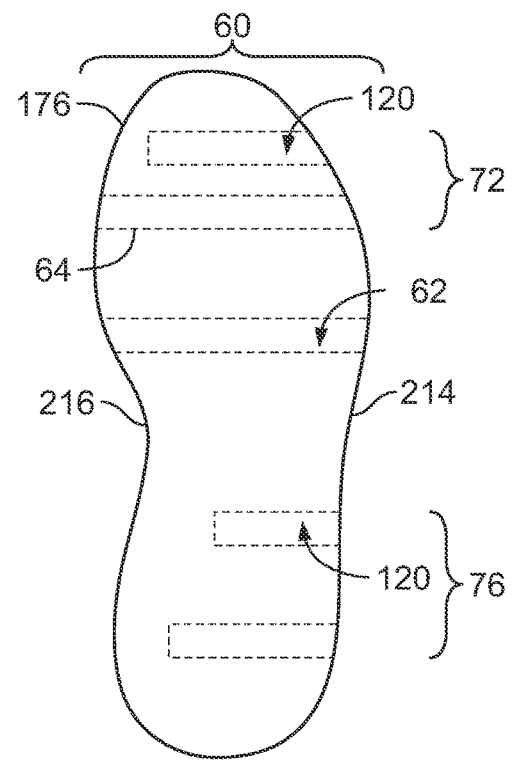
FIG. 27 is a top view of another midsole component with normal channels.

Referring now to FIG. 26, a top view of a single midsole component 176 with normal channels 120 shown. A single midsole component 176 forms the midsole 60 for insertion into the marriage mold 404 (the marriage mold 404 of FIG. 20 is cited in FIG. 26, and also FIGS. 27-40 throughout). In other embodiments, a plurality of midsole components 438, 440 are assembled into an assembled shape for insertion into the marriage mold 404 (see FIG. 29). Each of the normal channels 120 has two degrees or less of tapering. Here, a single row of normal channels 120 are shown in dotted lines. FIG. 27 illustrates a top view of a single midsole component 176 with normal channels 120. A single midsole component 176 forms the midsole 60 for insertion into the marriage mold 404. Two of the normal channels 120 shown in the forefoot region 72 extend from the insertion wall 214 to the cavity facing wall 216 of the midsole component 176, with two degrees or less of tapering. Three of the channels 120 shown extend from the insertion wall 214 but do not reach the cavity facing wall 216 of the midsole component 176, with two degrees or less of tapering. One of the three normal channels 120 is located in the forefoot region 72 and two of the three normal channels 120 are located in the heel region 76 of the midsole component 176.

Figure 28:
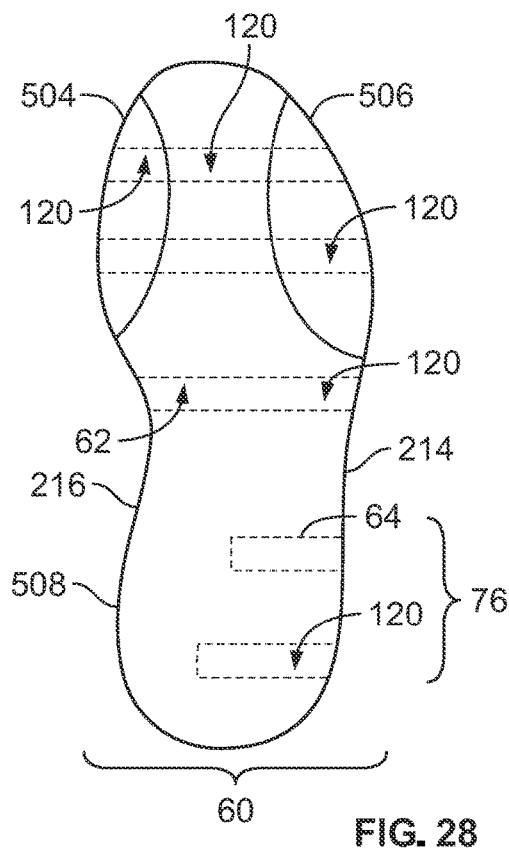
FIG. 28 is a top view of three separate midsole components with normal channels, which have been combined to form a midsole.

FIG. 28 illustrates a top view of three midsole components 504, 506, 508 with normal channels 120. A small left midsole component 504, a small right midsole component 506, and a main midsole component 508 form the midsole 60 for insertion into the marriage mold 404. There are nine normal channels 120 shown. Two of the normal channels 120 in the left small midsole component 504 extend with two degrees or less of tapering. Two of the normal channels 120 in the small right midsole component 506 extend with two degrees or less of tapering. Three of the normal channels 120 extend from the insertion wall 214 to the cavity facing wall 216 of the main midsole component 508, with two degrees or less of tapering. Two of the normal channels 120 extend from the insertion wall 214 but do not reach the cavity facing wall 216 of the main midsole component 508, with two degrees or less of tapering, and are located in the heel region 76 of the main midsole component 508. The three midsole components 504, 506, 508 are bonded together by either heat in the marriage mold 404, joined by liquid plastic material in the marriage mold 404, or a combination of the two. The normal channels 120 are aligned across the three midsole components 504, 506, 508 for two of the three normal channels 120, but there is no limitation that the normal channels 120 of different midsole components 176 must be aligned with one another. The normal channels 120 can be offset from one another if desired.

Figure 29:
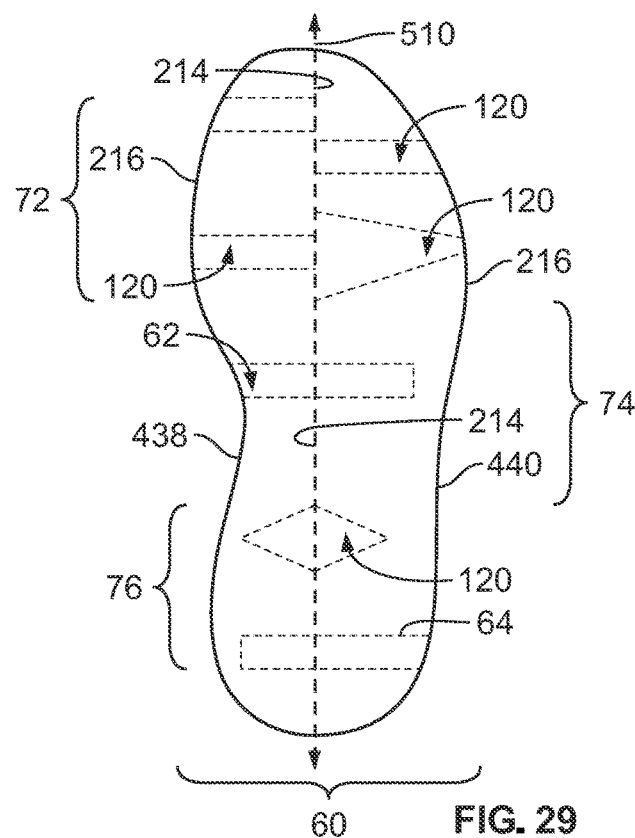
FIG. 29 is a top view of two separate midsole components with normal channels, which have been combined to form a midsole.

FIG. 29 illustrates a top view of two midsole components 438, 440 with normal channels 120 shown. A left midsole component 438 and a right midsole component 440 form the midsole 60 for insertion into the marriage mold 404. The left midsole component 438 and the right midsole component 440 are joined along a vertical midline 510. The left midsole component 438 has five normal channels 120. Three of the normal channels 120 extend from the insertion wall 214 to the cavity facing wall 216 of the left midsole component 438, with two degrees or less of tapering. One normal channel 120 extends from the insertion wall 214 but does not reach the cavity facing wall 216 of the left midsole component 438, with two degrees or less of tapering, and is located in the heel region 76. One normal channel 120 extends from the insertion wall 214 but does not reach the cavity facing wall 216 of the left midsole component 438, with more than two degrees of tapering, and is located in the heel region 76.

Still referring to FIG. 29, the right midsole component 440 has five of the normal channels 120. Two of the normal channels 120 extend from the insertion wall 214 to the cavity facing wall 216 of the right midsole component 440, with two degrees or less of tapering, one located in the forefoot region 72, and the other in the heel region 76. One normal channel 120 extends from the insertion wall 214 but does not reach the cavity facing wall 216 of the right midsole component 440, with two degrees or less of tapering, and is located in the midfoot region 74. One normal channel 120 extends from the insertion wall 214 and reaches the cavity facing wall 216 of the right midsole component 440, with more than two degrees of tapering, and is located in the forefoot region 72. The insertion walls 214 of the left midsole component 438 and the right midsole component 440 are proximate to each other, and the cavity facing walls 216 of the left midsole component 438 and the right midsole component 440 are distal to each other.

Figure 30:
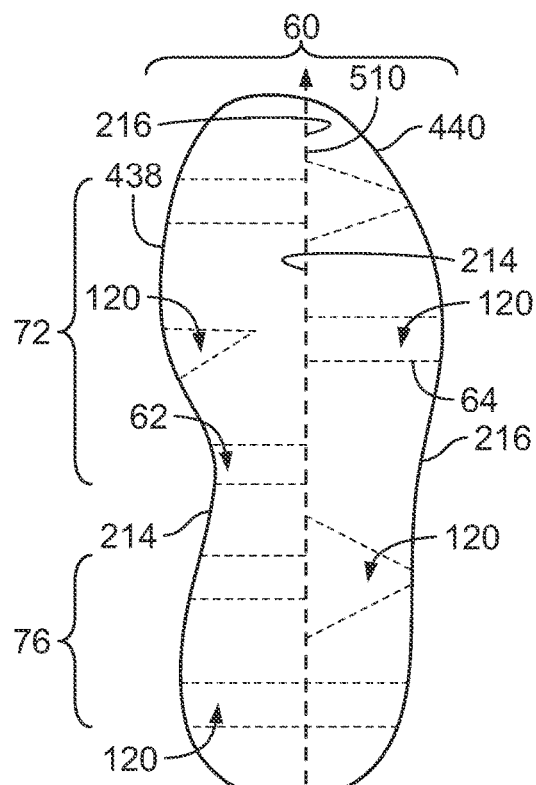
FIG. 30 is a top view of two separate midsole components with normal channels, which have been combined to form a midsole.

FIG. 30 illustrates a top view of two midsole components 438, 440 with normal channels 120. A left midsole component 438 and a right midsole component 440 form the midsole 60 for insertion into the marriage mold 404. The left midsole component 438 and the right midsole component 440 are joined along the vertical midline 510. The left midsole component 438 has five of the normal channels 120.

Four of the normal channels 120 extend from the insertion wall 214 to the cavity facing wall 216 of the left midsole component 438, with two degrees or less of tapering. One normal channel 120 extends from the insertion wall 214 but does not reach the cavity facing wall 216 of the left midsole component 438, with more than two degrees of tapering, and is located in the forefoot region 72.

The right midsole component 440 has four of the normal channels 120. Two of the normal channels 120 extend from the insertion wall 214 to the cavity facing wall 216 of the right midsole component 440, with two degrees or less of tapering, with one located in the forefoot region 72, and the other in the heel region 76. Two of the normal channels 120 extend from the insertion wall 214 and reach the cavity facing wall 216 of the right midsole component 440, with more than two degrees of tapering. The insertion walls 214 of the left midsole component 438 and the right midsole component 440 are both on the left hand side of the midsole components 438, 440 as shown in FIG. 30, and the cavity facing walls 216 of the left midsole component 438 and the right midsole component 440 are both on the right hand side of the midsole components 438, 440 as shown in FIG. 30.

Figure 31:
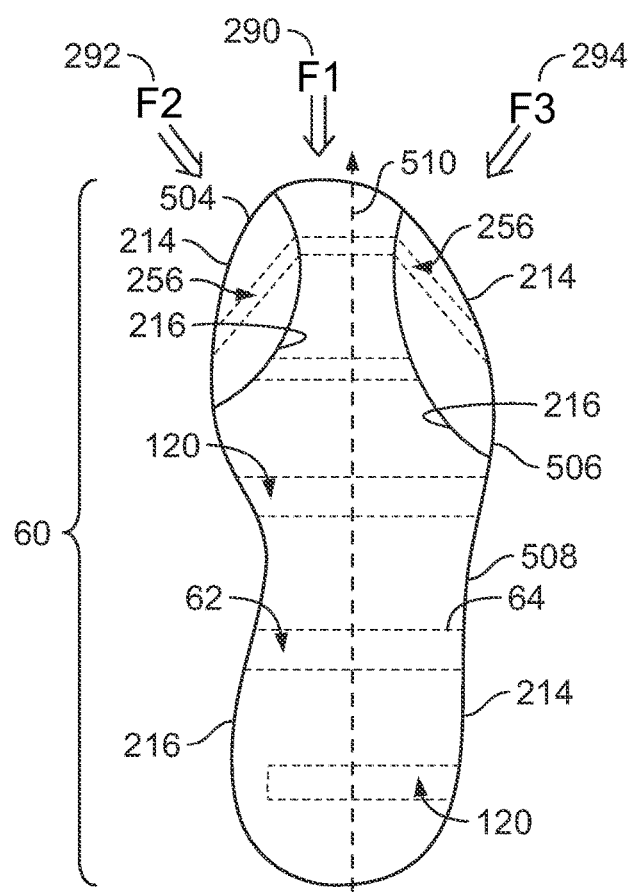
FIG. 31 is a top view of three separate midsole components with normal and angled channels, which have been combined to form a midsole.

Referring now to FIG. 31, a top view is illustrated of three of the midsole components 504, 506, 508 with normal channels 120 and angled channels 256. A small left midsole component 504, a small right midsole component 506, and a main midsole component 508 form the midsole 60 for insertion into the marriage mold 404. Each of the left small midsole component 504 and the right small midsole component 506 have one angled channel 256 each that extend from the insertion wall 214 to the cavity facing wall 216 of the two midsole components 504, 506 with two degrees or less of tapering. The midsole components 504, 506, 508 are shown being assembled for insertion into the marriage mold 404, and have angled channels 256 that are not perpendicular to the vertical midline 510 of the sole 54. The main midsole component 508 has five of the normal channels 120. Four of the normal channels 120 extend from the insertion wall 214 to the cavity facing wall 216 of the main midsole component 508, with two degrees or less of tapering. One normal channel 120 extends from the insertion wall 214 but does not reach the cavity facing wall 216 of the small left midsole component 504, with two degrees or less of tapering, and is located in the heel region 76.

Still referring to FIG. 31, the insertion walls 214 and the cavity facing walls 216 of the small left midsole component 504 and the right midsole component 506 can be disposed on either wall of the midsole components 504, 506, since molding can be accomplished either way. The main midsole component 508 has an insertion wall 214 toward the right side of FIG. 31, and a cavity facing wall 216 toward the left side of FIG. 31. In this embodiment, the small left midsole component 504 has the angled channel 256 orthogonal to the force indicated by F2 292. The right small midsole component 506 has the angled channel 256 orthogonal to a force indicated by F3 294. The channels 120 of main midsole component 508 are orthogonal to the force indicated by F1 290.

Figure 32:
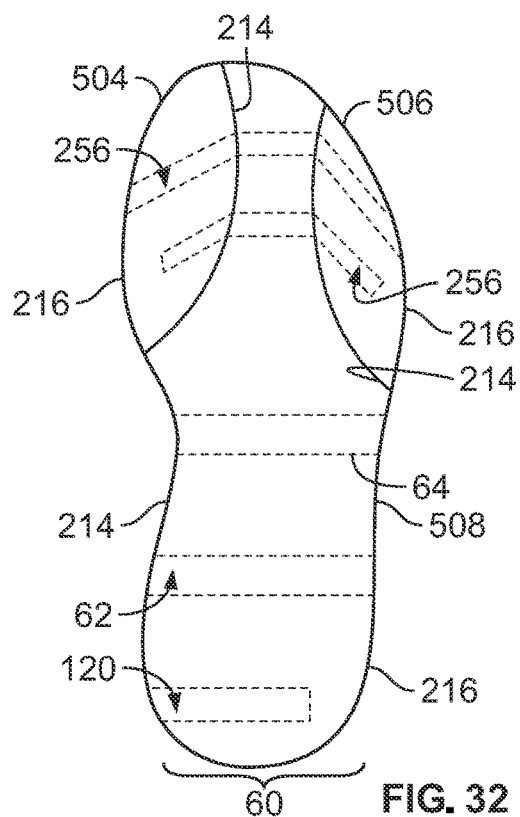
FIG. 32 is a top view of three separate midsole components with normal and angled channels, which have been combined to form a midsole.

FIG. 32 illustrates a top view of three midsole components 504, 506, 508 with normal channels 120, and angled channels 256 shown. A small left midsole component 504, a small right midsole component 506, and a main midsole component 508 form the midsole 60 for insertion into the marriage mold 404. Similar in many ways to FIG. 31 above, a difference between FIGS. 31 and 32 are that the main midsole component 508 of FIG. 32 has a normal channel 120 that extends from the insertion wall 214 but does not reach the cavity facing wall 216 of the main midsole component 508, with two degrees or less of tapering, and is located such that the insertion wall 214 is now toward the left side of FIG. 32. In addition, the small left midsole component 504 and the small right midsole component 506 both have two angled channels 256 each.

Still referring to FIG. 32, one angled channel 256 extends from the insertion wall 214 to the cavity facing wall 216 of the two midsole components 504, 506 with two degrees or less of tapering, and one angled channel 256 extends from the insertion wall 214 but does not reach the cavity facing wall 216 of the two midsole components 504, 506 with two degrees or less of tapering. As a result, the insertion wall 214 and the cavity facing wall 216 of the two midsole components 504, 506 can be readily determined, with the insertion walls 214 proximate the main midsole component 508.

Figure 33:
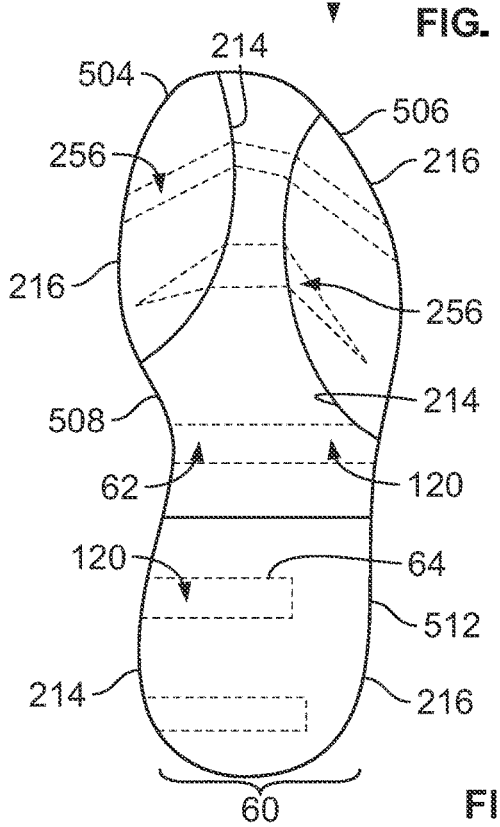
FIG. 33 is a top view of four separate midsole components with normal and angled channels, which have been combined to form a midsole.

FIG. 33 illustrates a top view of the four midsole components 504, 506, 508, 512 with normal channels 120 and angled channels 256 shown. A small left midsole component 504, a small right midsole component 506, a main midsole component 508, and a heel midsole component 512 form the midsole 60 for insertion into the marriage mold 404. Each of the left small midsole component 504 and the right small midsole component 506 have two of the angled channels 256. One angled channel 256 extends from the insertion wall 214 to the cavity facing wall 216 of the two midsole components 504, 506 with two degrees or less of tapering, and one angled channel 256 extends from the insertion wall 214 but does not reach the cavity facing wall 216 of the two midsole components 504, 506 with more than two degrees of tapering. As a result, the insertion wall 214 and the cavity facing wall 216 of the two midsole components 504, 506 can be readily determined, with the insertion walls 214 proximate the main midsole component 508. The main midsole component 508 has three normal channels 120 that extend from the insertion wall 214 to the cavity facing wall 216 of the main midsole component 508 with two degrees or less of tapering. The heel midsole component 512 has two normal channels 120 shown, of which both extend from the insertion wall 214 but do not reach the cavity facing wall 216 of the heel midsole component 512, with two degrees or less of tapering.

Figure 34:
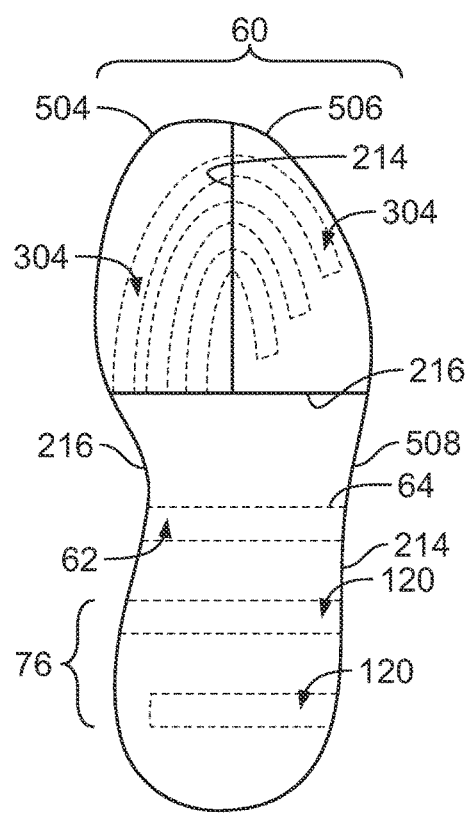
FIG. 34 is a top view of three separate midsole components with normal and curved channels, which have been combined to form a midsole.

FIG. 34 illustrates a top view of three midsole components 504, 506, 508 with normal channels 120 and curved channels 304 shown. A small left midsole component 504, a small right midsole component 506, and a main midsole component 508 form the midsole 60 for insertion into the marriage mold 404. Each of the small left midsole component 504 and the small right midsole component 506 have three of the curved channels 304. In the small left midsole component 504 the three curved channels 304 extend from the insertion wall 214 to the cavity facing wall 216 of the small left midsole component 504 with two degrees or less of tapering. The insertion wall 214 and the cavity facing wall 216 of the small left midsole component 504 are not shown, as they are reversible. In the small right midsole component 506 the three curved channels 304 extend from the insertion wall 214 but do not reach the cavity facing wall 216 of the small right midsole component 506 with two degrees or less of tapering.

The main midsole component 508 has three of the normal channels 120. Two of the three normal channels 120 extend from the insertion wall 214 to the cavity facing wall 216 of the main midsole component 508, with two degrees or less of tapering. One of the three normal channels 120 extends from the insertion wall 214 but does not reach the cavity facing wall 216 of the main midsole component 508, with two degrees or less of tapering, and is located in the heel region 76. Therefore, the insertion walls 214 and cavity facing walls 216 of the small left midsole component 504 and the main midsole component 508 can be determined.

Figure 35:
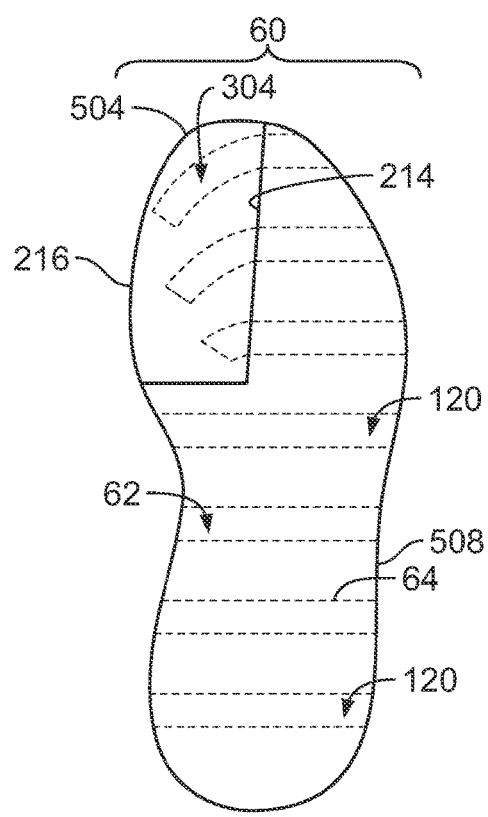
FIG. 35 is a top view of two separate midsole components with normal and curved channels, which have been combined to form a midsole.

FIG. 35 illustrates a top view of two of the midsole components 504, 508 with normal channels 120 and curved channels 304 shown. A small left midsole component 504 and a main midsole component 508 form the midsole 60 for insertion into the marriage mold 404. The small left midsole component 504 has three curved channels 304 that extend from the insertion wall 214 but do not reach the cavity facing wall 216 of the small left midsole component 504 with two degrees or less of tapering. The main midsole component 508 has seven normal channels 120 that extend with two degrees or less of tapering.

Figure 36:
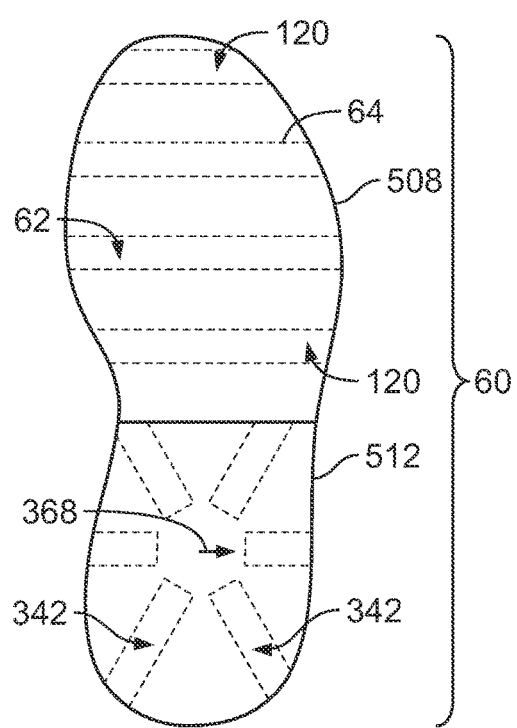
FIG. 36 is a top view of two separate midsole components with normal and ray configuration channels, which have been combined to form a midsole.

FIG. 36 illustrates a top view of two of the midsole components 508, 512 with normal channels 120 and ray configuration channels 342 shown. A main midsole component 508 and a heel midsole component 512 form the midsole 60 for insertion into the marriage mold 404. The main midsole component 508 has four normal channels 120 that extend from the insertion wall 214 to the cavity facing wall 216 of the main midsole component 508, with two degrees or less of tapering. The insertion wall 214 and the cavity facing wall 216 of the small left midsole component 504 are not shown, as they are reversible. The heel midsole component 512 has six ray configuration channels 342, which are oriented to axially align with a pre-selected center-point 368, with two degrees or less of tapering.

Figure 37:
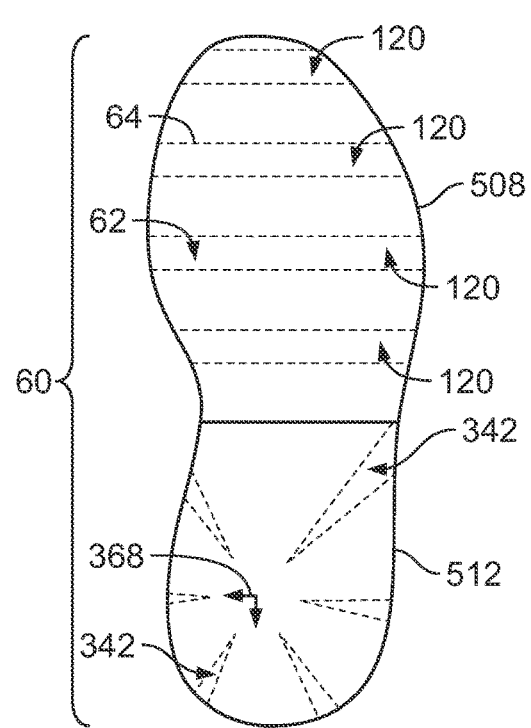
FIG. 37 is a top view of two separate midsole components with normal and ray configuration channels, which have been combined to form a midsole.

FIG. 37 illustrates a top view of two of the midsole components 508, 512 with normal channels 120 and ray configuration channels 342 shown. The collection of midsole components 508, 512 have many similarities to the collection of midsole components 508, 512 shown in FIG. 36, but the ray configuration channels 342 have more than two degrees of tapering in FIG. 37, and the pre-selected center-point 368 is shifted toward the left side of the heel midsole component 512.

Figure 38:
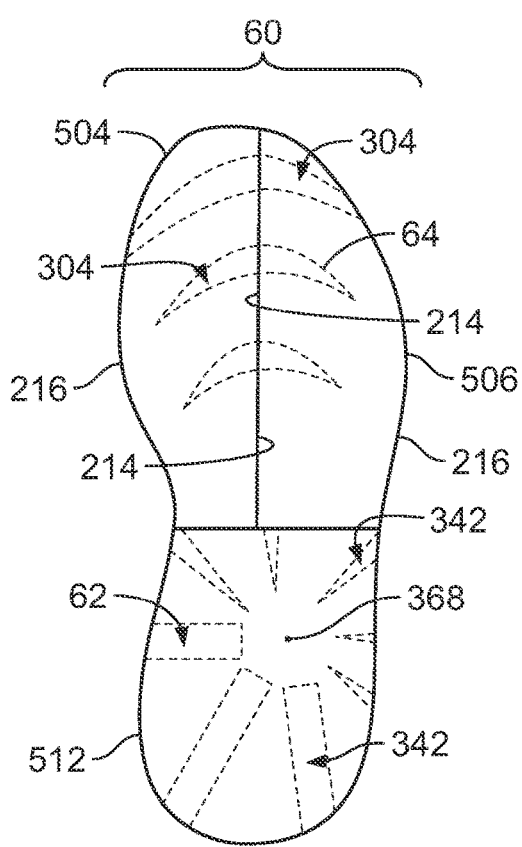
FIG. 38 is a top view of three separate midsole components with curved and ray configuration channels, which have been combined to form a midsole.

FIG. 38 illustrates a top view of three midsole components 504, 506, 512 with curved channels 304 and ray configuration channels 342. A small left midsole component 504, a small right midsole component 506, and a heel midsole component 512 form the midsole 60 for insertion into the marriage mold 404. The small left midsole component 504 and the small right midsole component 506 both have three curved channels 304. Two of the three curved channels 304 extend from the insertion wall 214 but do not reach the cavity facing wall 216 of the left and right front midsole components 504, 506 with more than two degrees of tapering. One of the three curved channels 304 extends from the insertion wall 214 and reaches the cavity facing wall 216 of the left and right front midsole components 504, 506 with more than two degrees of tapering. Therefore the insertion walls 214 of the small left and right midsole components 504, 506 can be readily determined. The heel region midsole component 512 has eight ray configuration channels 342 that are each oriented to axially intersect with the pre-selected center-point 368, which is positioned closer to the right side of the heel region midsole component 512. Three of the ray configuration channels 342 have two degrees or less of tapering, and five of the ray configuration channels 342 have more than two degrees of tapering.

Figure 39:
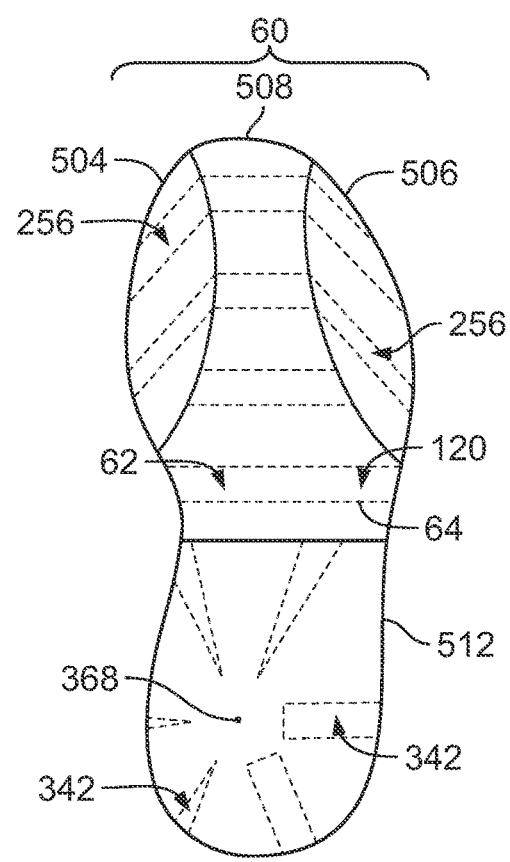
FIG. 39 is a top view of four separate midsole components with angled, normal, and ray configuration channels, which have been combined to form a midsole.

FIG. 39 illustrates a top view of four of the midsole components 504, 506, 508, 512 with normal channels 120, angled channels 256, and ray configuration channels 342 shown. A small left midsole component 504, a small right midsole component 506, a main midsole component 508, and a heel midsole component 512 form the midsole 60 for insertion into the marriage mold 404. The small left midsole component 504 and the small right midsole component 506 both have two angled channels 256 each, both channels 256 extend with two degrees or less of tapering. The main midsole component 508 has four normal channels 120 that extend the length of the component 508, with two degrees or less of tapering. The insertion walls 214 and the cavity facing walls 216 of the main midsole component 508, the small left midsole component 504, and the small right midsole component 506 can be disposed on either side of the components. The heel midsole component 512 has six ray configuration channels 342 that all axially intersect with a center point 368, which is located more to the left side and rearwards than the center point 368 of FIG. 38. Two of the ray configuration channels 342 have two degrees or less of tapering, and four of the ray configuration channels 342 have more than two degrees of tapering.

Figure 40:
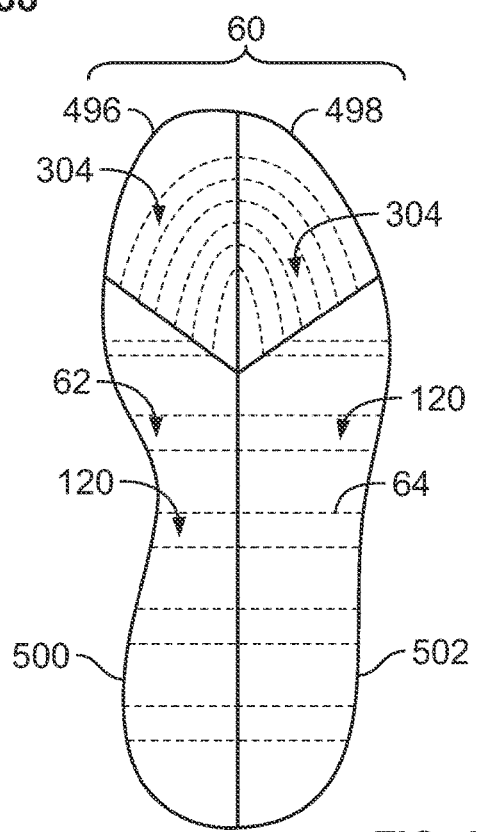
FIG. 40 is a top view of four separate midsole components with normal and curved channels, which have been combined to form a midsole.

FIG. 40 illustrates a top view of four midsole components 496, 498, 500, 502 with normal channels 120 and curved channels 304 shown. The left front midsole component 496, the right front midsole component 498, the left rear midsole component 500, and the right rear midsole component 502 form the midsole 60 for insertion into the marriage mold 404. The left front midsole component 496 and the right front midsole component 498 both have three curved channels 304 with two degrees or less of tapering. The insertion walls 214 and the cavity facing walls 216 (not shown) of all four midsole components 496, 498, 500, 502 can be on either side of the respective components 496, 498, 500, 502. The left rear midsole component 500, and the right rear midsole component 502 both have five normal channels 120 that extend from the insertion walls 214 to the cavity facing walls 216 of the two midsole components 500, 502 with two degrees or less of tapering.

Figure 41A:
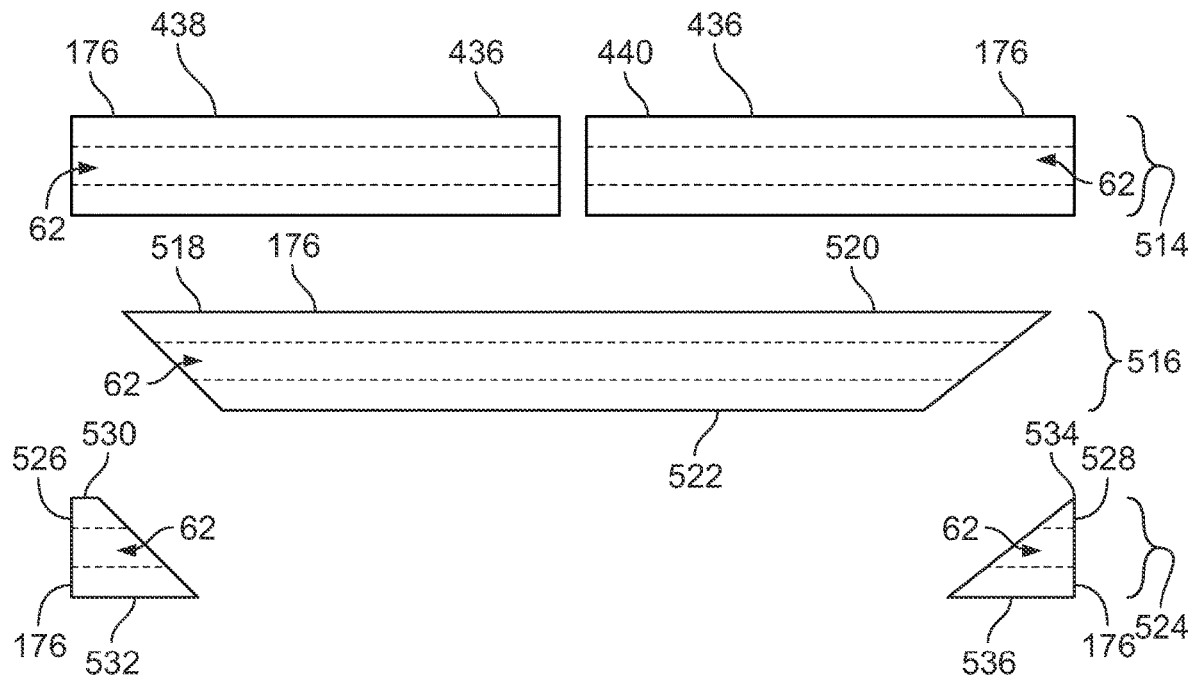
FIG. 41A is an exploded side view of a first layer, a second layer, and a third layer of midsole components stacked on top of one another for insertion into the marriage mold of FIG. 20A.
Figure 41B:
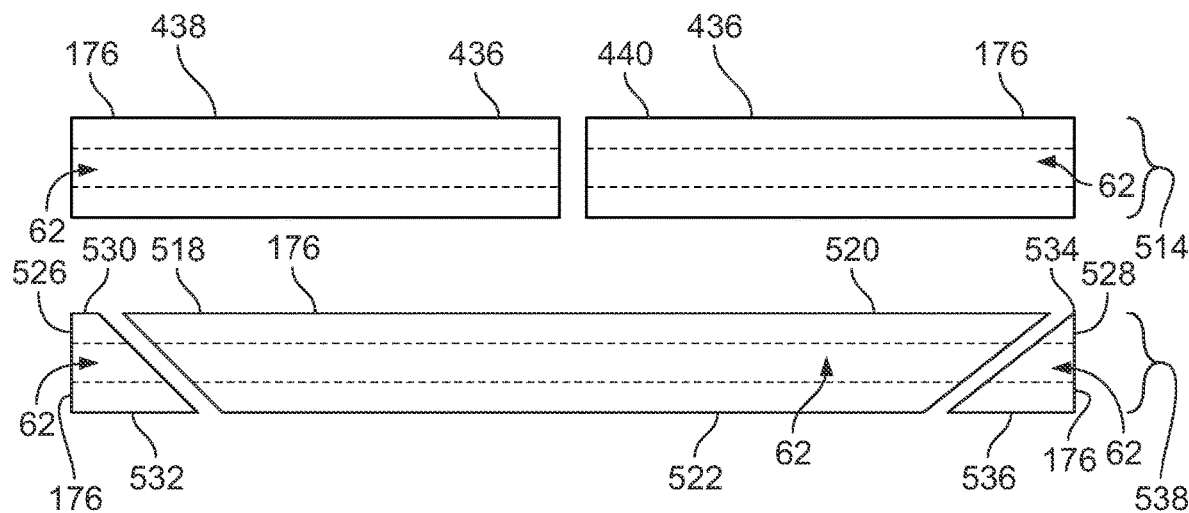
FIG. 41B is a side view of a first layer, a second layer, and a third layer of midsole components stacked on top of one another for insertion into the marriage mold of FIG. 20A.

FIGS. 41A and 41B illustrates an alternative midsole component arrangement for insertion into the marriage mold 404 of FIG. 20A with three layers of midsole components 176. In FIG. 41A, three layers of midsole components 438, 440, 176 are illustrated in an exploded view. A first layer 514 has a left midsole component 438, and right midsole component 440 with second regions 436. A second layer 516 has a first slanted midsole component 518 which has a top surface area 520 that is a different size and shape than a bottom surface area 522. A third layer 524 has a second slanted midsole component 526 and a third slanted midsole component 528. The second slanted midsole component 526 has a top surface area 530 and a bottom surface area 532, and the third slanted midsole component 528 has a top surface area 534 and a bottom surface 536.

In FIG. 41B, the first, second, and third slanted midsole components 518, 526, and 528 from the second layer 516 and the third layer 518 can be arranged to form a combined layer 538 where the top surface areas 520, 530, 534 of the first, second, and third slanted midsole components 518, 526, and 528, respectively, and the bottom surfaces 522, 532, 536, of the three components 518, 526, and 528 form regions that are of the same size and shape. The combined layer 538 may be arranged to have the same size and shape as another layer of midsole components 176 stacked above or below, such as the first layer 514, when viewed from a top view, so that the combined layer 542 and the layer stacked above or below the combined layer 542, such as the first layer 514, can be inserted into the marriage mold 404. The slanted midsole components 518, 526, 528 are not limited in their shape to only a straight slope, but may be shaped with contours or waves such that the slanted midsole components 518, 526, 528 fit together to form a combined layer 538 that forms a defined size and shape when viewed from above.

It is contemplated that by utilizing stacked layers 514, 516, 524 of midsole components 176, the midsole components 176 can be made from different materials as desired, such as using a stiffer material for the second and third slanted midsole components 526, 528, and then using a more cushioning material for the first slanted midsole component 518. In addition, different materials could be used for the first layer 514 compared to the second and third layers 516, 518, for a further variation in the cushioning effect as desired.

Any of the embodiments described herein may be modified to include any of the structures or methodologies disclosed in connection with different embodiments. Similarly, materials or construction techniques other than those disclosed above may be substituted or added in some embodiments according to known approaches. Further, the present disclosure is not limited to articles of footwear of the type specifically shown. Still further, aspects of the articles of footwear of any of the embodiments disclosed herein may be modified to work with any type of footwear, apparel, or other athletic equipment.

As noted previously, it will be appreciated by those skilled in the art that while the disclosure has been described above in connection with particular embodiments and examples, the disclosure is not necessarily so limited, and that numerous other embodiments, examples, uses, modifications and departures from the embodiments, examples and uses are intended to be encompassed by the claims attached hereto.

We claim:

1. A method of using a marriage mold, comprising:
providing an upper plate with a first wall;
providing a lower plate with a marriage cavity and a top wall;
molding a first midsole component by a first mold, the first midsole component having first channels therein made by mandrels that have a cross-sectional shape that matches the cross-sectional shape of the first channels;
molding a second midsole component by a second mold, the second midsole component having second channels therein made by mandrels that have a cross-sectional shape that matches the cross-sectional shape of the second channels; and
molding an outsole made with an outsole mold,
wherein the first and second midsole components are made of the same material, wherein the marriage mold is configured to receive the first and second midsole components,
wherein the outsole is inserted into the marriage mold with the two midsole components,
wherein the upper plate is secured to the lower plate such that the first wall and the top wall form a seal,
wherein the midsole components and the outsole are subjected to heat, and
wherein the assembly of midsole components are configured to join the outsole in the marriage mold in order to form a sole.

2. The method of using the marriage mold of claim 1, wherein the outsole has a first region,
wherein the assembly of the midsole components combine to have a second region, and
wherein the second region has substantially the same profile as the first region.

3. The method of using the marriage mold of claim 1, wherein the first mold includes mandrel passages, the mandrel passages being configured to receive the mandrels.

4. The method of using the marriage mold of claim 1, wherein the sole behaves as a structure having at least one auxetic property.

5. The method of using the marriage mold of claim 4, wherein the auxetic property comprises a programmable deformation, such that when a compressive force is applied to the material, the material will contract, and is drawn inward in a direction that is transverse to the load.

6. The method of using the marriage mold of claim 2, wherein the sole is withdrawn from the lower plate or the upper plate after the sole has cooled sufficiently such that the sole maintains the shape of the sole outside a sealed marriage cavity.

7. The method of using the marriage mold of claim 2, wherein the sole is withdrawn from the lower plate or the upper plate after a pre-determined amount of time has elapsed.

8. The method of using the marriage mold of claim 1, wherein the marriage mold has two or more marriage cavities.

9. The method of using the marriage mold of claim 2, wherein a liquid plastic material is injected, poured, or sprayed into the marriage cavity to bond the outsole to the midsole components.

10. The method of using the marriage mold of claim 1, wherein the lower plate has a plurality of exterior walls, at least one cavity wall, an at least one injection passage, and a body, and
wherein the at least one injection passage begins at and extends from one of the plurality of exterior walls, through the body, and fluidly connects to each of the corresponding at least one cavity walls.

11. The method of using the marriage mold of claim 3, wherein at least one of the mandrels is elongated into the midsole components to produce channels.

12. The method of using the marriage mold of claim 11, wherein the sole is provided with a medial surface and a lateral surface, and the channels extend from the medial surface toward the lateral surface.

13. The method of using the marriage mold of claim 12, wherein the channels extend entirely through the first midsole component.

14. The method of using the marriage mold of claim 1, wherein the first mold forming the first midsole component has an insertion wall and an exterior wall, and a mandrel passage extending from the insertion wall to the exterior wall of the first mold.

15. The method of using the marriage mold of claim 1, wherein at least one of the first channels is spaced apart from a cavity wall of the first midsole component.

16. A method of using a midsole components mold, comprising:
providing an upper plate with a first wall, and a plurality of mandrels that project from the first wall; and
providing a lower plate with a top wall, a body, a plurality of exterior walls, and at least one cavity with at least one corresponding cavity wall,
wherein the upper plate is secured to the lower plate to form a seal,
wherein at least one midsole component is formed in the at least one cavity, and is formed of a first material and has a void structure when a liquid plastic material is injected, poured, or sprayed into the at least one cavity,
wherein the plurality of mandrels is removably inserted into a plurality of mandrel passages, and wherein each of the plurality of mandrel passages includes an axis that points to a center-point such that the plurality of mandrel passages intersects with each other.

17. The method of using a midsole components mold of claim 16, wherein the intersection of the top wall and the at least one cavity wall forms an edge,
   wherein a first point and a second point are defined as the points on the edge most distal from one another,
   wherein a third point is defined as the point equally most distal to the first point and the second point on the edge, and
   wherein an insertion plane is defined as the plane that intersects the first point, the second point, and the third point.

18. The method of using a midsole components mold of claim 17, wherein the plurality of mandrels includes a collar to provide a hard stop that is configured to control the depth of insertion of plurality of mandrels at least one cavity.

19. The method of using a midsole components mold of claim 16, wherein the lower plate has an injection passage.

20. The method of using a midsole components mold of claim 19, wherein the injection passage begins at and projects from at least one of the plurality of exterior walls, through the body, and is fluidly connected to the at least one cavity.

* * * * *